US008285669B2

(12) United States Patent
Northrup

(10) Patent No.: US 8,285,669 B2
(45) Date of Patent: *Oct. 9, 2012

(54) SUBSCRIPTION-BASED SERVICES

(75) Inventor: Charles J. Northrup, Old Bridge, NJ (US)

(73) Assignee: Cappelle Networking DE, LLC, Wilmington, DE (US)

( * ) Notice: Subject to any disclaimer, the term of this patent is extended or adjusted under 35 U.S.C. 154(b) by 160 days.

This patent is subject to a terminal disclaimer.

(21) Appl. No.: 12/433,528

(22) Filed: Apr. 30, 2009

(65) Prior Publication Data

US 2009/0300192 A1 Dec. 3, 2009

Related U.S. Application Data

(63) Continuation of application No. 11/062,256, filed on Feb. 18, 2005, now Pat. No. 7,535,927, which is a continuation of application No. 09/211,202, filed on Dec. 14, 1998, now Pat. No. 6,922,705, which is a continuation of application No. 08/353,905, filed on Dec. 12, 1994, now Pat. No. 5,850,518.

(51) Int. Cl.
*G06F 7/00* (2006.01)

(52) U.S. Cl. .................. 707/608; 707/609; 709/228

(58) Field of Classification Search .................. 709/228
See application file for complete search history.

(56) References Cited

U.S. PATENT DOCUMENTS

| 4,835,673 | A | 5/1989 | Rushby et al. |
|---|---|---|---|
| 4,835,674 | A | 5/1989 | Collins et al. |
| 4,918,646 | A | 4/1990 | Hirose |
| 4,982,344 | A | 1/1991 | Jordan |
| 4,989,139 | A | 1/1991 | Friedman et al. |
| 5,021,949 | A | 6/1991 | Morten et al. |
| 5,109,515 | A | 4/1992 | Laggis et al. |
| 5,159,592 | A | 10/1992 | Perkins |
| 5,185,860 | A | 2/1993 | Wu |
| 5,239,634 | A | 8/1993 | Buch et al. |
| 5,251,205 | A | 10/1993 | Callon et al. |
| 5,265,239 | A | 11/1993 | Ardolino |
| 5,278,955 | A | 1/1994 | Forte et al. |
| 5,297,249 | A | 3/1994 | Bernstein et al. |
| 5,301,326 | A | 4/1994 | Linnett et al. |
| 5,307,347 | A | 4/1994 | Duault et al. |
| 5,309,437 | A | 5/1994 | Perlman et al. |
| 5,321,542 | A | 6/1994 | Freitas et al. |

(Continued)

OTHER PUBLICATIONS http://info.cern.ch/ as printed out in year 2010.*

(Continued)

*Primary Examiner* — David Y Jung

(57) ABSTRACT

The present invention provides a virtual network, sitting "above" the physical connectivity and thereby providing the administrative controls necessary to link various communication devices via an Access-Method-Independent Exchange. In this sense, the Access-Method-Independent Exchange can be viewed as providing the logical connectivity required. In accordance with the present invention, connectivity is provided by a series of communication primitives designed to work with each of the specific communication devices in use. As new communication devices are developed, primitives can be added to the Access-Method-Independent Exchange to support these new devices without changing the application source code. A Thread Communication Service is provided, along with a Binding Service to link Communication Points. A Thread Directory Service is available, as well as a Broker Service and a Thread Communication Switching Service. Intraprocess, as well as Interprocess, services are available. Dynamic Configuration Management and a Configurable Application Program Service provide software which can be commoditized, as well as upgraded while in operation.

38 Claims, 114 Drawing Sheets

U.S. PATENT DOCUMENTS

| | | | |
|---|---|---|---|
| 5,355,476 | A | 10/1994 | Fukumura |
| 5,367,619 | A | 11/1994 | Dipaolo et al. |
| 5,412,784 | A | 5/1995 | Rectschaffen et al. |
| 5,475,819 | A | 12/1995 | Miller et al. |
| 5,485,617 | A | 1/1996 | Stutz et al. |
| 5,497,463 | A | 3/1996 | Stein et al. |
| 5,510,980 | A | 4/1996 | Peters |
| 5,517,622 | A | 5/1996 | Ivanoff et al. |
| 5,548,726 | A | 8/1996 | Pettus |
| 5,548,745 | A | 8/1996 | Egan et al. |
| 5,606,493 | A | 2/1997 | Duscher et al. |
| 5,634,127 | A | 5/1997 | Cloud et al. |
| 5,754,857 | A | 5/1998 | Gadol |
| 5,838,906 | A | 11/1998 | Doyle et al. |
| 5,941,949 | A | 8/1999 | Pedersen |
| 5,960,420 | A | 9/1999 | Leymann et al. |
| 6,029,201 | A | 2/2000 | Neill |
| 6,049,799 | A | 4/2000 | Mangat et al. |
| 6,157,944 | A | 12/2000 | Pedersen |
| 6,301,582 | B1 | 10/2001 | Johnson et al. |
| 6,301,583 | B1 | 10/2001 | Zellweger |
| 6,304,879 | B1 | 10/2001 | Sobeski et al. |
| 6,502,099 | B1 | 12/2002 | Rampy |
| 6,542,920 | B1 | 4/2003 | Belkin et al. |
| 6,560,719 | B1 | 5/2003 | Pham et al. |
| 6,625,603 | B1 | 9/2003 | Garg et al. |
| 6,625,605 | B1 | 9/2003 | Terakura et al. |
| 6,625,615 | B2 | 9/2003 | Shi et al. |
| 2012/0084404 | A1* | 4/2012 | Haot et al. ............ 709/219 |
| 2012/0102172 | A1* | 4/2012 | Rathod ............ 709/223 |
| 2012/0110179 | A1* | 5/2012 | van Coppenolle et al. ... 709/225 |

OTHER PUBLICATIONS

RFC 1689; IETF organisation, Aug. 1994.*
www.internetic.net.
www.192.com.
www.att.net.
Souto et al., Technical Features of the @INTELSTAT Internet product suite, (Ref. No. 1997/367), IEE Colloquium on Oct. 7, 1994, 4/1-4/6.
Cha et al., Combining high speed digital audio-visual services and Internet services, Information, Communications and Signal Processing, 1997. iCICS., Proceedings of 1997 International Conference on vol. 1, Sp. 9-12, 199, pp. 157-161, vol. 1.
Helal et al., The Internet enterprise, Applications and the Internet, 2002 (SAIN 2002), Proceedings, 2002, Symposiumn on Jan. 28-Feb. 1, 2002, pp. 54-62.
Qiu et al., "Internet-based SCADA display system," IEEE Computer Applications in Power, vol. 15., Issue 1, Jan. 2002, pp. 14-19.
Nikolaidis, jarva.rmi The remote method invocation guide Book Review, IEEE Network, vol. 16, Issue 2, Mar./Apr. 2002, pp. 5-6.
Koutsogiannakis et al., "Performing studies of remote method invocation in java," Performance, Computing, and Communications Conference, 2002, 21st IEEE International, 2002, pp. 1-8.
Sundaraman et al., Application specific macro based synthesis, VLSI Design, 2001 Fourteenth International Conference on Jan. 3-7, 2001, pp. 317-324.
Dutta et al., A circuit-driven design methodology for video signal-processing datapath elements, Very large Scale Integration (VLSI) Systems, IEEE Transactions on vol. 7, Issue 2, Jun. 1999, pp. 229-240.
Sinclair et al., ASIC design for conditional nested loops with predicate registers, Circuits and Systems, 1999, 42nd Midwest Symposium on vol. 2, Aug. 8-11, 1999, pp. 874-877, vol. 2.
Abdul-Fatah et al., "Performance of CORBA-based client-server architectures," Parallel and Distributed Systems, IEEE Transactions on vol. 13, Issue 2, Feb. 2002, pp. 111-127.
Jepson, "SOAP cleans up interoperability problems on the Web," IT Professional, vol. 3, Issue 1, Jan.-Feb. 2001, pp. 52-55.
Maluf et al., "Articulation management for intelligent integration of information," Systems, Man, and Cybernetics, Part C: Applications and Reviews, IEEE Transactions on vol. 31, Issue 4, Nov. 2001, pp. 485-496.
http://java.sun.com/j2se/1.5.0/docs/api/java/security/Provider.Service.htm- 1.
http://en.wikipedia.org/wiki/Application.sub.—service.sub.—provider.
http://en.wikipedia.org/wiki/Internet.sub.—service.sub.—provider.
http://www.iab.org/documents/iabmins/IABmins.1991-06-14.html.
http://www.iab.org/documents/iabmins/IABmins.1994-10-13.html.
http://support.novell.com/techcenter/articles/ana19940201.html.
http://support.novell.com/techcenter/articles/dnd19940901.html.
http://support.novell.com/techcenter/articles/ana19930402.html.
Nonblocking Scheduling for Web Service Transactions Alrifai, Mohammad; Balke, Wolf-Tilo; Dolog, Peter; Nejdl, Wolfgang; Web Services, 2007. ECOWS '07. Fifth European Conference on Nov. 26-28, 2007 pp. 213-222.
Asynchronous Callback in Web Services; Kai Qian; Jigang Liu; LiXin Tao; Software Engineering, Artificial Intelligence, Networking, and Parallel/Distributed Computing, 2006. SNPD 2006. Seventh ACIS International Conference on Jun. 19-20, 2006 pp. 375-380.
Hosting Web Services on Resources Constrained Devices Asif, M.; Majumdar, S.; Dragnea, R.; Web Services, 2007. ICWS 2007. IEEE International Conference on Jul. 9-13, 2007 pp. 583-590.

* cited by examiner

```
VPEINIT :
VAPINIT :
MAIN : Rule-A
DONE : Rule-C
VAPDONE :
VPEDONE :
Rule-A : Rule-B
Rule-B :
Rule-C :
```

| 7. Application Layer |
|---|
| 6. Presentation Layer |
| 5. Session Layer |
| 4. Transport Layer |
| 3. Network Layer |
| 2. Data Link Layer |
| 1. Physical Layer |

Fig. 11

```
PROCEDURE make_target(target)
        for each prerequisite of target
                create a thread to execute PROCEDURE make_target(prerequisite)
        end_for
        for each thread created
                wait for thread to complete
                if the return code from this thread is ERROR
                then
                        return ERROR
                end_if
        end_for
        if target already exists
        then
                CALL PROCEDURE get_time_stamp(target)
        else
                target's time stamp is zero
        end_if for each prerequisite of target
        do
                if the prerequisite's time stamp is newer then the target's
                then
                        trigger the action to build the target
                        if the action completed with an ERROR condition
                        then
                                return ERROR condition
                        end_if
                        CALL PROCEDURE get_time_stamp(target)
                        break out of this for loop
                end_if
        end for_do
        return SUCCESS

END_PROCEDURE
```

Fig. 12

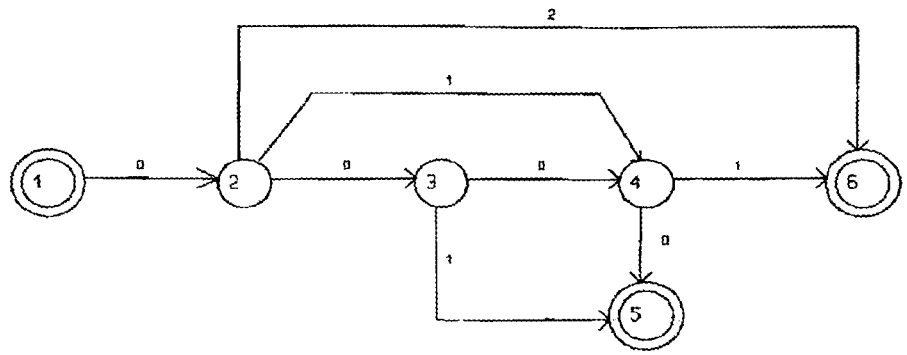

Fig. 13A

DEFINE MAKE_STATE_MACHINE

STATE 1
    STATE THREAD make_target( target )
        for each prerequisite of target
        do
            ATTACH prerequisite to MAKE_STATE_MACHINE
        end_for_do
        retrieve time stamp associated with target
        return transition code 0

STATE 2
    STATE THREAD synchronize(target)
        for each immediate prerequisite
        do
            wait for prerequisite to complete MAKE_STATE_MACHINE
            if the prerequisite's ending state was ERROR (STATE 7)
                return transition code 2
            end
        end_for_do
        if target does not exist

Fig. 13B

```
                return transition code 1
        end_if
        return transition code 0

STATE 3
    STATE THREAD check_prerequisites(target)
        set transition code to 1
        for each prerequisite of target
                if prerequisite's time stamp is newer then the target's
                then
                        set transition code to 0
                end_if
        end_for
        return transition code STATE 4
    STATE THREAD construct_target(target)
                trigger action to construct the target
                if the action completed successfully
                then
                        set transition code to 0
                else
                        set transition code to 1
                end_if_else
                return transition code STATE 5
    ENDING STATE
        success STATE 6
    ENDING STATE
        error condition

END MAKE_STATE_MACHINE
```

Fig. 14

Commands Used to Compile Binder Example.
$ cc -G -D_REENTRANT foo.c -o foo.so
$ cc gbinder.c m.c object.c shared.c -o binder.test

Fig. 15

Running Binding Service Example.
./a.out foo.so foo

Fig. 16

Sample Output from Binding Service
$ ./binder.Test foo.so foo
foo.so is bound using method shared library
shared library [foo.so]is now open
[foo.so] is BOUND
foo is not a [shared library] type
foo is bound using method shared object
Located object [foo]
[foo] is BOUND
$

Fig. 17

Simple Services.
foo.c Page 1
```
1
2   int
3   foo(char *name)
4   {
5           printf("foo: name is %s\n", name);
6           return(0);
7   }
```

Fig. 18

Registering Binding Method and Binding Arbitrary Named Representatives.
main.c Page 1

```
1    #include <stdio.h>
2
3    #include "bind.h"
4    #include "shared.h"
5    #include "object.h"
6
7
8    main(int argc, char *argv[])
9    {
10           int     i = 0;
11           char    *cp;
12           int     status = 0;
13
14           RegisterMethod(&sharedBind_f,"shared library");
15           RegisterMethod(&objectBind_f,"shared object");
16
17           for(i=1; i<argc; ++i ) {
18                   status= Bind(argv[i]);
19                   if( status & BOUND )
20                           printf("[%s] is BOUND\n", argv[i]);
21                   if( status & FOUND )
22                           printf("[%s] was located\n", argv[i]);
23           }
24   }
25
```

Fig. 19

Header File Declaring Binding Method.
object.h Page 1

```
1
2    extern bind_f_t objectBind_f;
```

Fig. 20A

Examples of Pattern, Transformation, Locate, Status and Query for a Shared Object in a Shared Library.

object.c Page 1

```
 1
 2   #include <malloc.h>
 3   #include <unistd.h>
 4   #include <dlfcn.h>
 5   #include "bind.h"
 6   #include "shared.h"
 7
 8   static int
 9   ObjectPattern(char *pattern)
10   {
11       char   *c;
12       int    l, m;
13
14       c = pattern;
15       l = strlen(pattern);
16
17       m = 0;
18
19       while( *c && l > 2 ) {
20           if( c[0] == '.' && c[1] == 's' && c[2] == 'o' )
21               m=1;
22           --l;
23           ++c;
24       }
25       return(m);
26   }
27
28   static char  *
29   ObjectTrans(char **pattern)
30   {
31       char   *newPattern;
32
33       return(*pattern);
34   }
35
```

Fig. 20B

```
36
37  static void *
38  ObjectLocate( char *token)
39  {
40      void    *handle = NULL;
41      void    *object = NULL;
42      int     index = 0;
43
44      for(index=0; index < SharedLibIndex; ++index ) {
45          handle = SharedLibHandles[index];
46          object = dlsym(handle,token);
47          if( object )
48              break;
49      }
50      if( object == NULL )
51          printf("Unable to locate object [%s]\n",token);
52      else
53          printf("Located object [%s]\n", token);
54      return(object);
55  }
56
57
58  static int
59  ObjectGstatus(gstatus_t *gstatus)
60  {
61      gstatus->value=0;
62      gstatus->entitySpecific = 0;
63      return(0);
64  }
65
66
67  static gquery_t *
68  ObjectQuery(gstatus_t *gstatus )
69  {
70      gquery_t *gquery = (gquery_t *) gstatus;
71
72      return(gquery);
73  }
74
```

Fig. 20C

```
75  bind_f_t objectBind_f = {
76          ObjectPattern,
77          ObjectTrans,
78          ObjectLocate,
79          ObjectGstatus,
80          ObjectQuery,
81          NULL
82  };
```

Fig. 21

Example of Shared Library Binding Method.
shared.h Page 1
```
1
2   extern void   *SharedLibHandles[];
3   extern int    SharedLibIndex;
4   extern bind_f_t sharedBind_f;
```

Fig. 22A

Example of Shared Library Binding Method including Pattern, Transformation, Locate, Status & Query.
shared.c Page 1
```
1
2   #include <malloc.h>
3   #include <unistd.h>
4   #include <dlfcn.h>
5   #include "bind.h"
6
7
8   void *SharedLibHandles[100];
9   int  SharedLibIndex = 0;
10
11  static int
12  SharedPattern(char *pattern)
```

Fig. 22B

```
13   {
14           char    *c;
15           int     l, m;
16   
17           c = pattern;
18           l = strlen(pattern);
19   
20           m = 1;
21   
22           while( *c && l > 2 ) {
23                   if( c[0] == '.' && c[1] == 's' && c[2] == 'o' )
24                           m=0;
25                   --l;
26                   ++c;
27           }
28           return(m);
29   }
30   
31   static char   *
32   SharedTrans(char **pattern)
33   {
34           char    *newPattern;
35   
36           if( *pattern[0] == '-' && *pattern[1] == 'l' ) {
37                   newPattern=malloc(strlen(*pattern)+3);
38                   strcpy(newPattern,*pattern);
39                   free(*pattern);
40                   *pattern=newPattern;
41           }
42           return(*pattern);
43   }
44   
45   
46   static void   *
47   SharedLocate( char *token)
48   {
49           void    *handle;
50   
51           if( access(token,F_OK)) {
```

Fig. 22C

```
52              printf("cannot locate shared library [%s]\n", token);
53              return(NULL);
54          }
55
56          if( (handle = dlopen(token,RTLD_NOW)) == NULL ) {
57              printf("cannot open shared library [%s]\n", token);
58              return(NULL);
59          }
60
61          printf("shared library [%s]is now open\n", token);
62          SharedLibHandles[SharedLibIndex] = handle;
63          ++SharedLibIndex;
64          return(token);
65      }
66
67
68      static int
69      SharedGstatus(gstatus_t *gstatus)
70      {
71          int errorCondition=0;
72
73          gstatus->value=0;
74          gstatus->entitySpecific = 0;
75          errorCondition = stat(gstatus->location,gstatus->statBuffer);
76          return(errorCondition);
77      }
78
79
80      static gquery_t *
81      SharedQuery(gstatus_t *gstatus )
82      {
83          gquery_t *gquery = (gquery_t *) gstatus;
84
85          return(gquery);
86      }
87
88      bind_f_t sharedBind_f = {
89          SharedPattern,
```

Fig. 22D

```
90          SharedTrans,
91          SharedLocate,
92          SharedGstatus,
93          SharedQuery,
94          NULL
95    };
```

Fig. 23A

Example of Data Structures Header File.
bind.h Page 1

```
1
2     typedef struct      _gstatus {
3                 char     *arbitrary;
4                 char     *expanded;
5                 char     *location;
6                 int      *value;
7                 struct stat *statBuffer;
8                 int      *entitySpecific;
9                 int      bindMethod;
10                int      status;
11    } gstatus_t;
12
13    typedef gstatus_t gquery_t;
14
15    typedef struct      _gbindf     {
16                int      (*pattern)(char *);
17                char     *(*trans)(char **);
18                void     *(*locate)(char *);
19                int      (*status)(gstatus_t *);
20                gquery_t *(*query)(gstatus_t *);
21                char     *methodName;
22    } bind_f_t;
23
24    int RegisterMethod(bind_f_t *, char *);
25    int Bind(char *);
26
27    #define UNBOUND 1
```

Fig. 23B

```
28  #define BOUND    2
29  #define FOUND    4
```

Fig. 24A

Example of Registering a Binding Service Method to Make Such Method Available to Binding Services (BSV).
gbinder.c Page 1

```
 1  #include <stdio.h>
 2  #include <malloc.h>
 3  #include "bind.h"
 4
 5  bind_f_t  *gbinders[100];
 6  int        gbindIndex = 0;
 7
 8  int
 9  RegisterMethod(bind_f_t *bindMethod, char *name)
10  {
11          char    *cp = NULL;
12
13          cp = malloc(strlen(name)+1);
14          strcpy(cp, name);
15          bindMethod->methodName = cp;
16          gbinders[gbindIndex] = bindMethod;
17          ++gbindIndex;
18  }
19
20  int
21  Bind(char *token)
22  {
23          bind_f_t    *method_f;
24          int         index = 0;
25          gstatus_t   *gstatus = NULL;
26
27          gstatus = malloc(sizeof(gstatus_t));
28          memset(gstatus,'\0',sizeof(gstatus));
29          gstatus->status    = UNBOUND;
30          gstatus->arbitrary = malloc(strlen(token)+1);
```

Fig. 24B

```
31          strcpy(gstatus->arbitrary, token);
32
33          for(index=0; index < gbindIndex; ++index ) {
34              method_f = gbinders[index];
35              if( method_f->pattern( token) != 0 ) {
36                  printf("%s is not a [%s] type\n", token,
    method_f->methodName);
37                  continue;
38              }
39              printf("%s is bound using method %s\n", token,
    method_f->methodName);
40              gstatus->bindMethod= index;
41              gstatus->status   |= BOUND;
42              gstatus->location = method_f->locate( token );
43              if( gstatus->location != NULL ) {
44                  gstatus->status |= FOUND;
45              }
46              break;
47          }
48          return( gstatus->status & BOUND );
49      }
50
```

Fig. 25A sample.c -- example program using the technology for communications

```
1   /*
2    * This is an example of registering communication points (services),
3    * and connecting to this communication points to take advantage of
4    * the service.
5    */
6
7   #include <thread.h>
8   #include <synch.h>
9   #include <stdio.h>
10  #include <errno.h>
```

Fig. 25B

```
11   #include <malloc.h>
12   #include <dlfcn.h>
13
14   #include "threadLinks.h"
15   #include "threadrw.h"
16   #include "primid.h"
17   #include "primdata.h"
18   #include "primitive.h"
19   #include "point.h"
20   #include "comreg.h"
21   #include "comdata.h"
22   #include "comframe.h"
23   #include "registery.h"
24   #include "compoints.h"
25   #include "generic.h"
26
27   char            emptyString[2] = { '\0' };
28   linkbase_t      *createdCompoints;
29   extern linkbase_t   *registeredPrimitives;
30   extern linkbase_t   *registeredCompoints;
31
32   compoint_t   *mainService;
33
34
35   /*
36    * This function permits the user to define a communication primitive
37    * available to the application.
38    *    get name of primitive
39    *    get for location of primitive
40    *    CALL primid_f.reference to establish a reference for the primitive.
41    */
42   DefineComprim()
43   {
44       primid_t    *primid;
45       char        primitiveName[BUFSIZ];
46       char        primitiveLocation[BUFSIZ];
47
48       fprintf(stdout,"please enter the name of the primitive:\n");
```

Fig. 25C

```
49          scanf(primitiveName);
50          fprintf(stdout,"please enter the location for this primitive: [NULL]\n");
51          scanf(primitiveLocation);
52          if( strcmp(primitiveLocation,"NULL")==0)
53                  primid = primid_f.reference(emptyString,primitiveName);
54          else
55                  primid = primid_f.reference(primitiveLocation,primitiveName);
56          if( primid == NULL ){
57                  fprintf(stderr,"can't reference %s from location [%s]\n",
58                                  primitiveName,
59                                  primitiveLocation);
60          }
61  }
62
63
64
65  /*
66   * This function permits the user to define a communication point available
67   * to the system. This, is an example of a Thread Directory, but this
68   * version is maintained in memory as opposed to storing in a permanent
69   * location on the disk, or other media.
70   *      get name of service
71   *      get location of service
72   *      get attributes of service
73   *              get default sender primitive
74   *              get default sender location
75   *              get default receiver primitive
76   *              get default receiver location
77   *      CALL comid_f.reference to register the service
78   */
79  DefineCompoint()
80  {
81          char    serviceName[BUFSIZ];
82          char    *serviceNamePtr;
83          char    serviceLocation[BUFSIZ];
84          char    *serviceLocationPtr;
85          char    senderName[BUFSIZ];
86          char    *senderNamePtr;
87          char    senderLocation[BUFSIZ];
```

Fig. 25D

```
88      char    *senderLocationPtr;
89      char    receiverName[BUFSIZ];
90      char    *receiverNamePtr;
91      char    receiverLocation[BUFSIZ];
92      char    *receiverLocationPtr;
93      int     errorCondition = 0;
94
95      fprintf(stderr,"Please enter the name of the service\n");
96      scanf("%s",serviceName);
97      fprintf(stderr,"Please enter the location of the service\n");
98      scanf("%s",serviceLocation);
99      if( strcmp(serviceLocation,"NULL")==0 )
100             serviceLocationPtr = emptyString;
101     else
102             serviceLocationPtr = serviceLocation;
103
104     fprintf(stderr,"Please enter the default sender primitive name:\n");
105     scanf("%s",senderName);
106     if( strcmp(senderName,"NULL")==0 )
107             senderNamePtr = emptyString;
108     else
109             senderNamePtr = senderName;
110
111     fprintf(stderr,"Please enter the default sender primitive location:\n");
112     scanf("%s",senderLocation);
113     if( strcmp(senderLocation,"NULL")==0 )
114             senderLocationPtr = emptyString;
115     else
116             senderLocationPtr = senderLocation;
117
118     fprintf(stderr,"Please enter the default receiver primitive name:\n");
119     scanf("%s",receiverName);
120     if( strcmp(receiverName,"NULL")==0 )
121             receiverNamePtr = emptyString;
122     else
123             receiverNamePtr = receiverName;
124
125     fprintf(stderr,"Please enter the default receiver primitive location:\n");
126     scanf("%s",receiverLocation);
```

Fig. 25E

```
127         if( strcmp(receiverLocation,"NULL")==0 )
128                 receiverLocationPtr = emptyString;
129         else
130                 receiverLocationPtr = receiverLocation;
131
132
133         comid_f.reference(serviceLocationPtr,serviceName,senderLocationPtr,
134 senderNamePtr,receiverLocationPtr,receiverNamePtr,S_IDLE);
135 }
136
137
138 /*
139  *
140  *  This function creates a communication point (actually establishes an
141  *  instance of the point as opposed to merely defining that the point
142  *  appears in the TDS.
143  *      get name of service
144  *      get location of service
145  *      get default sender communicaiton primitive name
146  *      get default sender communicaiton primitive location
147  *      get default receiver communicaiton primitive name
148  *      get default receiver communicaiton primitive location
149  *      CALL compoint_f.create to create the instance of the communicaiton point
150  *      CALL threadLink_f.add to add the communication point to the list of
151  *              available communication points.
152  */
153 CreateCompoint()
154 {
155         char    serviceName[BUFSIZ];
156         char    *serviceNamePtr;
157         char    serviceLocation[BUFSIZ];
158         char    *serviceLocationPtr;
159         char    senderName[BUFSIZ];
160         char    *senderNamePtr;
161         char    senderLocation[BUFSIZ];
162         char    *senderLocationPtr;
163         char    receiverName[BUFSIZ];
```

Fig. 25F

```
164     char    *receiverNamePtr;
165     char    receiverLocation[BUFSIZ];
166     char    *receiverLocationPtr;
167     int     errorCondition = 0;
168     compoint_t *compoint;
169
170     fprintf(stderr,"Please enter the name of the service\n");
171     scanf("%s",serviceName);
172     fprintf(stderr,"Please enter the location of the service\n");
173     scanf("%s",serviceLocation);
174     if( strcmp(serviceLocation,"NULL")==0 )
175         serviceLocationPtr = emptyString;
176     else
177         serviceLocationPtr = serviceLocation;
178
179     fprintf(stderr,"Please enter the default sender primitive name:\n");
180     scanf("%s",senderName);
181     if( strcmp(senderName,"NULL")==0 )
182         senderNamePtr = emptyString;
183     else
184         senderNamePtr = senderName;
185
186     fprintf(stderr,"Please enter the default sender primitive location:\n");
187     scanf("%s",senderLocation);
188     if( strcmp(senderLocation,"NULL")==0 )
189         senderLocationPtr = emptyString;
190     else
191         senderLocationPtr = senderLocation;
192
193     fprintf(stderr,"Please enter the default receiver primitive name:\n");
194     scanf("%s",receiverName);
195     if( strcmp(receiverName,"NULL")==0 )
196         receiverNamePtr = emptyString;
197     else
198         receiverNamePtr = receiverName;
199
200     fprintf(stderr,"Please enter the default receiver primitive location:\n");
201     scanf("%s",receiverLocation);
202     if( strcmp(receiverLocation,"NULL")==0 )
```

Fig. 25G

```
203             receiverLocationPtr = emptyString;
204        else
205             receiverLocationPtr = receiverLocation;
206
207
208        compoint=compoint_f.create(serviceLocationPtr,serviceName,senderLocationPtr,
209                     senderNamePtr,receiverLocationPtr,receiverNamePtr);
210
211        if( compoint == NULL ) {
212             fprintf(stderr,"failed to create the specified communication point\n");
213             return;
214        }
215        threadLink_f.add(createdCompoints,compoint);
216        return;
217   }
218
219
220   /*
221    *  this function just dumps some information about the communication
222    *  primitive for visual display.
223    */
224   PrintPrimids(void *arg)
225   {
226        primid_t    *primid = arg;
227
228        printf("Primitive:    %s\n", primid->name);
229        printf("---------------------------------\n");
230        printf("Location:     %s\n", primid->location);
231        printf("Status:            %d\n", primid->status);
232   }
233
234   /*
235    *  this function will generate a list of available communication
236    *  primitives.
237    */
238   ListPrims()
239   {
```

Fig. 25H

```
240        printf("REGISTERED COMMUNICATION PRIMITIVES\n");
241        printf("-------------------------------\n\n");
242        threadLink_f.printF(registeredPrimitives,PrintPrimids);
243        printf("-------------------------------\n\n");
244     }
245
246
247     /*
248      * this function displays useful info on a communication id, such as
249      * seriveRegistraiton name, location, sender name and location, and receiver
250      * name and location.
251      */
252     PrintComid(void *arg)
253     {
254        comid_t    *comid = arg;
255
256        printf("Service:       %s\n",comid->serviceRegistration->name);
257        printf("-------------------------------------\n");
258        printf("Loaded From:\t\t%s\n", comid->serviceRegistration->location);
259        printf("Attributes:\t\t%d\n", comid->serviceAttributes);
260        printf("Default Sender Primitive:\n");
261        printf("     Name:\t\t%s\n", comid->senderPrimitive->name);
262        printf("     Location:\t%s\n", comid->senderPrimitive->location);
263        printf("Default Receiver Primitive:\n");
264        printf("     Name:\t\t%s\n", comid->receiverPrimitive->name);
265        printf("     Location:\t%s\n", comid->receiverPrimitive->location);
266        return(0);
267     }
268
269     /*
270      * this function will generate a list of available communication points.
271      */
272
273     ListComids()
274     {
275        printf("REGISTERED COMMUNICATION POINTS\n");
276        printf("-------------------------------\n\n");
277        threadLink_f.printF(registeredCompoints,PrintComid);
```

Fig. 25I

```
278            printf("-------------------\n\n");
279
280    }
281
282
283    /*
284     * this function will display the name and location of a paritcular
285     * communicaiton primitive.
286     */
287    PrintPrimitive(void *arg)
288    {
289            primitive_t   *primitive = arg;
290
291            printf("\tName:\t\t%s\n", primitive->id->name);
292            printf("\tLocation\t%s\n", primitive->id->location);
293            return(0);
294    }
295
296    /*
297     * this function will display info on a paritcular communicaiton point.
298     */
299    PrintCompoint(void *arg)
300    {
301            compoint_t   *compoint = arg;
302            printf("Communication Point:\n");
303            printf("-----------------------------------\n");
304            printf("Name:            %s\n",
compoint->service->comid->serviceRegistration->name);
305            printf("Location:        %s\n",
compoint->service->comid->serviceRegistration->location);
306            printf("Sender Primitive List:\n");
307            threadLink_f.printF(compoint->senderList,PrintPrimitive);
308            printf("Receiver Primitive List:\n");
309            threadLink_f.printF(compoint->senderList,PrintPrimitive);
310    }
311
312    /*
313     * this function generates a list of all created communication points.
```

Fig. 25J

```
314     */
315     ListCompoints()
316     {
317             printf("CREATED COMMUNICATION POINTS\n");
318             printf("-------------------------------\n\n");
319             threadLink_f.printF(createdCompoints,PrintCompoint);
320             printf("-------------------------------\n\n");
321     }
322
323
324     /*
325      * this function will locate a particular communication point in the list
326      * of available communication points.
327      */
328     compoint_t *
329     locateCompoint(char *name, char *location)
330     {
331             link_t          *linkPtr = NULL;
332             compoint_t      *compoint = NULL;
333
334             threadLink_f.readLock(createdCompoints);
335             linkPtr = createdCompoints->head;
336             while( linkPtr != NULL ){
337                     compoint=linkPtr->data;
338                     if( strcmp(compoint->service->comid->serviceRegistration->name,
339                             name) == 0)
340                             break;
341                     linkPtr=linkPtr->forward;
342             }
343             threadLink_f.unlock(createdCompoints);
344             if( linkPtr == NULL )
345                     return(NULL);
346             return(compoint);
347     }
348
349     /*
350      * this function gives an example of using the communication manager to
351      * connect one service to another service.
352      * NOTE: Since the TDS is in main memory, there is no need to use the
```

Fig. 25K

```
353  *         communication identifers, and instead, this example illustrates
354  *         how to connect to a service just given the name and location.
355  *         For this example, the application assumes that it will establish
356  *         a generic reader thread to read the data being sent from the
357  *         service. So here is a case where the application is not connecting
358  *         the main thread, but rather, is connecting a new generic reader
359  *         thread to the service. In this case, the application requires
360  *         predefined location of the reader, but the service is dynamically
361  *         loadable through a shared library that could have been installed
362  *         after the application has already been installed. The point is
363  *         that the application could have been written with a dynamic
364  *         loadable generic reader and a dynamic loadable service without
365  *         the applicaiton knowing about either when the application was
366  *         first written.
367  */
368  ConnectService()
369  {
370          char    serviceName[BUFSIZ];
371          char    serviceLocation[BUFSIZ];
372          char    *serviceLocationPtr;
373          char    answer[BUFSIZ];
374          link_t          *linkPtr;
375          compoint_t      *compoint = NULL;
376
377          fprintf(stderr,"what service do you want to connect to?\n");
378          scanf("%s",serviceName);
379          fprintf(stderr,"where is the service located?\n");
380          scanf("%s",serviceLocation);
381          if( strcmp(serviceLocation,"NULL")==0)
382                  serviceLocationPtr = emptyString;
383          compoint = locateCompoint(serviceName,serviceLocationPtr);
384          if( compoint == NULL ) {
385                  fprintf(stderr,"sorry: service does not exist\n");
386                  return;
387          }
388          fprintf(stderr,"is this a 2-way communication? [y/n]\n");
389          scanf("%s",answer);
390          if( answer[0]=='Y' || answer[0]=='y' )
391
```

Fig. 25L

```
     generic_f.connect(compoint,mainService,CLIENT_TO_SERVICEISERVICE_TO_CLIEN
T);
392              else
393                      generic_f.connect(compoint,mainService,SERVICE_TO_CLIENT);
394  }
395
396
397  /*
398   * this function disconnects from the service.  If this is a disconnect
399   * from a 2-way service, then the application will disconnect both parties.
400   */
401  DisconnectService()
402  {
403          char     serviceName[BUFSIZ];
404          char     serviceLocation[BUFSIZ];
405          char     *serviceLocationPtr;
406          link_t   *linkPtr;
407          compoint_t  *compoint = NULL;
408          char     answer[BUFSIZ];
409
410          fprintf(stderr,"what service do you want to disconnect from?\n");
411          scanf("%s",serviceName);
412          fprintf(stderr,"where is the service located?\n");
413          scanf("%s",serviceLocation);
414          if( strcmp(serviceLocation,"NULL")==0)
415                  serviceLocationPtr = emptyString;
416          compoint = locateCompoint(serviceName,serviceLocationPtr);
417          if( compoint == NULL ) {
418                  fprintf(stderr,"sorry: service does not exist\n");
419                  return;
420          }
421          fprintf(stderr,"is this a 2-way communication? [y/n]\n");
422          scanf("%s",answer);
423          if( answer[0]=='Y' || answer[0]=='y' )
424
     generic_f.disconnect(compoint,mainService,CLIENT_FROM_SERVICEISERVICE_FRO
M_CLIENT);
425              else
426
```

Fig. 25M

```
     generic_f.disconnect(compoint,mainService,SERVICE_FROM_CLIENT);
427  }
428
429  GenericReader()
430  {
431          char    *message;
432          int     s;
433
434          generic_f.receive(mainService,&message,512,&s,0);
435          fprintf(stdout,"%s", message);
436          free(message);
437          return;
438  }
439
440  GenericSender()
441  {
442          char    buffer[BUFSIZ];
443          char    *message;
444
445          fprintf(stdout,"what message do you want\n");
446          scanf("%s", buffer);
447          message = malloc(strlen(buffer)+1);
448          generic_f.send(mainService,message,512,0);
449          return;
450  }
451
452
453
454
455  /*
456   * This is the main function describing what commands are available
457   * for this example.  The program is interactive and thus prompts
458   * you to determine what action it should follow.
459   */
460  main()
461  {
462          char    command[BUFSIZ];
463          char    verb[BUFSIZ];
464          char    noun[BUFSIZ];
```

Fig. 25N

```
465     int             runflag = 1;
466
467
468     createdCompoints = threadLink_f.create();
469
470     mainService = compoint_f.create(NULL,NULL,
471                             "threadQcond.so","threadQcond_f",
472                             "threadQcond.so","threadQcond_f");
473     if( mainService == NULL ) {
474             fprintf(stderr,"can't create main compoint\n");
475             exit(1);
476     }
477     while(runflag) {
478             printf("COMMAND:\n");
479             scanf("%s",verb);
480             if( strcmp(verb,"register")==0 ) {
481                     scanf("%s",noun);
482                     if(strcmp(noun,"compoint")==0)
483                             DefineCompoint();
484                     else if(strcmp(noun,"primitive")==0)
485                             DefineComprim();
486                     else
487                             fprintf(stderr,"Error: can't register a [%s]\n",
        noun);
488             }
489             if( strcmp(verb,"create")==0 ) {
490                     scanf("%s",noun);
491                     if(strcmp(noun,"compoint")==0)
492                             CreateCompoint();
493                     else
494                             fprintf(stderr,"Error: can't create a [%s]\n",
495                                     noun);
496             }
497             if(strcmp(verb,"list")==0) {
498                     scanf("%s",noun);
499                     if(strcmp(noun,"primitives")==0)
500                             ListPrims();
501                     else if(strcmp(noun,"comids")==0)
502                             ListComids();
```

Fig. 25O

```
503         else if(strcmp(noun,"compoints")==0)
504                 ListCompoints();
505         else
506                 fprintf(stderr,"Error: can't list a [%s]\n",
507                 noun);
508     }
509     if(strcmp(verb,"connect") == 0 ) {
510         ConnectService();
511     }
512
513     if(strcmp(verb,"disconnect")==0) {
514         DisconnectService();
515     }
516     if(strcmp(verb,"receive")==0) {
517         GenericReader();
518     }
519     if(strcmp(verb,"send")==0) {
520         GenericSender();
521     }
522
523     if(strcmp(verb,"help")==0) {
524         fprintf(stderr,"Available Commands  are:\n");
525         fprintf(stderr,"register compoint\n");
526         fprintf(stderr,"register primitive\n");
527         fprintf(stderr,"create compoint\n");
528         fprintf(stderr,"list comids\n");
529         fprintf(stderr,"list compoints\n");
530         fprintf(stderr,"list primitives\n");
531         fprintf(stderr,"connect\n");
532         fprintf(stderr,"disconnect\n");
533         fprintf(stderr,"receive\n");
534         fprintf(stderr,"send\n");
535         fprintf(stderr,"help\n");
536         fprintf(stderr,"quit\n");
537     }
538     if(strcmp(verb,"quit")==0)
539         runflag=0;
540     if(strcmp(verb,"wait")==0)
541         sleep(2);
```

Fig. 26A sample broker.data  data file contents

| | | | |
|---|---|---|---|
| 1 | ABC_MAGIC_CORP | 20 | 20+5/8 |
| 2 | DEF_MAGIC_CORP | 10 | 20+5/8 |
| 3 | GHI_MAGIC_CORP | 5 | 20+3/8 |
| 4 | JKL_MAGIC_CORP | 15 | 20+5/8 |
| 5 | MNO_MAGIC_CORP | 25 | 20+5/8 |
| 6 | PQR_MAGIC_CORP | 13 | 20+5/8 |
| 7 | STU_MAGIC_CORP | 25 | 20+5/8 |
| 8 | VWX_MAGIC_CORP | 60 | 20+1/8 |
| 9 | YZA_MAGIC_CORP | 34 | 20+5/8 |
| 10 | ABC_MAGIC_CORP | 20 | 20+1/2 |
| 11 | DEF_MAGIC_CORP | 10 | 20+1/2 |
| 12 | GHI_MAGIC_CORP | 5 | 20+3/8 |
| 13 | JKL_MAGIC_CORP | 15 | 20+3/8 |
| 14 | MNO_MAGIC_CORP | 20 | 20+3/8 |
| 15 | PQR_MAGIC_CORP | 19 | 20+1/2 |
| 16 | STU_MAGIC_CORP | 17 | 20+3/8 |
| 17 | VWX_MAGIC_CORP | 15 | 20+3/8 |
| 18 | YZA_MAGIC_CORP | 14 | 20+3/8 |
| 19 | ABC_MAGIC_CORP | 20 | 20+1/2 |
| 20 | DEF_MAGIC_CORP | 10 | 20+5/8 |
| 21 | GHI_MAGIC_CORP | 5 | 20+5/8 |
| 22 | JKL_MAGIC_CORP | 15 | 20+5/8 |
| 23 | MNO_MAGIC_CORP | 16 | 20+5/8 |
| 24 | PQR_MAGIC_CORP | 18 | 20+5/8 |
| 25 | STU_MAGIC_CORP | 21 | 20+5/8 |
| 26 | VWX_MAGIC_CORP | 41 | 20+3/4 |
| 27 | YZA_MAGIC_CORP | 64 | 20+7/8 |
| 28 | ABC_MAGIC_CORP | 20 | 20+7/8 |
| 29 | DEF_MAGIC_CORP | 10 | 20+7/8 |
| 30 | GHI_MAGIC_CORP | 5 | 21 |

Fig. 26B

| | | | |
|---|---|---|---|
| 31 | JKL_MAGIC_CORP | 15 | 21+1/2 |
| 32 | MNO_MAGIC_CORP | 78 | 21+5/8 |
| 33 | PQR_MAGIC_CORP | 62 | 21+5/8 |
| 34 | STU_MAGIC_CORP | 79 | 21+5/8 |
| 35 | VWX_MAGIC_CORP | 90 | 21+1/2 |
| 36 | ABC_MAGIC_CORP | 20 | 21+1/2 |
| 37 | DEF_MAGIC_CORP | 10 | 21+1/2 |
| 38 | GHI_MAGIC_CORP | 5 | 21+1/2 |
| 39 | JKL_MAGIC_CORP | 15 | 21+3/8 |
| 40 | MNO_MAGIC_CORP | 65 | 21+3/8 |
| 41 | PQR_MAGIC_CORP | 11 | 21+3/8 |
| 42 | STU_MAGIC_CORP | 43 | 21+3/8 |
| 43 | ABC_MAGIC_CORP | 20 | 21+1/4 |
| 44 | DEF_MAGIC_CORP | 10 | 21+1/4 |
| 45 | GHI_MAGIC_CORP | 5 | 21+1/8 |
| 46 | JKL_MAGIC_CORP | 15 | 21+1/8 |
| 47 | MNO_MAGIC_CORP | 35 | 21+1/4 |
| 48 | PQR_MAGIC_CORP | 45 | 21+1/4 |
| 49 | STU_MAGIC_CORP | 23 | 21+1/4 |
| 50 | ABC_MAGIC_CORP | 20 | 21+1/4 |
| 51 | DEF_MAGIC_CORP | 10 | 21+1/4 |
| 52 | GHI_MAGIC_CORP | 5 | 21+1/8 |
| 53 | JKL_MAGIC_CORP | 15 | 21+1/8 |
| 54 | MNO_MAGIC_CORP | 66 | 21+1/8 |
| 55 | PQR_MAGIC_CORP | 10 | 21+1/4 |
| 56 | STU_MAGIC_CORP | 15 | 21+1/4 |
| 57 | VWX_MAGIC_CORP | 11 | 21+1/4 |
| 58 | ABC_MAGIC_CORP | 20 | 21+1/8 |
| 59 | DEF_MAGIC_CORP | 10 | 21+1/8 |
| 60 | GHI_MAGIC_CORP | 5 | 21 |
| 61 | JKL_MAGIC_CORP | 15 | 21 |
| 62 | MNO_MAGIC_CORP | 66 | 21 |
| 63 | PQR_MAGIC_CORP | 70 | 21 |
| 64 | STU_MAGIC_CORP | 44 | 20+8/8 |
| 65 | VWX_MAGIC_CORP | 33 | 20+7/8 |
| 66 | YZA_MAGIC_CORP | 22 | 21 |
| 67 | ABC_MAGIC_CORP | 20 | 21 |
| 68 | DEF_MAGIC_CORP | 10 | 20+7/8 |

Fig. 26C

| | | | |
|---|---|---|---|
| 69 | GHI_MAGIC_CORP | 5 | 20+7/8 |
| 70 | JKL_MAGIC_CORP | 15 | 20+7/8 |
| 71 | MNO_MAGIC_CORP | 51 | 20+7/8 |
| 72 | PQR_MAGIC_CORP | 46 | 20+3/4 |
| 73 | STU_MAGIC_CORP | 35 | 20+7/8 |
| 74 | VWX_MAGIC_CORP | 20 | 20+7/8 |
| 75 | YZA_MAGIC_CORP | 83 | 20+7/8 |
| 76 | ABC_MAGIC_CORP | 20 | 20+7/8 |
| 77 | DEF_MAGIC_CORP | 10 | 20+7/8 |
| 78 | GHI_MAGIC_CORP | 5 | 20+7/8 |
| 79 | JKL_MAGIC_CORP | 15 | 20+3/4 |
| 80 | MNO_MAGIC_CORP | 21 | 20+3/4 |
| 81 | PQR_MAGIC_CORP | 16 | 20+3/4 |
| 82 | STU_MAGIC_CORP | 19 | 20+3/4 |
| 83 | VWX_MAGIC_CORP | 66 | 20+3/4 |
| 84 | YZA_MAGIC_CORP | 77 | 20+5/8 |
| 85 | ABC_MAGIC_CORP | 20 | 20+5/8 |
| 86 | DEF_MAGIC_CORP | 10 | 20+5/8 |
| 87 | GHI_MAGIC_CORP | 5 | 20+5/8 |
| 88 | JKL_MAGIC_CORP | 15 | 20+5/8 |
| 89 | MNO_MAGIC_CORP | 44 | 20+5/8 |
| 90 | PQR_MAGIC_CORP | 43 | 20+5/8 |
| 91 | STU_MAGIC_CORP | 22 | 20+3/4 |
| 92 | VWX_MAGIC_CORP | 99 | 20+3/4 |
| 93 | ABC_MAGIC_CORP | 20 | 20+3/4 |
| 94 | DEF_MAGIC_CORP | 10 | 20+5/8 |
| 95 | GHI_MAGIC_CORP | 5 | 20+3/4 |
| 96 | JKL_MAGIC_CORP | 15 | 20+3/4 |
| 97 | MNO_MAGIC_CORP | 78 | 20+5/8 |
| 98 | PQR_MAGIC_CORP | 54 | 20+3/4 |
| 99 | STU_MAGIC_CORP | 44 | 20+5/8 |
| 100 | ABC_MAGIC_CORP | 20 | 20+5/8 |
| 101 | DEF_MAGIC_CORP | 10 | 20+5/8 |
| 102 | GHI_MAGIC_CORP | 5 | 20+5/8 |
| 103 | JKL_MAGIC_CORP | 15 | 20+5/8 |
| 104 | MNO_MAGIC_CORP | 45 | 20+5/8 |
| 105 | PQR_MAGIC_CORP | 90 | 20+5/8 |
| 106 | STU_MAGIC_CORP | 44 | 20+5/8 |

Fig. 26D

| | | | |
|---|---|---|---|
| 107 | ABC_MAGIC_CORP | 20 | 20+5/8 |
| 108 | DEF_MAGIC_CORP | 10 | 20+5/8 |
| 109 | GHI_MAGIC_CORP | 5 | 20+1/2 |
| 110 | JKL_MAGIC_CORP | 15 | 20+1/2 |
| 111 | MNO_MAGIC_CORP | 44 | 20+1/2 |
| 112 | PQR_MAGIC_CORP | 39 | 20+3/8 |
| 113 | STU_MAGIC_CORP | 69 | 20+3/8 |
| 114 | VWX_MAGIC_CORP | 55 | 20+1/2 |
| 115 | ABC_MAGIC_CORP | 20 | 20+1/2 |
| 116 | ABC_MAGIC_CORP | 20 | 20+1/2 |
| 117 | DEF_MAGIC_CORP | 10 | 20+1/2 |
| 118 | GHI_MAGIC_CORP | 5 | 20+1/2 |
| 119 | JKL_MAGIC_CORP | 15 | 20+1/4 |
| 120 | MNO_MAGIC_CORP | 76 | 20+1/4 |
| 121 | PQR_MAGIC_CORP | 56 | 20+1/4 |
| 122 | STU_MAGIC_CORP | 35 | 20+1/8 |
| 123 | VWX_MAGIC_CORP | 44 | 20+1/8 |
| 124 | YZA_MAGIC_CORP | 21 | 20+1/8 |
| 125 | ABC_MAGIC_CORP | 20 | 20 |
| 126 | DEF_MAGIC_CORP | 10 | 19+7/8 |
| 127 | GHI_MAGIC_CORP | 5 | 19+7/8 |
| 128 | JKL_MAGIC_CORP | 15 | 19+3/4 |
| 129 | MNO_MAGIC_CORP | 41 | 19+3/4 |
| 130 | PQR_MAGIC_CORP | 11 | 19+5/8 |
| 131 | STU_MAGIC_CORP | 85 | 19+5/8 |
| 132 | VWX_MAGIC_CORP | 87 | 19+5/8 |
| 133 | YZA_MAGIC_CORP | 44 | 19+1/2 |
| 134 | ABC_MAGIC_CORP | 20 | 19+1/2 |
| 135 | DEF_MAGIC_CORP | 10 | 19+1/2 |
| 136 | GHI_MAGIC_CORP | 5 | 19+1/2 |
| 137 | JKL_MAGIC_CORP | 15 | 19+1/2 |
| 138 | MNO_MAGIC_CORP | 17 | 19+1/2 |
| 139 | PQR_MAGIC_CORP | 23 | 19+3/8 |
| 140 | STU_MAGIC_CORP | 77 | 19+1/4 |
| 141 | VWX_MAGIC_CORP | 11 | 19+1/4 |
| 142 | YZA_MAGIC_CORP | 56 | 19+1/4 |
| 143 | ABC_MAGIC_CORP | 20 | 19+1/4 |
| 144 | DEF_MAGIC_CORP | 10 | 19+3/8 |

Fig. 26E

| | | | |
|---|---|---|---|
| 145 | GHI_MAGIC_CORP | 5 | 19+1/4 |
| 146 | JKL_MAGIC_CORP | 15 | 19+1/4 |
| 147 | MNO_MAGIC_CORP | 88 | 19+1/4 |
| 148 | PQR_MAGIC_CORP | 11 | 19+3/8 |
| 149 | STU_MAGIC_CORP | 12 | 19+1/4 |
| 150 | VWX_MAGIC_CORP | 99 | 19+1/4 |
| 151 | ABC_MAGIC_CORP | 20 | 19+3/8 |
| 152 | DEF_MAGIC_CORP | 10 | 19+3/8 |
| 153 | GHI_MAGIC_CORP | 5 | 19+3/8 |
| 154 | JKL_MAGIC_CORP | 15 | 19+3/8 |
| 155 | MNO_MAGIC_CORP | 11 | 19+3/8 |
| 156 | PQR_MAGIC_CORP | 14 | 19+3/8 |
| 157 | STU_MAGIC_CORP | 82 | 19+1/4 |
| 158 | ABC_MAGIC_CORP | 20 | 19+1/4 |
| 159 | DEF_MAGIC_CORP | 10 | 19+1/4 |
| 160 | GHI_MAGIC_CORP | 5 | 19+1/4 |
| 161 | JKL_MAGIC_CORP | 15 | 19+1/4 |
| 162 | MNO_MAGIC_CORP | 22 | 19+1/8 |
| 163 | PQR_MAGIC_CORP | 78 | 19+1/8 |
| 164 | STU_MAGIC_CORP | 88 | 19+1/8 |
| 165 | ABC_MAGIC_CORP | 20 | 19+1/8 |
| 166 | DEF_MAGIC_CORP | 10 | 19+1/8 |
| 167 | GHI_MAGIC_CORP | 5 | 19+1/8 |
| 168 | JKL_MAGIC_CORP | 15 | 19 |
| 169 | MNO_MAGIC_CORP | 75 | 19 |
| 170 | PQR_MAGIC_CORP | 34 | 19 |
| 171 | STU_MAGIC_CORP | 66 | 19 |
| 172 | VWX_MAGIC_CORP | 28 | 19 |
| 173 | ABC_MAGIC_CORP | 20 | 19 |
| 174 | DEF_MAGIC_CORP | 10 | 19 |
| 175 | GHI_MAGIC_CORP | 5 | 18+7/8 |
| 176 | JKL_MAGIC_CORP | 15 | 18+7/8 |
| 177 | MNO_MAGIC_CORP | 91 | 19 |
| 178 | PQR_MAGIC_CORP | 10 | 19 |
| 179 | STU_MAGIC_CORP | 81 | 19 |
| 180 | VWX_MAGIC_CORP | 11 | 18+7/8 |
| 181 | YZA_MAGIC_CORP | 71 | 18+7/8 |
| 182 | ABC_MAGIC_CORP | 20 | 18+7/8 |

Fig. 26F

| | | | |
|---|---|---|---|
| 183 | DEF_MAGIC_CORP | 10 | 18+7/8 |
| 184 | GHI_MAGIC_CORP | 5 | 18+7/8 |
| 185 | JKL_MAGIC_CORP | 15 | 18+7/8 |
| 186 | MNO_MAGIC_CORP | 91 | 18+3/4 |
| 187 | PQR_MAGIC_CORP | 11 | 18+3/4 |
| 188 | STU_MAGIC_CORP | 82 | 18+3/4 |
| 189 | VWX_MAGIC_CORP | 22 | 18+3/4 |
| 190 | YZA_MAGIC_CORP | 73 | 18+5/8 |
| 191 | ABC_MAGIC_CORP | 20 | 18+3/4 |
| 192 | DEF_MAGIC_CORP | 10 | 18+5/8 |
| 193 | GHI_MAGIC_CORP | 5 | 18+3/4 |
| 194 | JKL_MAGIC_CORP | 15 | 18+3/4 |
| 195 | MNO_MAGIC_CORP | 91 | 18+3/4 |
| 196 | PQR_MAGIC_CORP | 82 | 18+3/4 |
| 197 | STU_MAGIC_CORP | 73 | 18+5/8 |
| 198 | VWX_MAGIC_CORP | 64 | 18+5/8 |
| 199 | YZA_MAGIC_CORP | 65 | 18+5/8 |
| 200 | ABC_MAGIC_CORP | 20 | 18+5/8 |
| 201 | DEF_MAGIC_CORP | 10 | 18+3/4 |
| 202 | GHI_MAGIC_CORP | 5 | 18+3/4 |
| 203 | JKL_MAGIC_CORP | 15 | 18+5/8 |
| 204 | MNO_MAGIC_CORP | 56 | 18+3/4 |
| 205 | PQR_MAGIC_CORP | 47 | 18+5/8 |
| 206 | STU_MAGIC_CORP | 38 | 18+3/4 |
| 207 | VWX_MAGIC_CORP | 29 | 18+3/4 |
| 208 | ABC_MAGIC_CORP | 20 | 18+5/8 |
| 209 | DEF_MAGIC_CORP | 10 | 18+5/8 |
| 210 | GHI_MAGIC_CORP | 5 | 18+5/8 |
| 211 | JKL_MAGIC_CORP | 15 | 18+5/8 |
| 212 | MNO_MAGIC_CORP | 1 | 18+5/8 |
| 213 | PQR_MAGIC_CORP | 18 | 18+1/2 |
| 214 | STU_MAGIC_CORP | 17 | 18+1/2 |
| 215 | ABC_MAGIC_CORP | 20 | 18+1/2 |
| 216 | DEF_MAGIC_CORP | 10 | 18+5/8 |
| 217 | GHI_MAGIC_CORP | 5 | 18+1/2 |
| 218 | JKL_MAGIC_CORP | 15 | 18+5/8 |
| 219 | MNO_MAGIC_CORP | 22 | 18+5/8 |

Fig. 26G

| | | | |
|---|---|---|---|
| 220 | PQR_MAGIC_CORP | 41 | 18+1/2 |
| 221 | STU_MAGIC_CORP | 34 | 18+5/8 |
| 222 | ABC_MAGIC_CORP | 20 | 18+5/8 |
| 223 | DEF_MAGIC_CORP | 10 | 18+1/2 |
| 224 | GHI_MAGIC_CORP | 5 | 18+1/2 |
| 225 | JKL_MAGIC_CORP | 15 | 18+1/2 |
| 226 | MNO_MAGIC_CORP | 66 | 18+1/2 |
| 227 | PQR_MAGIC_CORP | 45 | 18+1/2 |
| 228 | STU_MAGIC_CORP | 42 | 18+1/2 |
| 229 | VWX_MAGIC_CORP | 88 | 18+1/2 |
| 230 | ABC_MAGIC_CORP | 20 | 18+3/8 |
| 231 | ABC_MAGIC_CORP | 20 | 18+3/8 |
| 232 | DEF_MAGIC_CORP | 10 | 18+3/8 |
| 233 | GHI_MAGIC_CORP | 5 | 18+1/2 |
| 234 | JKL_MAGIC_CORP | 15 | 18+1/2 |
| 235 | MNO_MAGIC_CORP | 67 | 18+5/8 |
| 236 | PQR_MAGIC_CORP | 22 | 18+1/2 |
| 237 | STU_MAGIC_CORP | 48 | 18+5/8 |
| 238 | VWX_MAGIC_CORP | 44 | 18+5/8 |
| 239 | YZA_MAGIC_CORP | 99 | 18+1/2 |
| 240 | ABC_MAGIC_CORP | 20 | 18+1/2 |
| 241 | DEF_MAGIC_CORP | 10 | 18+5/8 |
| 242 | GHI_MAGIC_CORP | 5 | 18+5/8 |
| 243 | JKL_MAGIC_CORP | 15 | 18+5/8 |
| 244 | MNO_MAGIC_CORP | 91 | 18+5/8 |
| 245 | PQR_MAGIC_CORP | 81 | 18+1/2 |
| 246 | STU_MAGIC_CORP | 53 | 18+1/2 |
| 247 | VWX_MAGIC_CORP | 28 | 18+1/2 |
| 248 | YZA_MAGIC_CORP | 74 | 18+5/8 |
| 249 | ABC_MAGIC_CORP | 20 | 18+5/8 |
| 250 | DEF_MAGIC_CORP | 10 | 18+5/8 |
| 251 | GHI_MAGIC_CORP | 5 | 18+1/2 |
| 252 | JKL_MAGIC_CORP | 15 | 18+1/2 |
| 253 | MNO_MAGIC_CORP | 45 | 18+1/2 |
| 254 | PQR_MAGIC_CORP | 49 | 18+5/8 |
| 255 | STU_MAGIC_CORP | 99 | 18+1/2 |
| 256 | VWX_MAGIC_CORP | 67 | 18+1/2 |

Fig. 26H

| | | | |
|---|---|---|---|
| 257 | YZA_MAGIC_CORP | 55 | 18+5/8 |
| 258 | ABC_MAGIC_CORP | 20 | 18+5/8 |
| 259 | DEF_MAGIC_CORP | 10 | 18+1/2 |
| 260 | GHI_MAGIC_CORP | 5 | 18+1/2 |
| 261 | JKL_MAGIC_CORP | 15 | 18+1/2 |
| 262 | MNO_MAGIC_CORP | 45 | 18+5/8 |
| 263 | PQR_MAGIC_CORP | 23 | 18+5/8 |
| 264 | STU_MAGIC_CORP | 99 | 18+1/2 |
| 265 | VWX_MAGIC_CORP | 100 | 18+1/2 |
| 266 | ABC_MAGIC_CORP | 20 | 18+1/2 |
| 267 | DEF_MAGIC_CORP | 10 | 18+1/2 |
| 268 | GHI_MAGIC_CORP | 5 | 18+5/8 |
| 269 | JKL_MAGIC_CORP | 15 | 18+5/8 |
| 270 | MNO_MAGIC_CORP | 15 | 18+1/2 |
| 271 | PQR_MAGIC_CORP | 17 | 18+1/2 |
| 272 | STU_MAGIC_CORP | 19 | 18+5/8 |
| 273 | ABC_MAGIC_CORP | 20 | 18+5/8 |
| 274 | DEF_MAGIC_CORP | 10 | 18+1/2 |
| 275 | GHI_MAGIC_CORP | 5 | 18+5/8 |
| 276 | JKL_MAGIC_CORP | 15 | 18+1/2 |
| 277 | MNO_MAGIC_CORP | 28 | 18+1/2 |
| 278 | PQR_MAGIC_CORP | 29 | 18+1/2 |
| 279 | STU_MAGIC_CORP | 54 | 18+1/2 |
| 280 | ABC_MAGIC_CORP | 20 | 18+1/2 |
| 281 | DEF_MAGIC_CORP | 10 | 18+1/2 |
| 282 | GHI_MAGIC_CORP | 5 | 18+3/8 |
| 283 | JKL_MAGIC_CORP | 15 | 18+3/8 |
| 284 | MNO_MAGIC_CORP | 55 | 18+3/8 |
| 285 | PQR_MAGIC_CORP | 89 | 18+3/8 |
| 286 | STU_MAGIC_CORP | 48 | 18+3/8 |
| 287 | VWX_MAGIC_CORP | 38 | 18+3/8 |
| 288 | ABC_MAGIC_CORP | 20 | 18+3/8 |
| 289 | DEF_MAGIC_CORP | 10 | 18+3/8 |
| 290 | GHI_MAGIC_CORP | 5 | 18+3/8 |
| 291 | JKL_MAGIC_CORP | 15 | 18+3/8 |
| 292 | MNO_MAGIC_CORP | 67 | 18+3/8 |
| 293 | PQR_MAGIC_CORP | 54 | 18+3/8 |

Fig. 26I

| | | | |
|---|---|---|---|
| 294 | STU_MAGIC_CORP | 63 | 18+3/8 |
| 295 | VWX_MAGIC_CORP | 31 | 18+3/8 |
| 296 | YZA_MAGIC_CORP | 67 | 18+3/8 |
| 297 | ABC_MAGIC_CORP | 20 | 18+1/4 |
| 298 | DEF_MAGIC_CORP | 10 | 18+1/4 |
| 299 | GHI_MAGIC_CORP | 5 | 18+1/4 |
| 300 | JKL_MAGIC_CORP | 15 | 18+3/8 |
| 301 | MNO_MAGIC_CORP | 99 | 18+1/4 |
| 302 | PQR_MAGIC_CORP | 80 | 18+1/4 |
| 303 | STU_MAGIC_CORP | 100 | 18+3/8 |
| 304 | VWX_MAGIC_CORP | 75 | 18+3/8 |
| 305 | YZA_MAGIC_CORP | 60 | 18+1/4 |
| 306 | ABC_MAGIC_CORP | 20 | 18+1/4 |
| 307 | DEF_MAGIC_CORP | 10 | 18+3/8 |
| 308 | GHI_MAGIC_CORP | 5 | 18+3/8 |
| 309 | JKL_MAGIC_CORP | 15 | 18+1/4 |
| 310 | MNO_MAGIC_CORP | 86 | 18+1/4 |
| 311 | PQR_MAGIC_CORP | 92 | 18+1/4 |
| 312 | STU_MAGIC_CORP | 29 | 18+3/8 |
| 313 | VWX_MAGIC_CORP | 11 | 18+3/8 |
| 314 | YZA_MAGIC_CORP | 05 | 18+1/4 |
| 315 | ABC_MAGIC_CORP | 20 | 18+1/8 |
| 316 | DEF_MAGIC_CORP | 10 | 18+1/4 |
| 317 | GHI_MAGIC_CORP | 5 | 18+1/4 |
| 318 | JKL_MAGIC_CORP | 15 | 18+1/4 |
| 319 | MNO_MAGIC_CORP | 11 | 18+1/8 |
| 320 | PQR_MAGIC_CORP | 8 | 18+1/4 |
| 321 | STU_MAGIC_CORP | 19 | 18+1/4 |
| 322 | VWX_MAGIC_CORP | 13 | 18+1/4 |
| 323 | ABC_MAGIC_CORP | 20 | 18+1/4 |
| 324 | DEF_MAGIC_CORP | 10 | 18+1/4 |
| 325 | GHI_MAGIC_CORP | 5 | 18+1/4 |
| 326 | JKL_MAGIC_CORP | 15 | 18+1/4 |
| 327 | MNO_MAGIC_CORP | 21 | 18+1/8 |
| 328 | PQR_MAGIC_CORP | 28 | 18+1/4 |
| 329 | STU_MAGIC_CORP | 24 | 18+1/4 |
| 330 | ABC_MAGIC_CORP | 20 | 18+1/4 |
| 331 | DEF_MAGIC_CORP | 10 | 18+1/4 |

Fig. 26J

```
332  GHI_MAGIC_CORP      5         18+1/4
333  JKL_MAGIC_CORP     15         18+1/4
334  MNO_MAGIC_CORP     22  18+1/8
335  PQR_MAGIC_CORP      1  18+1/4
336  STU_MAGIC_CORP      5  18+1/4
337  ABC_MAGIC_CORP     20         18+1/4
338  DEF_MAGIC_CORP     10         18+1/4
339  GHI_MAGIC_CORP      5         18+1/8
340  JKL_MAGIC_CORP     15         18+1/4
341  MNO_MAGIC_CORP     19  18+1/4
342  PQR_MAGIC_CORP     21  18+1/4
343  STU_MAGIC_CORP     11  18+1/8
344  VWX_MAGIC_CORP     10  18+1/4
345  ABC_MAGIC_CORP     20  18+1/8
```

Fig. 27A

```
sample weather.data data file contents
 1  NJ  Atlantic_City       50
 2  NJ  Barnagate           51
 3  NJ  Bloomfield          55
 4  NJ  Clark               56
 5  NJ  Dover               54
 6  NJ  Flemmington             50
 7  NJ  East_Brunswick          57
 8  NJ  Englishtown         57
 9  NJ  Holmdel                 55
10  NJ  Long_Beach_Island       48
11  NJ  Longport            46
12  NJ  Lynwood                 50
13  NJ  Margate                 51
14  NJ  Matawan                 58
15  NJ  Murray_Hill         49
16  NJ  New_Brunswick           50
17  NJ  Newark                  58
18  NJ  North_Brunswick         60
```

Fig. 27B

| 19 | NJ | Northfield    | 55 |    |
|----|----|---------------|----|----|
| 20 | NJ | Ocean_City    | 50 |    |
| 21 | NJ | Old_Bridge    | 57 |    |
| 22 | NJ | Pleasantville | 52 |    |
| 23 | NJ | Pomona        |    | 51 |
| 24 | NJ | Randolph      | 57 |    |
| 25 | NJ | Somers_Point  |    | 49 |
| 26 | NJ | Summit        |    | 50 |
| 27 | NJ | Ventnor       |    | 48 |

Fig. 28 comdata.h -- communication data header file
```
1
2
3    typedef struct _comdata {
4              thread_t      id;
5              void          *handle;
6              void          *(*function)(void *);
7    } comdata_t;
8
9    typedef struct _comdata_f {
10             comdata_t     *(*create)(void);
11             int           (*destroy)(comdata_t *);
12   } comdata_f_t;
13
14   extern comdata_f_t comdata_f;
```

Fig. 29A comdata.c -- communication data module
```
1
2    #include <stdio.h>
3    #include <malloc.h>
```

Fig. 29B

```
4    #include <errno.h>
5    #include <thread.h>
6
7    #include "comdata.h"
8
9    static comdata_t *
10   Create(void)
11   {
12           comdata_t   *comdata;
13
14           comdata = malloc(sizeof(comdata_t));
15           if( comdata != NULL )
16                   memset(comdata,'\0',sizeof(comdata_t));
17           return(comdata);
18   }
19
20   static int
21   Destroy(comdata_t *comdata)
22   {
23           if( ! comdata || comdata->handle || comdata->id )
24                   return(EBUSY);
25           else
26                   free(comdata);
27           return(0);
28   }
29
30   comdata_f_t comdata_f = {
31           Create,
32           Destroy,
33   };
```

Fig. 30A compoints.h -- compoints header file Page 1

```
1
2    typedef struct _compoint {
```

Fig. 30B

```
 3            registery_t        *service;
 4            primitive_t        *receiver;
 5            primitive_t        *sender;
 6            linkbase_t         *senderList;
 7            linkbase_t         *receiverList;
 8            unsigned long      currentAttributes;
 9            rwlock_t           *rwlock;
10 } compoint_t;
11
12 typedef struct _compoint_f     {
13            compoint_t   *(*create)(char *, char *, char *, char *, char *, char *);
14            int          (*destroy)(compoint_t *);
15 } compoint_f_t;
16
17 extern compoint_f_t compoint_f;
```

Fig. 31A compoints.c -- compoints module

```
 1  #include <thread.h>
 2  #include <synch.h>
 3  #include <stdio.h>
 4  #include <errno.h>
 5  #include <malloc.h>
 6  #include <dlfcn.h>
 7
 8  #include "threadLinks.h"
 9  #include "threadrw.h"
10  #include "primid.h"
11  #include "primdata.h"
12  #include "primitive.h"
13  #include "point.h"
14  #include "comreg.h"
15  #include "comdata.h"
16  #include "comframe.h"
17  #include "registery.h"
18  #include "compoints.h"
```

Fig. 31B

```
19
20  /*
21      Communicaiton Point Module
22          Create       - creates a communication point
23      1.              in creating the communication point, use the name and
24                      location of the desired communication point in place of a
25                      communicaiton identifier. We don't need to use the TDS
26                      since this is all in main memory for this example.
27      2.              If there is a service name and/or a serviceLocation, then
28                      call the
29                              registery_f.create()
30                      to register the service.
31      3.              If there is a sender location or a sender name, then
32                      call the
33                              primitive_f.create()
34                      to establish the communicaiton primitive for the sender.
35      3.              We set the threshold to 25 min, 50 max which means for
36                      this implementation that if there are more than 50
37                      messages sent from the sender and the receiver has not
38                      yet processed these 50 messages, then suspend the sender
39                      until the receiver has a chance to digest the info. When
40                      the receiver has taken messages, and there are 25 or less
41                      messages still pending from the sender, then resume the
42                      sender.
43                      This is similar to two people talking on the phone and
44                      one person saying too much too quickly; the sending
45                      person would typically pause for awhile until the
46                      recevier has had a chance to digest some of the info.
47                      The sender can then resume.
48                      For the computer system implementation, it means that we
49                      don't have to consume too much memory while waiting for
50                      the receiver to digest the info.
51                      Next, we will load the sender primitive, if we need to,
52                      by calling the primitve_f.load() function and then add
53                      the instance of the primitive to the sender list.
54
55      4.              If there is a receiver location or a receiver name, then
56                      call the
57                              primitive_f.create()
```

Fig. 31C

```
58              to establish the communicaiton primitive for the receiver.
59              Now do the same steps as in #2) above, but this time with
60              prejudice for the receiver.
61   5.         We are now ready to establish the connection instance.
62              If a service location and name was specified, then CALL
63              the UNIX function dlopen() to open the shared library and
64              load the service providing function by the specified
65              service name.
66              If a service location was not specified, but a service
67              name was given, then load the specified service name from
68              the currently executing application program. (Still
69              calls dlopen()). The distinction herein is that a
70              service can be provided from the the application process
71              to the application process. (i.e., we don't require a
72              shared library to be installed, but the application must
73              have been compiled with the service available inside the
74              executable, or through a shared library already known to
75              the application when the application was compiled.)
76              Now that we have an open descriptor, we call the UNIX
77              dlsym() function to reference the particular named
78              service we are interested in. (This returns the location
79              of the named service). Finally, we will create the
80              sender thread and the receiver thread, if necessary.
81              This creates the two ends of the connection; one sending
82              data, and the other receiving data.
83
84
85         Destroy - destroys a communicaiton point
86   */
87   static compoint_t *
88   Create( char *serviceLocation, char *serviceName,
89           char *senderLocation, char *senderName,
90           char *receiverLocation, char *receiverName)
91   {
92           comid_t          *comid;
93           compoint_t       *compoint;
94           int              loadSender = 0;
95           int              loadReceiver = 0;
```

Fig. 31D

```
96          primitive_t   *primitive   = NULL;
97
98          if( !serviceLocation && ! serviceName && ! senderName && !receiverName)
99              return(NULL);
100
101         compoint = malloc(sizeof(compoint_t));
102         memset(compoint,'\0',sizeof(compoint_t));
103         compoint->senderList    = threadLink_f.create();
104         compoint->receiverList  = threadLink_f.create();
105         compoint->rwlock    = threadrw_f.create();
106
107         if( serviceLocation || serviceName ) {
108             compoint->service = registry_f.create(serviceLocation,
109                                                     serviceName);
110             if( compoint->service == NULL ) {
111                 free(compoint);
112                 fprintf(stderr,"service %s [%s] is not registered\n",
113                                 serviceName,serviceLocation);
114                 return(NULL);
115             }
116         }
117
118         if( senderLocation || senderName ) {
119 compoint->sender=primitive_f.create(senderLocation,senderName);
120             loadSender=1;
121         }
122         else if( compoint->service &&
123                 (compoint->service->comid->senderPrimitive->location ||
124                 compoint->service->comid->senderPrimitive->name)) {
125             compoint->sender =primitive_f.create(
126                 compoint->service->comid->senderPrimitive->location,
127                 compoint->service->comid->senderPrimitive->name);
128             loadSender=1;
129         }
130
```

Fig. 31E

```
131     if( loadSender ) {
132         compoint->sender->threshold.min = 25;
133         compoint->sender->threshold.max = 50;
134         compoint->sender->threshold.pending = 0;
135         compoint->sender->connector = compoint;
136         primitive_f.load(compoint->sender);
137         threadLink_f.add(compoint->senderList,compoint->sender);
138     }
139
140     if( receiverLocation II receiverName ) {
141         compoint->receiver = primitive_f.create(receiverLocation,
142                                                 receiverName);
143         loadReceiver = 1;
144     }
145     else if( compoint->service &&
146             (compoint->service->comid->receiverPrimitive->location II
147             compoint->service->comid->receiverPrimitive->name)) {
148         compoint->receiver = primitive_f.create(
149             compoint->service->comid->receiverPrimitive->location,
150             compoint->service->comid->receiverPrimitive->name);
151         loadReceiver = 1;
152     }
153
154     if( loadReceiver ) {
155         compoint->receiver->connector = compoint;
156         compoint->receiver->threshold.min = 25;
157         compoint->receiver->threshold.max = 50;
158         compoint->receiver->threshold.pending = 0;
159         primitive_f.load(compoint->receiver);
160         threadLink_f.add(compoint->receiverList, compoint->receiver);
161     }
162
163
164     if( compoint->service &&
165         compoint->service->comid->serviceRegistration->name &&
166         compoint->service->comid->serviceRegistration->name[0] != '\0' ) {
167
```

Fig. 31F

```
168             if(compoint->service->comid->serviceRegistration->location &&
169                 compoint->service->comid->serviceRegistration->location[0] !=
'\0') {
170                 compoint->service->comdata->handle =
dlopen(compoint->service->comid->serviceRegistration->location, RTLD_NOW);
171                 if( compoint->service->comdata->handle == NULL ) {
172                     fprintf(stderr,"error: can't dlopen(%s)\n",
173
compoint->service->comid->serviceRegistration->location);
174                     exit(1);
175                 }
176             }
177             else
178                 compoint->service->comdata->handle =
dlopen(NULL,RTLD_NOW);
179             compoint->service->comdata->function =
dlsym(compoint->service->comdata->handle,
compoint->service->comid->serviceRegistration->name);
180             if( compoint->service->comdata->function == NULL ) {
181                 fprintf(stderr,"error: can't reference %s\n",
182
compoint->service->comid->serviceRegistration->name);
183                 exit(1);
184             }
185
186             if( compoint->service->comid->serviceAttributes & S_IDLE ) {
187
thr_create(NULL,0,compoint->service->comdata->function,compoint,THR_DAEMON |
THR_SUSPENDED | THR_BOUND ,&(compoint->service->comdata->id));
188                 compoint->currentAttributes != S_IDLE;
189             }
190             else
191
thr_create(NULL,0,compoint->service->comdata->function,compoint,THR_DAEMON |
THR_BOUND,&(compoint->service->comdata->id));
192         }
193         return(compoint);
```

Fig. 31G

```
194  }
195
196  static int
197  Destroy( compoint_t *compoint )
198  {
199          primitive_f.destroy(compoint->sender);
200          threadLink_f.destroy(compoint->senderList);
201          primitive_f.destroy(compoint->receiver);
202          threadLink_f.destroy(compoint->receiverList);
203          registery_f.destroy(compoint->service);
204          threadrw_f.destroy(compoint->rwlock);
205          free(compoint);
206          return(0);
207  }
208
209  compoint_f_t compoint_f = {
210          Create,
211          Destroy,
212  };
```

Fig. 32A comreg.h -- communication registration header file Page 1

```
 1
 2
 3   #define     S_DAEMON 0x00000001 /* start service as a daemon       */
 4   #define S_BOUND       0x00000002 /* start service as bound to LWP   */
 5   #define S_THREAD      0x00000004 /* start service as a thread       */
 6   #define S_PROCESS     0x00000010 /* start service as a process      */
 7   #define     S_LOCAL     0x00000020        /* start service locally
*/
 8   #define S_REMOTE      0x00000040 /* start service remotely   */
 9   #define S_STARTABLE   0x00000080 /* service is startable     */
10   #define S_NOT_MTSAFE 0x00000100 /* service isn't multithreaded safe */
11
12   #define S_PUBLIC  0x00001000 /* service is public             */
13   #define S_PRIVATE     0x00002000 /* service is private       */
14   #define S_GEN_READER     0x00004000 /* default generic reader
connected */
15
16   #define S_SUSPENDED 0x00010000 /* service is suspended        */
17   #define S_RUNNING     0x00020000 /* service is running         */
18
19   #define S_IDLE         0x00100000 /* service is idle when not connect */
20
21   typedef struct _comid    {
22              point_t             *serviceRegistration;
23              point_t             *senderPrimitive;
24              point_t             *receiverPrimitive;
25              unsigned long       serviceAttributes;
26   } comid_t;
27
28   typedef struct _comid_f {
29              comid_t             *(*reference)(char *, char *,
30                                  char *, char *,
31                                  char *, char *,
32                                  unsigned long);
33              int                 (*unreference)(char *, char *,
```

Fig. 32B

```
34                              char *, char *,
35                              char *, char *);
36  } comid_f_t;
37
38  extern comid_f_t comid_f;
```

Fig. 33A comreg.c -- communication registration module

```
1   /*      comreg.c            */
2
3   #include <thread.h>
4   #include <synch.h>
5   #include <stdio.h>
6   #include <errno.h>
7   #include <malloc.h>
8   #include <dlfcn.h>
9
10  #include "threadLinks.h"
11  #include "threadrw.h"
12  #include "point.h"
13  #include "comreg.h"
14
15  #define     SENDER          ((unsigned short) 0x0001)
16  #define     RECEIVER        ((unsigned short) 0x0002)
17  #define     SERVICE         ((unsigned short) 0x0004)
18
19  linkbase_t   *registeredCompoints = NULL;
20
21  static int
22  compareAll( void *m, void *n)
23  {
24          int      match    = 0;
25          comid_t  *member  = m;
26          comid_t  *entry   = n;
27
28          match = compareService(member,entry) |
29                  compareSender(member,entry)  |
```

Fig. 33B

```
30            compareReceiver(member,entry);
31        return(match);
32  }
33
34
35  static int
36  compareService( void *m, void *n)
37  {
38        int       match   = 0;
39        comid_t   *member = m;
40        comid_t   *entry  = n;
41
42        match = strcmp(member->serviceRegistration->location,
43                       entry->serviceRegistration->location);
44        match |= strcmp(member->serviceRegistration->name,
45                        entry->serviceRegistration->name);
46        return(match);
47  }
48
49  static int
50  compareSender( void *m, void *n)
51  {
52        int       match   = 0;
53        comid_t   *member = m;
54        comid_t   *entry  = n;
55
56        match = strcmp(member->senderPrimitive->location,
57                       entry->senderPrimitive->location)    |
58               strcmp(member->senderPrimitive->name,
59                      entry->senderPrimitive->name)         |
60               compareService(m,n);
61        return(match);
62  }
63
64  static int
65  compareReceiver( void *m, void *n)
66  {
67        int       match   = 0;
68        comid_t   *member = m;
```

Fig. 33C

```
69          comid_t      *entry  = n;
70
71          match =
strcmp(member->receiverPrimitive->location,entry->receiverPrimitive->location) |
72
strcmp(member->receiverPrimitive->name,entry->receiverPrimitive->name) |
compareService(m,n);
73          return(match);
74      }
75
76
77      static comid_t *
78      CreateComid(char *serviceLocation, char *serviceName,
79              char *senderLocation, char *senderName,
80              char *receiverLocation,char *receiverName)
81      {
82          comid_t      *comid;
83
84          comid = malloc(sizeof(comid_t));
85          memset(comid,'\0',sizeof(comid_t));
86          comid->serviceRegistration=
point_f.create(serviceLocation,serviceName);
87          comid->senderPrimitive   = point_f.create(senderLocation, senderName);
88          comid->receiverPrimitive =
point_f.create(receiverLocation,receiverName);
89          return(comid);
90      }
91
92      static void
93      DestroyComid(void *arg)
94      {
95          comid_t      *comid = arg;
96          if( comid ) {
97              point_f.destroy(comid->serviceRegistration);
98              point_f.destroy(comid->senderPrimitive);
99              point_f.destroy(comid->receiverPrimitive);
100             free(comid);
101         }
```

Fig. 33D

```
102  }
103
104  static comid_t *
105  ReferenceComid( char *serviceLocation, char *serviceName,
106                  char *senderLocation, char *senderName,
107                  char *receiverLocation,char *receiverName,
108                  unsigned long attributes)
109  {
110      mutex_t         mutex     = { 0 };
111      comid_t         *comid    = NULL;
112      comid_t         *member   = NULL;
113      unsigned short            compareLevel = 0;
114
115      mutex_lock( &mutex );
116      if( registeredCompoints == NULL ) {
117          registeredCompoints = threadLink_f.create();
118          if(registeredCompoints == NULL) {
119              fprintf(stderr,"can't create registeredCompoints\n");
120              mutex_unlock(&mutex);
121              return(NULL);
122          }
123      }
124      mutex_unlock( &mutex);
125      comid =
CreateComid(serviceLocation,serviceName,senderLocation,senderName,
126                  receiverLocation, receiverName);
127
128      compareLevel = SERVICE;
129      if( senderLocation != NULL || senderName != NULL ) {
130          compareLevel |= SENDER;
131      }
132
133      if( receiverLocation != NULL || receiverName != NULL ) {
134          compareLevel |= RECEIVER;
135      }
136      comid->serviceAttributes = attributes;
137
```

Fig. 33E

```
138      if( (compareLevel & (SERVICE | RECEIVER | SENDER
))==(SERVICE|RECEIVER|SENDER) ) {
139             member=threadLink_f.add_c(registeredCompoints,compareAll,
140                             comid);
141      }
142
143      else if (compareLevel & RECEIVER ) {
144 member=threadLink_f.add_c(registeredCompoints,compareReceiver,
145                             comid);
146      }
147      else if (compareLevel & SENDER ) {
148             member=threadLink_f.add_c(registeredCompoints,compareSender,
149                             comid);
150      }
151      else  {
152 member=threadLink_f.add_c(registeredCompoints,compareService,
153                             comid);
154      }
155      if( member == NULL ) {
156             fprintf(stderr,"ERROR: member is NULL\n");
157             exit(1);
158      }
159      if( member != comid && threadLink_f.findFirst(registeredCompoints) !=
comid ) {
160             DestroyComid(comid);
161             comid = NULL;
162      }
163      return(member);
164 }
165
166 static int
167 UnreferenceComid(char *serviceLocation, char *serviceName,
168             char *senderLocation, char *senderName,
169             char *receiverLocation,char *receiverName)
170 {
```

Fig. 33F

```
171         comid_t     *comid;
172         comid_t     *member;
173         int         errorCondition = 0;
174         int         compareLevel  = 0;
175
176         comid = CreateComid(serviceLocation,serviceName,senderLocation,
177                         senderName, receiverLocation, receiverName);
178         compareLevel = SENDER;
179         if( senderLocation || senderName )
180                 compareLevel |= SENDER;
181         if( receiverLocation || receiverName )
182                 compareLevel |= RECEIVER;
183
184
185         if (compareLevel & (RECEIVER & SENDER ) )
186                 threadLink_f.delete_c(registeredCompoints,compareAll,
187                                 comid, DestroyComid);
188         else if (compareLevel & RECEIVER )
189                 threadLink_f.delete_c(registeredCompoints,compareReceiver,
190                                 comid, DestroyComid);
191         else if (compareLevel & SENDER )
192                 threadLink_f.delete_c(registeredCompoints,compareSender,
193                                 comid, DestroyComid);
194         else
195                 threadLink_f.delete_c(registeredCompoints,compareService,
196                                 comid, DestroyComid);
197         DestroyComid(comid);
198  }
199
200  printComid( comid_t *comid)
201  {
202         fprintf(stderr,"communication point:\n");
203         fprintf(stderr,"      service registered:\n");
204         fprintf(stderr,"            location: %s\n",
comid->serviceRegistration->location);
205         fprintf(stderr,"            name: %s\n",
comid->serviceRegistration->name);
```

Fig. 33G

```
206         fprintf(stderr,"    sender registered:\n");
207         fprintf(stderr,"        location: %s\n",
       comid->senderPrimitive->location);
208         fprintf(stderr,"        name: %s\n", comid->senderPrimitive->name);
209         fprintf(stderr,"    receiver registered:\n");
210         fprintf(stderr,"        location: %s\n",
       comid->receiverPrimitive->location);
211         fprintf(stderr,"        name: %s\n",
       comid->receiverPrimitive->name);
212         return(0);
213   }
214
215   listComids()
216   {
217         threadLink_f.printF(registeredCompoints, printComid);
218         return(0);
219   }
220
221
222   comid_f_t comid_f = {
223         ReferenceComid,
224         UnreferenceComid,
225   };
```

Fig. 34A point.h -- communicaiton point header file

```
1
2
3   typedef struct _point    {
4              char    *name;
5              char    *location;
6              int     status;
7   } point_t;
8
9
10  typedef struct _point_f {
```

Fig. 34B

```
11          point_t         *(*create)(char *, char *);
12          int             (*destroy)(point_t *);
13  } point_f_t;
14
15  extern point_f_t    point_f;
```

Fig. 35A point.c -- communication point module

```
1   #include <thread.h>
2   #include <synch.h>
3   #include <stdio.h>
4   #include <errno.h>
5   #include <malloc.h>
6   #include <dlfcn.h>
7
8
9   #include "threadLinks.h"
10  #include "threadrw.h"
11  #include "point.h"
12
13  static point_t *
14  CreatePoint(char *location, char *name)
15  {
16          point_t              *point;
17
18          point = malloc(sizeof(point_t));
19          point->name = malloc(strlen(name)+1);
20          strcpy(point->name, name);
21          point->location = malloc(strlen(location)+1);
22          if( location )
23                  strcpy(point->location, location);
24          else
25                  point->location[0]='\0';
26
27          point->status  = 0;
28          return(point);
```

Fig. 35B

```
29  }
30
31  static int
32  DestroyPoint( point_t *point )
33  {
34          if( point ) {
35                  if( point->name )
36                          free(point->name);
37                  if( point->location)
38                          free(point->location);
39                  free(point);
40          }
41          return(0);
42  }
43
44  point_f_t point_f = {
45          CreatePoint,
46          DestroyPoint,
47  };
```

Fig. 36 threadCondv.h -- thread condition variable header file Page 1
```
1
2   typedef struct _threadCondv_f   {
3                   cond_t *(*create)(void);
4                   int     (*destroy)(cond_t *);
5   } threadCondv_t;
6
7   extern threadCondv_t threadCondv_f;
```

Fig. 37A threadCondv.c -- thread condition variable module Page 1
```
1   #include <malloc.h>
2   #include <memory.h>
```

Fig. 37B

```
3   #include <synch.h>
4   #include <thread.h>
5   #include <errno.h>
6
7   #include "mthreadLog.h"
8   #include "threadCondv.h"
9
10  static cond_t    *Create(void);
11  static int       Destroy(cond_t *);
12
13  static cond_t *
14  Create(void)
15  {
16          cond_t   *condvPtr       = NULL;
17          int      errorCondition  = 0;
18
19          condvPtr = (cond_t *) malloc(sizeof(cond_t));
20          if( condvPtr == NULL )
21                  threadLog_f.setError(ENOMEM);
22          else {
23                  memset((void *)condvPtr,'\0', sizeof(cond_t));
24                  errorCondition = cond_init( condvPtr, USYNC_THREAD, NULL);
25                  if ( errorCondition ) {
26                          free((void *) condvPtr );
27                          condvPtr = NULL;
28                          threadLog_f.setError( errorCondition );
29                  }
30          }
31          return(condvPtr);
32  }
33
34  static int
35  Destroy( cond_t *condvPtr)
36  {
37          int      errorCondition = 0;
38
39          errorCondition = cond_destroy(condvPtr);
40          if( errorCondition )
```

Fig. 37C

```
41              threadLog_f.setError( errorCondition );
42          else
43              free((void *)condvPtr);
44          return( errorCondition );
45  }
46
47
48  threadCondv_t    threadCondv_f = {
49                   Create,
50                   Destroy,
51  };
```

Fig. 38 generic.h -- generic compoint header file Page 1

```
1   #define       CLIENT_TO_SERVICE    0x00000001
2   #define       SERVICE_TO_CLIENT    0x00000002
3
4   #define       CLIENT_FROM_SERVICE         0x00000001
5   #define       SERVICE_FROM_CLIENT         0x00000002
6
7   #define       CONNECT              0x00000001
8
9   #define       S_PENDING            0x00000001
10  #define       S_DUPLICATE          0x00000002
11
12  typedef struct _generic_f {
13          int    (*connect)(compoint_t *,compoint_t *,int);
14          int    (*disconnect)(compoint_t *, compoint_t *,int);
15          int    (*send)(compoint_t *, char *, int,int );
16          int    (*receive)(compoint_t *, char**,int, int *,int);
17          int    (*clear)(compoint_t *, char**,int,void *(function)(void *));
18  } generic_f_t;
19
20  extern generic_f_t generic_f;
```

Fig. 39A generic.c -- generic compoint module

```
1   #include <thread.h>
2   #include <synch.h>
3   #include <stdio.h>
4   #include <errno.h>
5   #include <malloc.h>
6   #include <dlfcn.h>
7
8   #include "threadLinks.h"
9   #include "threadrw.h"
10  #include "primid.h"
11  #include "primdata.h"
12  #include "primitive.h"
13  #include "point.h"
14  #include "comreg.h"
15  #include "comdata.h"
16  #include "comframe.h"
17  #include "registry.h"
18  #include "compoints.h"
19  #include "generic.h"
20
21  #define MIN(a)          (a->threshold.min)
22  #define MAX(a)          (a->threshold.max)
23  #define PENDING(a)      (a->threshold.pending)
24  #define RECEIVE(a)      (((primops_t_t *)a->primops)->receive)
25  #define SEND(a)         (((primops_t_t *)a->primops)->send)
26  #define COMLINK(a)      (a->data->comlink)
27  #define CONNECTID(a)    (a->connector->service->comdata->id)
28  #define SERVICEID(a)    (a->service->comdata->id)
29
30  #define         S_FAIL          0x01
31  #define         S_SUCCESS       0x02
32
33  static int
34  Disconnect(compoint_t *service, compoint_t *client, int connectionType)
35  {
36          int             errorCondition          = 0;
```

Fig. 39B

```
37      primitive_t    *senderPrimitive   = NULL;
38      primitive_t    *receiverPrimitive = NULL;
39
40      if( ! (service && client) )
41              return(EINVAL);
42
43      if( connectionType & SERVICE_FROM_CLIENT) {
44              rw_wrlock(service->rwlock);
45              rw_wrlock(client->rwlock);
46              threadLink_f.delete(service->senderList,client->receiver,NULL);
47              threadLink_f.delete(client->receiverList,service->sender,NULL);
48              --(service->sender->data->status);
49              --(client->receiver->data->status);
50              if( service->sender->data->status == 0 &&
51                  service->service->comid->serviceAttributes & S_IDLE)
52              {
53                      thr_suspend(SERVICEID(service));
54                      service->currentAttributes &= ~S_IDLE;
55              }
56              rw_unlock(service->rwlock);
57              rw_unlock(client->rwlock);
58      }
59      if( connectionType & CLIENT_FROM_SERVICE) {
60              rw_wrlock(client->rwlock);
61              rw_wrlock(service->rwlock);
62              threadLink_f.delete(client->senderList,service->receiver,NULL);
63              threadLink_f.delete(service->receiverList,client->sender,NULL);
64              --(client->sender->data->status);
65              --(service->receiver->data->status);
66              rw_unlock(client->rwlock);
67              rw_unlock(service->rwlock);
68      }
69
70      return(errorCondition);
71 }
72
73
74 static int
```

Fig. 39C

```
75  Connect(compoint_t *service, compoint_t *client, int connectionType )
76  {
77      int             errorCondition      = 0;
78      primitive_t     *senderPrimitive    = NULL;
79      primitive_t     *receiverPrimitive  = NULL;
80
81      if( ! (service && client) )
82              return(EINVAL);
83
84      if( connectionType & SERVICE_TO_CLIENT) {
85              rw_wrlock(service->rwlock);
86              rw_wrlock(client->rwlock);
87              threadLink_f.add(service->senderList,client->receiver);
88              threadLink_f.add(client->receiverList,service->sender);
89              ++(service->sender->data->status);
90              ++(client->receiver->data->status);
91              rw_unlock(service->rwlock);
92              rw_unlock(client->rwlock);
93      }
94      if( connectionType & CLIENT_TO_SERVICE ) {
95              rw_wrlock(service->rwlock);
96              rw_wrlock(client->rwlock);
97              threadLink_f.add(client->senderList,service->receiver);
98              threadLink_f.add(service->receiverList,client->sender);
99              ++(client->sender->data->status);
100             ++(service->receiver->data->status);
101             rw_unlock(service->rwlock);
102             rw_unlock(client->rwlock);
103     }
104     if( service ) {
105             rw_wrlock(service->rwlock);
106             if( service->currentAttributes & S_IDLE ) {
107                     thr_continue(SERVICEID(service));
108                     service->currentAttributes &= ~S_IDLE;
109             }
110             rw_unlock(service->rwlock);
111     }
112     return(errorCondition);
```

Fig. 39D

```
113  }
114
115
116  static int
117  Receive( compoint_t *compoint, char **buffer, int maxsize, int *size, int flags)
118  {
119          int             errorCondition = 0;
120          int             receiveCode   = 0;
121          primitive_t    *primitive = NULL;
122          link_t         *linkPtr   = NULL;
123
124          if( ! (compoint && buffer && size) ) {
125                  return(EINVAL);
126          }
127
128          rw_rdlock(compoint->rwlock);
129          threadLink_f.readLock(compoint->receiverList);
130          linkPtr = compoint->receiverList->head;
131          if( linkPtr == NULL ) {
132                  rw_unlock(compoint->rwlock);
133                  return(EINVAL);
134          }
135
136          while( linkPtr != NULL ) {
137                  primitive = (primitive_t *) linkPtr->data;
138
139                  if( ! (primitive && primitive->primops && primitive->data) ) {
140                          threadLink_f.unlock(compoint->receiverList);
141                          rw_unlock(compoint->rwlock);
142                          return(EINVAL);
143                  }
144
145                  if( primitive->data->status) {
146                          mutex_lock(primitive->mutex);
147                          if( flags & S_PENDING ) {
148                                  if( PENDING(primitive))
149
```

Fig. 39E

```
150     errorCondition=(RECEIVE(primitive))(COMLINK(primitive),
                                                buffer, maxsize,size);
151                     else
152                             receiveCode |= S_FAIL;
153                     }
154             else
155     errorCondition=(RECEIVE(primitive))(COMLINK(primitive),
156                                             buffer, maxsize,size);
157                     if( ! errorCondition ) {
158                             receiveCode |= S_SUCCESS;
159                             --(PENDING(primitive));
160                             if(PENDING(primitive)< MIN(primitive))
161                                     thr_continue(CONNECTID(primitive) );
162                     }
163                     else {
164                             receiveCode |= S_FAIL;
165                     }
166                     mutex_unlock(primitive->mutex);
167             }
168             else {
169                     receiveCode |= S_FAIL;
170             }
171             linkPtr = linkPtr->forward;
172     }
173     threadLink_f.unlock(compoint->receiverList);
174     rw_unlock(compoint->rwlock);
175     if( receiveCode & S_SUCCESS )
176             return(errorCondition);
177     else if( receiveCode & S_FAIL)
178             return(EINVAL);
179     return(errorCondition);
180 }
181
182 static int
183 Send(compoint_t *compoint, char *buffer, int size, int flags)
184 {
185
```

Fig. 39F

```
186
187     int         errorCondition = 0;
188     int         sendCode       = 0;
189     int         mutexIsLocked  = 0;
190     primitive_t *primitive     = NULL;
191     link_t      *linkPtr       = NULL;
192     void        *data          = NULL;
193
194                 /* validate parameters returning EINVAL on failure */
195     if( ! (compoint && buffer) ) {
196             return(EINVAL);
197     }
198
199     rw_rdlock(compoint->rwlock);
200     threadLink_f.readLock( compoint->senderList );
201     linkPtr   = compoint->senderList->head;
202     if( linkPtr == NULL ) {
203             rw_unlock(compoint->rwlock);
204             threadLink_f.unlock(compoint->senderList);
205             return(0);
206     }
207     if( flags & S_DUPLICATE ) {
208             data = malloc(size);
209             memcpy(data,buffer,size);
210     }
211     else
212             data = buffer;
213
214     while( linkPtr ) {
215             primitive = (primitive_t *)linkPtr->data;
216             if( ! (primitive && primitive->primops && primitive->data) )
217                     break;
218
219             errorCondition = mutex_lock(primitive->mutex);
220             if( errorCondition ) {
221                     threadLink_f.unlock(compoint->senderList);
222                     rw_unlock(compoint->rwlock);
```

Fig. 39G

```
223                    return(errorCondition);
224            }
225
226            mutexIsLocked = 1;
227            if( primitive->data->status ) {
228                    errorCondition = (SEND(primitive))(COMLINK(primitive),
229                                            data, size);
230                    if( ! errorCondition ) {
231                            ++(PENDING(primitive));
232                            if( PENDING(primitive) > MAX(primitive)){
233                                    mutex_unlock( primitive->mutex);
234                                    mutexIsLocked = 0;
235                                    rw_unlock(compoint->rwlock);
236                                    threadLink_f.unlock(compoint->senderList);
237                                    thr_suspend( SERVICEID(compoint));
238                            }
239                            sendCode |= S_SUCCESS;
240                    }
241                    else    {
242                            sendCode |= S_FAIL;
243                    }
244            }
245            else
246                    sendCode |= S_FAIL;
247
248            mutex_unlock( primitive->mutex);
249            linkPtr = linkPtr->forward;
250    }
251    if( mutexIsLocked ) {
252            mutex_unlock(primitive->mutex);
253            rw_unlock(compoint->rwlock);
254            threadLink_f.unlock(compoint->senderList);
255    }
256    if( sendCode & S_SUCCESS )
257            return(errorCondition);
258    else if(sendCode & S_FAIL) {
259            if( flags & S_DUPLICATE)
```

Fig. 39H

```
260                free(data);
261            return(EINVAL);
262        }
263        return(errorCondition);
264 }
265
266
267 int
268 Clear(compoint_t *compoint, char **buffer, int maxsize,void *(function)(void *))
269 {
270        int    s = 0;
271
272        while( Receive(compoint,buffer,maxsize,&s,S_PENDING) == 0 ) {
273            function(buffer);
274        }
275        return(0);
276 }
277
278 generic_f_t generic_f = {
279        Connect,
280        Disconnect,
281        Send,
282        Receive,
283        Clear,
284 };
```

Fig. 40A threadLinks.h -- thread link list header file

```
1  /* threadLinks.h */
2
3  #if ! defined(THREADLINKS_H)
4  #define THREADLINKS_H
5
6  #define      TRUE      0
```

Fig. 40B

```
7   #define FALSE      -1
8   #define     ADD     1
9   #define DELETE     2
10
11  typedef struct        _link {
12              struct _link   *forward;
13              struct _link   *backward;
14              void           *data;
15              unsigned long          referenceCount;
16  } link_t;
17
18
19  typedef struct        _linkbase {
20              struct _link   *head;
21              struct _link   *tail;
22              rwlock_t       *rwlock;
23  } linkbase_t;
24
25
26  typedef struct        _linkop    {
27              linkbase_t     *base;
28              int            (*function)(void *);
29              void           *data;
30              int            op_type;
31  } linkop_t;
32
33  typedef struct _threadLink_t     {
34         linkbase_t *(*create)( void );
35         int     (*destroy)( linkbase_t *);
36         int     (*writeLock)(linkbase_t *);
37         int     (*readLock)(linkbase_t *);
38         int     (*unlock)(linkbase_t *);
39         int     (*add)(linkbase_t *, void *);
40         int     (*delete)(linkbase_t *, void *, int (*destructor)(void *) );
41         void    *(*findFirst)(linkbase_t *);
42         int     (*printF)( const linkbase_t *,void (*function)() );
43         int     (*printB)( const linkbase_t *, void (*function)() );
44         void    *(*reference)( const linkbase_t *, const void *);
```

Fig. 40C

```
45      int         (*unreference)( const linkbase_t *, const void *);
46      long        (*getReference)(const linkbase_t *, const void *);
47      void        *(*op)( void *);
48      void        *(*apply)(const linkbase_t *,int (*function)(void *,void *),void *);
49  } threadlink_t;
50
51
52  extern threadlink_t threadLink_f;
53
54  #endif
```

Fig. 41A threadLinks.c -- thread link list module

```
 1  /* threadLinks.c */
 2
 3  #include <thread.h>
 4  #include <synch.h>
 5  #include <malloc.h>
 6  #include <errno.h>
 7  #include <memory.h>
 8
 9  #include "threadLinks.h"
10  #include "threadrw.h"
11  #include "mthreadLog.h"
12
13  static int        Add(linkbase_t *,void *);
14  static int        Delete(linkbase_t *,void *,int (destructor)(void *));
15  static int        Destroy(linkbase_t *);
16  static int        PrintB(const linkbase_t *,void (function)(void *) );
17  static int        PrintF(const linkbase_t *,void (function)(void *) );
18  static int        ReadLock(linkbase_t *);
19  static int        Unlock(linkbase_t *);
20  static int        Unreference(const linkbase_t *,const void *);
21  static int        WriteLock(linkbase_t *);
22  static linkbase_t *Create(void);
23  static long       Getreference(const linkbase_t *,const void *);
```

Fig. 41B

```
24  static void        *Apply(const linkbase_t *,
25                            int (function)(void *, void *),void *arg );
26  static void        *First(linkbase_t *);
27  static void        *Operation(void *);
28  static void        *Reference(const linkbase_t *,const void *);
29
30  static linkbase_t *
31  Create( void )
32  {
33          linkbase_t * linkbasePtr = NULL;
34
35          threadLog_f.setError(0);
36          linkbasePtr = (linkbase_t *) malloc(sizeof(linkbase_t));
37
38          if( linkbasePtr == NULL )
39                  threadLog_f.setError(ENOMEM);
40          else {
41                  memset(linkbasePtr,'\0',sizeof(linkbase_t));
42                  linkbasePtr->rwlock   = threadrw_f.create();
43                  if( linkbasePtr->rwlock == NULL ) {
44                          free(linkbasePtr);
45                          linkbasePtr = NULL;
46                  }
47          }
48
49          return( linkbasePtr);
50  }
51
52
53  static int
54  Destroy( linkbase_t *linkbasePtr )
55  {
56          int     errorCondition = 0;
57
58          threadLog_f.setError(0);
59          if( ! linkbasePtr ) {
60                  threadLog_f.setError(EINVAL);
61                  return(EINVAL);
```

Fig. 41C

```
62        }
63        else
64                errorCondition = threadrw_f.destroy( linkbasePtr->rwlock);
65
66        if( ! errorCondition )
67                free(linkbasePtr);
68        else
69                threadLog_f.setError(errorCondition);
70
71        return(errorCondition);
72 }
73
74
75 static int
76 WriteLock(linkbase_t *linkbasePtr )
77 {
78        int     errorCondition = 0;
79
80        if( linkbasePtr == NULL )
81                errorCondition = EINVAL;
82        else
83                errorCondition = rw_wrlock( linkbasePtr->rwlock );
84        return(errorCondition);
85 }
86
87 static int
88 ReadLock(linkbase_t *linkbasePtr )
89 {
90        int     errorCondition = 0;
91
92        if( linkbasePtr == NULL )
93                errorCondition = EINVAL;
94        else
95                errorCondition = rw_rdlock( linkbasePtr->rwlock );
96
97        return(errorCondition);
98 }
99
```

Fig. 41D

```
100  static int
101  Unlock( linkbase_t *linkbasePtr )
102  {
103          int     errorCondition = 0;
104
105          if( linkbasePtr == NULL )
106                  errorCondition = EINVAL;
107          else
108                  errorCondition = rw_unlock( linkbasePtr->rwlock );
109
110          return(errorCondition);
111  }
112
113
114  static int
115  Add(linkbase_t *linkbasePtr, void *data )
116  {
117          int     errorCondition = 0;
118          link_t  *linkPtr       = NULL;
119
120          if( linkbasePtr == NULL || data == NULL )
121                  return(EINVAL);
122
123          linkPtr = (link_t *) malloc( sizeof(link_t));
124
125          if( linkPtr == NULL )
126                  return(ENOMEM);
127          memset(linkPtr,'\0', sizeof(link_t));
128
129          linkPtr->data = data;
130
131          errorCondition = rw_wrlock( linkbasePtr->rwlock );
132          if( errorCondition )
133                  free(linkPtr);
134
135          else if( linkbasePtr->head == NULL ) {
136                  linkbasePtr->head = linkPtr;
137                  linkbasePtr->tail = linkPtr;
```

Fig. 41E

```
138         }
139
140         else {
141                 linkbasePtr->tail->forward  = linkPtr;
142                 linkPtr->backward           = linkbasePtr->tail;
143                 linkbasePtr->tail           = linkPtr;
144         }
145         (void) rw_unlock( linkbasePtr->rwlock );
146
147         return(errorCondition);
148 }
149
150
151
152 static int
153 Delete(linkbase_t *linkbasePtr, void *data, int (destructor)(void *) )
154 {
155         link_t  *linkPtr         = NULL;
156         int     errorCondition   = 0;
157
158         threadLog_f.setError(0);
159         if( linkbasePtr == NULL || data == NULL )
160                 errorCondition = EINVAL;
161         else
162                 errorCondition = rw_wrlock( linkbasePtr->rwlock );
163
164         if( errorCondition ) {
165                 threadLog_f.setError(errorCondition);
166                 return(errorCondition);
167         }
168
169         linkPtr = linkbasePtr->head;
170
171         while( linkPtr ) {
172                 if( linkPtr->data == data )
173                         break;
174                 linkPtr = linkPtr->forward;
175         }
```

Fig. 41F

```
176
177     if( linkPtr ) {
178             if( linkPtr->referenceCount != 0 )
179                     errorCondition = EBUSY;
180             else {
181                     if( linkPtr->backward )
182                             linkPtr->backward->forward= linkPtr->forward;
183
184                     if( linkPtr->forward )
185                             linkPtr->forward->backward= linkPtr->backward;
186
187                     if( linkbasePtr->tail == linkPtr )
188                             linkbasePtr->tail = linkPtr->backward;
189
190                     if( linkbasePtr->head == linkPtr )
191                             linkbasePtr->head = linkPtr->forward;
192             }
193     }
194     else
195             errorCondition = ESRCH;
196
197     (void) rw_unlock( linkbasePtr->rwlock);
198
199     if( errorCondition )
200             threadLog_f.setError(errorCondition);
201
202     if( !errorCondition && linkPtr ) {
203             if( destructor ) {
204                     errorCondition = destructor(linkPtr->data);
205                     if( ! errorCondition )
206                             free( (void *) linkPtr );
207             }
208             else
209                     free((void *)linkPtr);
210     }
211
212     return(errorCondition);
213 }
```

Fig. 41G

```
214
215   static void *
216   First( linkbase_t *linkbasePtr)
217   {
218           link_t   *linkPtr       = NULL;
219           void     *data          = NULL;
220           int      errorCondition = 0;
221
222           if( linkbasePtr == NULL ) {
223                   threadLog_f.setError(EINVAL);
224                   return(NULL);
225           }
226
227           errorCondition = rw_wrlock( linkbasePtr->rwlock );
228           linkPtr = linkbasePtr->head;
229           if( linkPtr ) {
230                   if( linkPtr->referenceCount == 0 ) {
231                           linkbasePtr->head = linkPtr->forward;
232                           data              = linkPtr->data;
233                           free(linkPtr);
234                   }
235                   else
236                           errorCondition = EBUSY;
237           }
238           (void) rw_unlock( linkbasePtr->rwlock);
239           if( errorCondition )
240                   threadLog_f.setError(errorCondition);
241           return( data );
242   }
243
244   static int
245   PrintF( const linkbase_t *linkbasePtr,void (function)(void *) )
246   {
247           int       errorCondition   = 0;
248           link_t    *linkPtr         = NULL;
249
250           if( linkbasePtr == NULL || function == NULL )
251                   return(EINVAL);
```

Fig. 41H

```
252
253         errorCondition = rw_rdlock( linkbasePtr->rwlock );
254         if( errorCondition )
255                 return(errorCondition);
256
257         linkPtr = linkbasePtr->head;
258         if( ! linkPtr ) {
259                 (void)rw_unlock(linkbasePtr->rwlock);
260                 return(ESRCH);
261         }
262
263         while( linkPtr ) {
264                 function(linkPtr->data );
265                 linkPtr = linkPtr->forward;
266         }
267
268         (void)rw_unlock( linkbasePtr->rwlock );
269
270         return( 0 );
271 }
272
273
274 static int
275 PrintB( const linkbase_t *linkbasePtr, void (function)(void *) )
276 {
277         int     errorCondition  = 0;
278         link_t  *linkPtr        = NULL;
279
280         if( linkbasePtr == NULL || function == NULL)
281                 return(EINVAL);
282
283         errorCondition = rw_rdlock( linkbasePtr->rwlock );
284         if( errorCondition )
285                 return(errorCondition);
286
287         linkPtr = linkbasePtr->tail;
288
289         while( linkPtr ) {
```

Fig. 41I

```
290                function(linkPtr->data );
291                linkPtr = linkPtr->backward;
292        }
293
294
295        (void) rw_unlock( linkbasePtr->rwlock);
296
297        return( 0 );
298 }
299
300
301 static void *
302 Reference( const linkbase_t *linkbasePtr, const void *data )
303 {
304        int     errorCondition  = 0;
305        link_t  *linkPtr = NULL;
306
307        if( linkbasePtr == NULL || data == NULL ) {
308                threadLog_f.setError(EINVAL);
309                return(NULL);
310        }
311
312        errorCondition = rw_rdlock( linkbasePtr->rwlock );
313        if( errorCondition ) {
314                threadLog_f.setError(errorCondition);
315                return(NULL);
316        }
317
318        linkPtr = linkbasePtr->head;
319
320        while( linkPtr ) {
321                if( linkPtr->data == data ) {
322                        linkPtr->referenceCount++;
323                        break;
324                }
325                linkPtr = linkPtr->forward;
326        }
327
```

Fig. 41J

```
328        rw_unlock( linkbasePtr->rwlock);
329
330        if( ! linkPtr ) {
331                threadLog_f.setError(ESRCH);
332                data = NULL;
333        }
334        return( linkPtr->data );
335 }
336
337
338 static int
339 Unreference( const linkbase_t *linkbasePtr, const void *data )
340 {
341        int     errorCondition   = 0;
342        link_t  *linkPtr = NULL;
343
344        if( linkbasePtr == NULL || data == NULL )
345                return(EINVAL);
346
347        errorCondition = rw_rdlock( linkbasePtr->rwlock );
348        if( errorCondition )
349                return( errorCondition );
350
351        linkPtr = linkbasePtr->head;
352
353        while( linkPtr ) {
354                if( linkPtr->data == data ) {
355                        linkPtr->referenceCount--;
356                        break;
357                }
358                linkPtr = linkPtr->forward;
359        }
360
361        rw_unlock( linkbasePtr->rwlock);
362
363        if( ! linkPtr )
364                errorCondition = ESRCH;
365
```

Fig. 41K

```
366             return( errorCondition );
367     }
368
369     static long
370     Getreference( const linkbase_t *linkbasePtr, const void *data )
371     {
372             int     errorCondition = 0;
373             link_t  *linkPtr        = NULL;
374             long    referenceCount  = 0;
375
376             threadLog_f.setError(0);
377             if( linkbasePtr == NULL || data == NULL ) {
378                     threadLog_f.setError(EINVAL);
379                     return(-1);
380             }
381
382             errorCondition = rw_rdlock( linkbasePtr->rwlock );
383             if( errorCondition ) {
384                     threadLog_f.setError(errorCondition);
385                     return(-1);
386             }
387
388             linkPtr = linkbasePtr->head;
389
390             while( linkPtr ) {
391                     if( linkPtr->data == data ) {
392                             referenceCount = linkPtr->referenceCount;
393                             break;
394                     }
395                     linkPtr = linkPtr->forward;
396             }
397
398             rw_unlock( linkbasePtr->rwlock);
399
400             if( ! linkPtr ) {
401                     threadLog_f.setError(ESRCH);
402                     return(-1);
403             }
```

Fig. 41L

```
404         return( referenceCount );
405 }
406
407 static void *
408 Operation( void *dataPtr )
409 {
410
411         linkop_t    *linkop;
412         int         errorCondition;
413
414         linkop = (linkop_t *) dataPtr;
415         if( linkop == NULL )
416                 return((void*)EINVAL);
417
418         if(linkop->op_type != ADD && linkop->op_type != DELETE)
419                 return((void *)EINVAL);
420
421         if( linkop->op_type == ADD )
422                 errorCondition= Add(linkop->base,
423                                     linkop->data);
424
425         else if( linkop->op_type == DELETE )
426                 errorCondition= Delete(linkop->base,
427                                        linkop->data,
428                                        linkop->function);
429
430         free(linkop);
431
432         return( (void *)errorCondition);
433 }
434
435 static void *
436 Apply( const linkbase_t *linkbasePtr,int (function)(void *, void *),void *arg )
437 {
438         int         errorCondition   = 0;
439         link_t      *linkPtr         = NULL;
440
441         if( linkbasePtr == NULL || function == NULL ) {
```

Fig. 41M

```
442             threadLog_f.setError(EINVAL);
443             return(NULL);
444         }
445
446         errorCondition = rw_rdlock( linkbasePtr->rwlock );
447         if( errorCondition ) {
448             threadLog_f.setError(errorCondition);
449             return(NULL);
450         }
451
452         linkPtr = linkbasePtr->head;
453         if( ! linkPtr ) {
454             (void)rw_unlock(linkbasePtr->rwlock);
455             threadLog_f.setError(ESRCH);
456             return(NULL);
457         }
458
459         while( linkPtr ) {
460             if( function(linkPtr->data, arg ) == 0 )
461                 break;
462             linkPtr = linkPtr->forward;
463         }
464
465         (void)rw_unlock( linkbasePtr->rwlock);
466
467         if( linkPtr != NULL )
468             return( linkPtr->data );
469         return(NULL);
470 }
471
472 threadlink_t threadLink_f = {
473         Create,
474         Destroy,
475         WriteLock,
476         ReadLock,
477         Unlock,
478         Add,
479         Delete,
```

Fig. 41N

| | |
|---|---|
| 480 | First, |
| 481 | PrintF, |
| 482 | PrintB, |
| 483 | Reference, |
| 484 | Unreference, |
| 485 | Getreference, |
| 486 | Operation, |
| 487 | Apply |
| 488 | }; |
| 489 | |

Fig. 42A mthreadLog.h Page 1

```
 1  #if ! defined(MTHREADLOG_H)
 2  #      define MTHREADLOG_H
 3
 4  typedef struct     {
 5          thread_key_t        appErrno;
 6          int                 isSet;
 7          mutex_t             mutex;
 8  } threadKey_t;
 9
10  typedef struct     {
11          char      fileName[BUFSIZ];
12          FILE     *stream;
13          int       calls;
14          mutex_t   mutex;
15          long      head;
16          long      tail;
17  } threadLog_t;
18
19  #      define HIGHWATERMARK     200
20  #      define LOWWATERMARK      100
21
22  typedef struct _threadlog_t     {
```

Fig. 42B

```
23      int     (*getError)(void);
24      int     (*hasError)(void);
25      int     (*clearError)(void);
26      void    (*setError)(const int);
27      void    (*message)(const char *, ...);
28      int     (*open)( const char *);
29      int     (*close)(void);
30      int     (*setWaterMarks)(const int, const int);
31  } threadlog_t;
32
33  extern threadlog_t  threadLog_f;
34
35  #endif
```

Fig. 43A mthreadLog.c Page 1 Mutex Thread Log Module.

```
1   #include <stdio.h>
2   #include <thread.h>
3   #include <stdarg.h>
4   #include <malloc.h>
5   #include <synch.h>
6   #include <errno.h>
7   #include <stdlib.h>
8   #include <string.h>
9   #include <unistd.h>
10
11  #include "mthreadLog.h"
12
13  static threadKey_t  threadKey  = { 0 , 0 };
14  static threadLog_t  threadLog  = { "", stderr, 0, { 0 }, 0L, 0L };
15
16  static int      HighWaterMark = HIGHWATERMARK;
17  static int      LowWaterMark  = LOWWATERMARK;
18
19  static int      ClearError(void);
20  static int      Close(void);
```

Fig. 43B

```
21  static int    GetError(void);
22  static int    HasError(void);
23  static int    Initialize(void);
24  static void   Message(const char *, ...);
25  static void   Minimize(void);
26  static int    Open(const char *);
27  static void   SetError(const int);
28  static int    SetWaterMarks(const int, const int);
29
30  static int
31  Initialize(void)
32  {
33          int     *errorCode      = NULL;
34          int      errorCondition = 0;
35
36          mutex_lock( &threadKey.mutex );
37          if( ! threadKey.isSet ) {
38                  errorCondition = thr_keycreate(&threadKey.appErrno, free);
39                  if( ! errorCondition )
40                          threadKey.isSet = 1;
41          }
42          mutex_unlock( &threadKey.mutex );
43
44          if( ! errorCondition ) {
45                  errorCode = malloc(sizeof(int));
46                  if( errorCode == NULL )
47                          errorCondition = ENOMEM;
48                  else    {
49                          *errorCode= 0;
50                          errorCondition = thr_setspecific( threadKey.appErrno,
51                                                    errorCode);
52                          if( errorCondition )
53                                  free(errorCode);
54                  }
55          }
56          return( errorCondition );
57  }
58
```

Fig. 43C

```
59
60  static int
61  GetError(void)
62  {
63          int     *errorCode = NULL;
64
65          if( threadKey.isSet )
66                  errorCode = (int *) thr_getspecific( threadKey.appErrno);
67
68          return( errorCode ? *errorCode : 0 );
69  }
70
71  static int
72  HasError(void)
73  {
74          int     *errorCode = NULL;
75
76          if( threadKey.isSet )
77                  errorCode = (int *) thr_getspecific( threadKey.appErrno);
78
79          return( errorCode != NULL ?( *errorCode ? 1 : 0) : 0 );
80  }
81
82  static int
83  ClearError(void)
84  {
85          int     *errorCode = NULL;
86
87          if( threadKey.isSet )
88                  errorCode = (int *) thr_getspecific( threadKey.appErrno );
89
90          if( errorCode != NULL )
91                  *errorCode = 0;
92
93          return(0);
94  }
95
96  static void
```

Fig. 43D

```
97   SetError(const int code)
98   {
99           int     *errorCode = NULL;
100
101          if( threadKey.isSet && Initialize() != 0 )
102                  return;
103
104          errorCode = thr_getspecific( threadKey.appErrno );
105
106          if( errorCode == NULL ) {
107                  if( Initialize() != 0 )
108                          return;
109                  errorCode = thr_getspecific( threadKey.appErrno );
110          }
111          *errorCode = code;
112          return;
113  }
114
115  static void
116  Message(const char *format, ...)
117  {
118          va_list         args;
119          int     *errorCode = NULL;
120
121          if( format == NULL )
122                  return;
123
124          mutex_lock( &threadLog.mutex );
125
126          if( threadLog.stream != stderr ) {
127                  ++threadLog.calls;
128                  if( threadLog.calls == LowWaterMark )
129                          threadLog.head = ftell( threadLog.stream);
130
131                  if( threadLog.calls == HighWaterMark ) {
132                          threadLog.tail = ftell(threadLog.stream) -1L;
133                          Minimize();
```

Fig. 43E

```
134             }
135         }
136
137         va_start(args, format);
138         fprintf(threadLog.stream,"Thread [%d]: ", thr_self());
139         vfprintf(threadLog.stream, format, args);
140         va_end(args);
141
142         if( threadKey.isSet ) {
143             errorCode =(int *) thr_getspecific(threadKey.appErrno);
144             if( errorCode != NULL && *errorCode != 0)
145                 fprintf(threadLog.stream,"Error [%u].",*errorCode);
146         }
147         fprintf(threadLog.stream, "\n");
148         mutex_unlock( &threadLog.mutex );
149         return;
150 }
151
152 static int
153 Open( const char *fileName)
154 {
155     int    errorCondition = 0;
156
157     mutex_lock( &threadLog.mutex );
158
159     if( threadLog.stream != stderr )
160         errorCondition = EAGAIN;
161
162     else if( fileName != NULL ) {
163         threadLog.stream = fopen(fileName,"w+");
164         if( threadLog.stream != NULL ) {
165 threadLog_f.setWaterMarks(LOWWATERMARK,HIGHWATERMARK);
166             strcpy(threadLog.fileName, fileName);
167             threadLog.calls = 0;
168             threadLog.head  = 0;
169             threadLog.tail  = 0;
```

Fig. 43F

```
170              }
171         else
172              errorCondition = -1;
173         }
174    else
175         threadLog.stream = stderr;
176
177    mutex_lock( &threadLog.mutex );
178    return(errorCondition);
179 }
180
181 static void
182 Minimize(void)
183 {
184    int     fdr;
185    int     fdw;
186    int     count;
187    char    buffer[1024];
188
189
190    fseek( threadLog.stream, threadLog.head, SEEK_SET);
191    fdr = fileno(threadLog.stream);
192
193    unlink( threadLog.fileName);
194
195    threadLog.stream = fopen(threadLog.fileName,"w+");
196    fdw = fileno(threadLog.stream);
197
198    while( (count = read(fdr,buffer,1024)) > 0 )
199         write(fdw, buffer, count);
200
201    close(fdr);
202    threadLog.head    = 0;
203    threadLog.calls   = 0;
204    threadLog.tail    = 0;
205 }
206
```

Fig. 43G

```
207  static int
208  Close(void)
209  {
210          int     errorCondition = 0;
211
212          mutex_lock( &threadLog.mutex);
213          if( threadLog.stream != stderr) {
214                  errorCondition   = fclose(threadLog.stream);
215                  threadLog.stream = stderr;
216          }
217          mutex_unlock( &threadLog.mutex);
218          return(errorCondition);
219  }
220
221  static int
222  SetWaterMarks(const int lowWaterMark, const int highWaterMark )
223  {
224          if( lowWaterMark > highWaterMark )
225                  return(EINVAL);
226
227          mutex_lock( &threadLog.mutex );
228          LowWaterMark  = lowWaterMark;
229          HighWaterMark = highWaterMark;
230          mutex_unlock( &threadLog.mutex );
231          return(0);
232  }
233
234  threadlog_t  threadLog_f = {
235          GetError,
236          HasError,
237          ClearError,
238          SetError,
239          Message,
240          Open,
241          Close,
242          SetWaterMarks
243  };
```

Fig. 44 threadMutex.h -- thread mutex header file Page 1

```
1   typedef struct _threadMutex_f   {
2           mutex_t *(*create)(void);
3           mutex_t *(*createLocked)(void);
4           int     (*destroy)(mutex_t *);
5   } threadMutex_t;
6
7   extern threadMutex_t threadMutex_f;
```

Fig. 45A threadMutex.c -- thread mutex auxiliary functions Page 1

```
1   #include <malloc.h>
2   #include <memory.h>
3   #include <synch.h>
4   #include <thread.h>
5   #include <errno.h>
6
7   #include "mthreadLog.h"
8   #include "threadMutex.h"
9
10  static mutex_t    *Create(void);
11  static mutex_t    *CreateLocked(void);
12  static int        Destroy(mutex_t *);
13
14  static mutex_t    *
15  Create(void)
16  {
17          mutex_t    *mutexPtr       = NULL;
18          int        errorCondition  = 0;
19
20          mutexPtr = (mutex_t *) malloc(sizeof(mutex_t));
21          if( mutexPtr == NULL )
22                  threadLog_f.setError(ENOMEM);
23          else {
```

Fig. 45B

```
24          memset((void *)mutexPtr,'\0', sizeof(mutex_t));
25          errorCondition = mutex_init( mutexPtr, USYNC_THREAD, NULL);
26          if ( errorCondition ) {
27                  free((void *) mutexPtr );
28                  mutexPtr = NULL;
29                  threadLog_f.setError( errorCondition );
30          }
31      }
32      return(mutexPtr);
33  }
34
35  static mutex_t *
36  CreateLocked(void)
37  {
38      mutex_t    *mutexPtr = NULL;
39      int        errorCondition = 0;
40
41      mutexPtr = Create();
42      if ( mutexPtr ) {
43          errorCondition = mutex_lock( mutexPtr );
44          if( errorCondition ) {
45                  free( (void *)mutexPtr);
46                  mutexPtr = NULL;
47                  threadLog_f.setError( errorCondition );
48          }
49      }
50      return(mutexPtr);
51  }
52
53  static int
54  Destroy( mutex_t *mutexPtr)
55  {
56      int    errorCondition = 0;
57
58      errorCondition = mutex_destroy(mutexPtr);
59      if( errorCondition )
60              threadLog_f.setError( errorCondition );
61      else
```

Fig. 45C

```
62              free((void *)mutexPtr);
63          return( errorCondition );
64     }
65
66     threadMutex_t    threadMutex_f = {
67                      Create,
68                      CreateLocked,
69                      Destroy,
70     };
```

Fig. 46A prims.h -- communication primitive header file Page 1

```
1      /*          prims.h            */
2
3
4
5
6      typedef struct _primops_f {
7                    void    (*create)(void);
8                    int     (*destroy)(void *);
9                    int     (*send)(void *, void *, int );
10                   int     (*receive)(void *, void *,const int, int *);
11     } primops_f_t;
12
13
14     typedef struct _threshhold {
15                   unsigned long    pending;
16                   unsigned long    max;
17                   unsigned long    min;
18     } threadhold_t;
19
20     typedef struct _primitive  {
21                   primid_t         *id;
```

Fig. 46B

```
22                      primdata_t         *data;
23                      primops_f_t        *primops;
24                      threadhold_t       threshold;
25                      struct _compoint   *connector;
26                      mutex_t                    *mutex;
27   } primitive_t;
28
29   typedef struct _primitive_f {
30                      primitive_t        *(*create)(char *,char *);
31                      int                (*destroy)(primitive_t *);
32                      int                (*load)(primitive_t *);
33                      int                (*unload)(primitive_t *);
34   } primitive_f_t;
35
36   extern primitive_f_t primitive_f;
```

Fig. 47A prims.c -- communication primitive module

```
 1   /*      prims.c                */
 2
 3   #include <thread.h>
 4   #include <synch.h>
 5   #include <stdio.h>
 6   #include <errno.h>
 7   #include <malloc.h>
 8   #include <dlfcn.h>
 9
10   #include "threadMutex.h"
11   #include "threadLinks.h"
12   #include "threadrw.h"
13   #include "primid.h"
14   #include "primdata.h"
15   #include "primitive.h"
16   #include "point.h"
17   #include "comreg.h"
18   #include "comdata.h"
```

Fig. 47B

```
19  #include "comframe.h"
20  #include "registry.h"
21  #include "compoints.h"
22
23  static primitive_t *
24  Create(char *location, char *name)
25  {
26          primitive_t *primitive;
27
28          primitive     = malloc(sizeof(primitive_t));
29          memset(primitive,'\0',sizeof(primitive_t));
30          primitive->id   = primid_f.reference(location,name);
31          primitive->data = primdata_f.create();
32          primitive->mutex= threadMutex_f.create();
33          return(primitive);
34  }
35
36  static int
37  Destroy(primitive_t *primitive)
38  {
39          primid_f.unreference( ((primid_t *)primitive->id)->location,
40                                ((primid_t *)primitive->id)->name);
41          primdata_f.destroy(primitive->data);
42          threadMutex_f.destroy(primitive->mutex);
43          free(primitive);
44  }
45
46  static int
47  Load(primitive_t *primitive)
48  {
49          int             errorCondition = 0;
50
51          if( ((primid_t *)primitive->id)->name == NULL ) {
52                  fprintf(stderr,"primitive.Load() name is not defined\n");
53                  return(EINVAL);
54          }
55          rw_wrlock( ((primdata_t *)primitive->data)->rwlock);
```

Fig. 47C

```
56      ((primdata_t *)primitive->data)->handle = dlopen(((primid_t *)primitive->id)->location,
57                              RTLD_LAZY);
58      if( ((primdata_t *)primitive->data)->handle == NULL ) {
59              fprintf(stderr,"        %s\n", dlerror());
60              fprintf(stderr,"error: can't open [%s]\n", ((primid_t *)primitive->id)->location);
61              errorCondition = EINVAL;
62      }
63      else    {
64              primitive->primops = dlsym(((primdata_t *)primitive->data)->handle, ((primid_t *)primitive->id)->name);
65              if( primitive->primops == NULL ) {
66                      fprintf(stderr,"prims.Load() can't locate symbol [%s]\n", ((primid_t *)primitive->id)->name);
67                      errorCondition = EINVAL;
68              }
69      }
70      if( ! errorCondition ) {
71              ((primdata_t *)(primitive->data))->comlink = (((primops_f_t *)primitive->primops)->create)();
72      }
73      rw_unlock( ((primdata_t *)primitive->data)->rwlock);
74      rw_rdlock( ((primdata_t *)primitive->data)->rwlock);
75      return(errorCondition);
76 }
77
78 static int
79 Unload(primitive_t *primitive)
80 {
81      int errorCondition = 0;
82
83      rw_wrlock(((primdata_t *)primitive->data)->rwlock);
84      dlclose(((primdata_t *)primitive->data)->handle);
85      rw_unlock(((primdata_t *)primitive->data)->rwlock);
86      return(errorCondition);
87 }
88
```

Fig. 47D

```
89
90  primitive_f_t  primitive_f  = {
91                    Create,
92                    Destroy,
93                    Load,
94                    Unload,
95  };
```

Fig. 48 primdata.h -- communication primitive data header file Page 1

```
1   /*      primdata.h          */
2
3   typedef struct _primdata {
4                   rwlock_t     *rwlock;
5                   void         *handle;
6                   void         *comlink;
7                   void         *private;
8                   int          status;
9   } primdata_t;
10
11
12  typedef struct _primdata_f {
13                  primdata_t   *(*create)(void);
14                  int          (*destroy)(primdata_t *);
15  } primdata_f_t;
16
17  extern primdata_f_t primdata_f;
```

Fig. 49A primdata.c -- communication primitive data module

```
1
2
3   #include <thread.h>
4   #include <synch.h>
```

Fig. 49B

```
5   #include <stdio.h>
6   #include <errno.h>
7   #include <malloc.h>
8   #include <dlfcn.h>
9
10  #include "threadLinks.h"
11  #include "threadrw.h"
12  #include "primdata.h"
13
14
15  static primdata_t *
16  Create()
17  {
18          primdata_t   *primdata;
19
20          primdata = malloc(sizeof(primdata_t));
21          memset(primdata,'\0',sizeof(primdata_t));
22          primdata->rwlock = threadrw_f.create();
23          return(primdata);
24  }
25
26  static int
27  Destroy(primdata_t *primdata)
28  {
29          int     errorCondition = 0;
30
31          errorCondition = threadrw_f.destroy(primdata->rwlock);
32          if( ! errorCondition )
33                  free(primdata);
34          return(errorCondition);
35  }
36
37  primdata_f_t primdata_f = {
38                       Create,
39                       Destroy,
40  };
```

Fig. 50 thread queue condition module header file Page 1

```
1   /*                  threadQcond.h                    */
2
3   typedef struct _qmember {
4               void        *data;
5               int         size;
6               struct _qmember    *next;
7       }
8   qmember_t;
9
10  typedef struct _qcond_t {
11              mutex_t     *mutex;
12              cond_t      *condition;
13              qmember_t   *queueHead;
14              qmember_t   *queueTail;
15      }
16  qcond_t;
17
18
19  typedef struct _threadQcond_t   {
20              void    *(*create)(void);
21              int     (*destroy)(void *);
22              int     (*send)(void *, void *, int );
23              int     (*receive)(void *, void **,const int, int *);
24  } threadQcond_t;
25
26
27  extern threadQcond_t    threadQcond_f;
```

Fig. 51A thread queue condition module Page 1

```
1   /*              threadQcond.c               */
2
3   #include <synch.h>
```

Fig. 51B

```
4    #include <malloc.h>
5    #include <memory.h>
6    #include <errno.h>
7
8    #include "threadCondv.h"
9    #include "threadMutex.h"
10   #include "threadQcond.h"
11   #include "mthreadLog.h"
12
13   static void *
14   Create(void)
15   {
16           qcond_t    *qcond;
17
18           qcond  = (qcond_t *) malloc(sizeof(qcond_t));
19
20           if ( qcond == NULL ) {
21                   return(NULL);
22           }
23
24           (void) memset(qcond, '\0', sizeof(qcond_t));
25           qcond->mutex     = threadMutex_f.create();
26           qcond->condition = threadCondv_f.create();
27
28           if ( qcond->mutex == NULL || qcond->condition == NULL) {
29                   if( qcond->condition )
30                           threadCondv_f.destroy(qcond->condition);
31
32                   if( qcond->mutex )
33                           threadMutex_f.destroy(qcond->mutex);
34
35                   free( (void *) qcond );
36                   qcond = NULL;
37           }
38           return(qcond);
39   }
40
41
```

Fig. 51C

```
42  static int
43  Destroy(void *primitive)
44  {
45          int       errorCondition = 0;
46          qcond_t   *qcond          = primitive;
47
48          if( qcond == NULL )
49                  return(EINVAL);
50
51          errorCondition = threadMutex_f.destroy( qcond->mutex );
52          if( errorCondition )
53                  return(errorCondition);
54
55          errorCondition = threadCondv_f.destroy(qcond->condition);
56          if( ! errorCondition ) {
57                  free((void *)qcond->condition);
58                  free((void *)qcond->mutex);
59                  free((void *)qcond);
60          }
61
62          return( errorCondition );
63  }
64
65  static int
66  Receive( void *primitive, void **data, const int maxsize, int *size)
67  {
68          qmember_t *qmember= NULL;
69          int                errorCondition = 0;
70          qcond_t            *qcond = primitive;
71
72          if( qcond == NULL ) {
73                  return(NULL);
74          }
75
76          errorCondition = mutex_lock( qcond->mutex );
77
78          if( ! errorCondition ) {
```

Fig. 51D

```
79        while( qcond->queueHead == NULL ) {
80              errorCondition = cond_wait( qcond->condition,
81                                          qcond->mutex);
82              if( errorCondition ) {
83                      (void)mutex_unlock( qcond->mutex );
84                      break;
85              }
86        }
87        if( ! errorCondition ) {
88              qmember = qcond->queueHead;
89              if( qmember->size > maxsize )
90                      errorCondition = EINVAL;
91              else {
92                      *data  = qmember->data;
93                      *size  = qmember->size;
94              }
95              if( qcond->queueHead == qcond->queueTail )
96                      qcond->queueTail = NULL;
97
98              qcond->queueHead = qmember->next;
99              free( qmember );
100             (void) mutex_unlock( qcond->mutex);
101       }
102   }
103
104       return( errorCondition );
105 }
106
107
108 static int
109 Send( void *primitive, void *data, int size)
110 {
111       int             errorCondition = 0;
112       qmember_t       *qmember;
113       qcond_t         *qcond = primitive;
114
115       if( qcond == NULL || data == NULL)
```

Fig. 51E

```
116            return(EINVAL);
117
118            errorCondition = mutex_lock( qcond->mutex );
119
120            if( ! errorCondition ) {
121                    qmember = (qmember_t *)malloc(sizeof(qmember_t));
122                    if( ! qmember ) {
123                            (void) mutex_unlock(qcond->mutex);
124                            return(ENOMEM);
125                    }
126                    memset(qmember,'\0',sizeof(qmember_t));
127                    qmember->data = data;
128                    qmember->size = size;
129                    qmember->next = NULL;
130
131                    if( ! qcond->queueHead ) {
132                            qcond->queueHead = qmember;
133                            qcond->queueTail = qmember;
134                    }
135                    else {
136                            qcond->queueTail->next = qmember;
137                            qcond->queueTail      = qmember;
138                    }
139                    cond_signal(qcond->condition);
140                    (void)mutex_unlock(qcond->mutex);
141            }
142
143            return(errorCondition);
144    }
145
146    threadQcond_t    threadQcond_f = {
147            Create,
148            Destroy,
149            Send,
150            Receive
151    };
```

Fig. 52 registry.h header file

```
1
2   typedef struct _registery {
3            comid_t      *comid;
4            comdata_t    *comdata;
5   } registery_t;
6
7   typedef struct _registery_f {
8            registery_t  *(*create)(char *, char *);
9            int          (*destroy)(registery_t *);
10  } registery_f_t;
11
12  extern registery_f_t registery_f;
```

Fig. 53A registery.c module

```
1   #include <stdio.h>
2   #include <malloc.h>
3   #include <errno.h>
4   #include <thread.h>
5
6   #include "point.h"
7   #include "comreg.h"
8   #include "comdata.h"
9   #include "registery.h"
10
11  static registery_t *
12  Create(char *location, char *name)
13  {
14           registery_t *registery;
15
16           registery = malloc(sizeof(registery_t));
17           memset(registery,'\0',sizeof(registery_t));
18
```

Fig. 53B registery->comid=comid_f.reference(location,name,NULL,NULL,NULL,NULL,0);
```
19          registery->comdata= comdata_f.create();
20          return(registery);
21  }
22
23  static int
24  Destroy(registery_t *registery)
25  {
26          if( registery->comid) {
27
```
comid_f.unreference(registery->comid->serviceRegistration->location,registery->comid->serviceRegistration->name,NULL,NULL,NULL,NULL);
```
28          }
29          if( registery->comdata)
30                  comdata_f.destroy(registery->comdata);
31          free(registery);
32          return(0);
33  }
34
35  registery_f_t registery_f = {
36          Create,
37          Destroy,
38  };
```

Fig. 54A service.c -- example minor services to be connected by the main program.
    module communication services
```
1
2   #include <thread.h>
3   #include <synch.h>
4   #include <stdio.h>
5   #include <errno.h>
6   #include <malloc.h>
7   #include <dlfcn.h>
```

Fig. 54B

```
8
9   #include "threadLinks.h"
10  #include "threadrw.h"
11  #include "primid.h"
12  #include "primdata.h"
13  #include "primitive.h"
14  #include "point.h"
15  #include "comreg.h"
16  #include "comdata.h"
17  #include "comframe.h"
18  #include "registry.h"
19  #include "compoints.h"
20  #include "generic.h"
21
22  /*
23   * this is an example of service provider.  It is simple and probably not
24   * extremely useful, but it illustrates the concepts.  The first service is
25   * called "weatherService" and its location, for this example, is in the
26   * shared library called "service.so"  The weather service reads state, city,
27   * and temperatures from a data file, and will broadcast them to the receiving
28   * party.  Note that once the weather service is started, it will remain
29   * running until the application tells the communication manager to terminate
30   * it.  For this example, the weather service will repeat the same temps
31   * over again once it hit the end of the data file.  Since we are not
32   * attempting to patent the weather service, this the reported data is not
33   * necessary useful. again, however, the concept is.  The broker weather
34   * service uses a generic sender method to send the data.
35   */
36  void *
37  weatherService(void *arg)
38  {
39          FILE            *fp             = NULL;
40          compoint_t      *weatherControl = arg;
41          char            city[BUFSIZ];
42          char            state[BUFSIZ];
43          char            temp[BUFSIZ];
44          char            *cp;
45          char            *message;
```

Fig. 54C

```
46          int         s;
47          int         msize;
48
49          fprintf(stderr,"weather service is starting...\n");
50          if( weatherControl == NULL ) {
51                  fprintf(stderr,"weather service stopped. no compoint\n");
52                  thr_exit(0);
53          }
54
55          fp = fopen("weather.data","r");
56          do      {
57                  while( fscanf(fp,"%s %s %s", state, city, temp) > 0 ) {
58                          msize = strlen(state)+strlen(city)+strlen(temp)+40;
59                          message = malloc(msize);
60                          memset(message,'\0',msize);
61                          sprintf(message,"%s, %s:  %s\n",city,state,temp);
62                          if( generic_f.send(weatherControl,message,msize,0) ) {
63                                  free(message);
64                          }
65                  }
66                  rewind(fp);
67          } while ( strcmp(cp,"QUIT") != 0 );
68          thr_exit(0);
69  }
70
71
72  /*
73   * this is an example of service provider. It is simple and probably not
74   * extremely useful, but it illustrates the concepts. The service is
75   * called "brokerService" and its location, for this example, is in the
76   * shared library called "service.so"  The broker service symbol, shares,
77   * and price from a data file, and will use a generic sender to send the
78   * data to the receiving party. Note that once the broker service is
79   * started, it will remain running until the application tells the
80   * communication manager to terminate it.  For this example, the broker
81   * service will repeat the same data over again once it hit the end of the
82   * data file. Since we are not
83   * attempting to patent the broker service, this the reported data is not
```

Fig. 54D

```
84      * necessary useful. again, however, the concept is.
85      */
86      void *
87      brokerService(void *arg)
88      {
89              FILE            *fp             = NULL;
90              compoint_t      *BrokerControl  = arg;
91              char            shares[BUFSIZ];
92              char            symbol[BUFSIZ];
93              char            price[BUFSIZ];
94              char            *cp;
95              char            *message;
96              int             s;
97              int             msize;
98
99              fprintf(stderr,"Broker Service starting....\n");
100             if( BrokerControl->sender == NULL ) {
101                     fprintf(stderr,"Broker service stopped. no sender \n");
102                     thr_exit(0);
103             }
104             fp = fopen("broker.data","r");
105             do      {
106                     while( fscanf(fp,"%s %s %s", symbol, shares, price) > 0 ) {
107                             msize = strlen(symbol)+strlen(shares)+strlen(price)+40;
108                             message = malloc(msize);
109                             memset(message,'\0',msize);
110                             sprintf(message,"Company: [%s]\tshares: [%s]\tprice: [%s]\n", symbol,shares,price);
111                             if( generic_f.send(BrokerControl,message,msize,0)) {
112                                     free(message);
113                             }
114                     }
115                     rewind(fp);
116             } while ( strcmp(cp,"QUIT") != 0 );
117             thr_exit(0);
118     }
119
```

Fig. 55 threadrw.h -- thread reader - writer lock header Page 1
```
1   /* threadrw.h */
2
3   #define READER   1
4   #define WRITER   2
5
6   typedef struct _threadrw_t    {
7               rwlock_t      *(*create)(void);
8               rwlock_t      *(*createLocked)(const int);
9               int           (*destroy)(rwlock_t *);
10  } threadrw_t;
11
12  extern threadrw_t threadrw_f;
```

Fig. 56A threadrw.c -- thread reader - writer lock module Page 1
```
1   /* threadrw.c     */
2
3   #include <errno.h>
4   #include <malloc.h>
5   #include <memory.h>
6   #include <synch.h>
7
8   #include "mthreadLog.h"
9   #include "threadrw.h"
10
11  static  int           Destroy(rwlock_t *);
12  static  rwlock_t      *Create(void);
13  static  rwlock_t      *CreateLocked(const int);
14
15  static rwlock_t *
16  Create(void)
17  {
18          rwlock_t *rwlockPtr    = NULL;
```

Fig. 56B

```
19      int     errorCondition = 0;
20
21      rwlockPtr = (rwlock_t *) malloc(sizeof(rwlock_t));
22
23      if( rwlockPtr == NULL )
24              errorCondition = ENOMEM;
25
26      else {
27              memset((void *)rwlockPtr,'\0',sizeof(rwlock_t));
28              errorCondition = rwlock_init(rwlockPtr, USYNC_THREAD, NULL);
29              if( errorCondition ) {
30                      free( (void *)rwlockPtr);
31                      rwlockPtr = NULL;
32              }
33      }
34
35      if( errorCondition )
36              threadLog_f.setError(ENOMEM);
37
38      return(rwlockPtr);
39 }
40
41 static rwlock_t *
42 CreateLocked( const int type)
43 {
44      rwlock_t *rwlockPtr    = NULL;
45      int      errorCondition = 0;
46
47      if ( type != READER && type != WRITER ) {
48              threadLog_f.setError(EINVAL);
49              return(NULL);
50      }
51
52      rwlockPtr = Create();
53
54      if( rwlockPtr ) {
55              if( type == WRITER )
56                      errorCondition = rw_wrlock( rwlockPtr );
```

Fig. 56C

```
57              else
58                      errorCondition = rw_rdlock( rwlockPtr );
59
60              if( errorCondition ) {
61                      free( (void *)rwlockPtr );
62                      rwlockPtr = NULL;
63                      threadLog_f.setError(errorCondition);
64              }
65      }
66      return(rwlockPtr);
67 }
68
69
70 static int
71 Destroy(rwlock_t *rwlockPtr )
72 {
73      int     errorCondition = 0;
74
75      errorCondition = rwlock_destroy(rwlockPtr);
76      if( ! errorCondition )
77              free( (char *)rwlockPtr);
78
79      return(errorCondition);
80 }
81
82 threadrw_t threadrw_f = {
83              Create,
84              CreateLocked,
85              Destroy
86 };
```

SUBSCRIPTION-BASED SERVICES

CROSS REFERENCE TO RELATED APPLICATIONS

This application is a continuation of U.S. patent application Ser. No. 11/062,256 filed on Feb. 18, 2005 now U.S. Pat. No. 7,535,927 by NORTHRUP, Charles J., entitled SUBSCRIPTION BASED SERVICES which is a continuation of U.S. patent application Ser. No. 09/211,202 filed on Dec. 14, 1998, by NORTHRUP, Charles J., entitled ACCESS-METHOD-INDEPENDENT EXCHANGE WITH COMMUNICATION REQUEST, now U.S. Pat. No. 6,922,705 issued on Jul. 26, 2005 which is also a continuation of U.S. patent application Ser. No. 08/353,905 filed on Dec. 12, 1994 by NORTHRUP, Charles J., entitled ACCESS-METHOD-INDEPENDENT EXCHANGE, now U.S. Pat. No. 5,850,518 issued on Dec. 15, 1998, the entire contents of each is hereby incorporated by reference and from which priority is claimed under Title 35 U.S.C. §120.

COPYRIGHT STATEMENT

A portion of the disclosure of this patent document contains material which is subject to copyright protection. The copyright owner has no objection to the facsimile reproduction by anyone of the patent disclosure, as it appears in the PTO patent file or records, but otherwise reserves all copyright rights whatsoever.

BACKGROUND OF THE INVENTION

1. Field of the Invention

This invention relates to computer networks and communication management, and to the establishment of communication between various users and/or software applications.

2. Background Discussion

The term "The Information Superhighway" is commonly thought of as an extension of the Internet, a network linking hundreds of thousands of computer systems together and communicating via a standard protocol. A computer network is simply a collection of autonomous computers connected together to permit sharing of hardware and software resources, and to increase overall reliability. The qualifying term "local area" is usually applied to computer networks in which the computers are located in a single building or in nearby buildings, such as on a college campus or at a single corporate site. When the computers are further apart the term "wide area network" may be used.

As computer networks have developed, various approaches have been used in the choice of communication medium, network topology, message format, protocols for channel access, and so forth. Some of these approaches have emerged as de facto standards, but there is still no single standard for network communication. The Internet is a continually evolving collection of networks, including Arpanet, NSFnet, regional networks such as NYsernet, local networks at a number of university and research institutions, a number of military networks, and increasing, various commercial networks. The protocols generally referred to as TCP/IP were originally developed for use through Arpanet and have subsequently become widely used in the industry. The protocols provide a set of services that permit users to communicate with each other across the entire Internet.

A model for network architectures has been proposed and widely accepted. It is known as the International Standards Organization (ISO) Open Systems Interconnection (OSI) reference model. (See FIG. 10.) The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level, in a "horizontal" direction. (See, e.g. The TCP/IP Companion, by Martin R. Arick, Boston: QED Publishing Group 1993, and U.S. Pat. No. 5,159,592. These, and all patents and publications referenced herein, are hereby incorporated by reference.)

As shown in FIG. 10, the lowest layer defined by the OSI model is called the "physical layer," and is concerned with transmitting raw data bits over the communication channel. Design of the physical layer involves issues of electrical, mechanical or optical engineering, depending on the medium used for the communication channel. The second layer, next above the physical layer, is called the "data link" layer. The main task of the data link layer is to transform the physical layer, which interfaces directly with the channel medium, into a communication link that appears error-free to the next layer above, known as the network layer. The data link layer performs such functions as structuring data into packets or frames, and attaching control information to the packets or frames, such as checksums for error detection, and packet numbers.

The Internet Protocol (IP) is implemented in the third layer of the OSI reference model, the "network layer," and provides a basic service to TCP: delivering datagrams to their destinations. TCP simply hands IP a datagram with an intended destination; IP is unaware of any relationship between successive datagrams, and merely handles routing of each datagram to its destination. If the destination is a station connected to a different LAN, the IP makes use of routers to forward the message.

The basic function of the Transmission Control Protocol (TCP) is to make sure that commands and messages from an application protocol, such as computer mail, are sent to their desired destinations. TCP keeps track of what is sent, and retransmits anything that does not get to its destination correctly. If any message is too long to be sent as one "datagram," TCP will split it into multiple datagrams and makes sure that they all arrive correctly and are reassembled for the application program at the receiving end. Since these functions are needed for many applications, they are collected into a separate protocol (TCP) rather than being part of each application. TCP is implemented in the "transport layer," namely the fourth layer of the OSI reference model.

Except as otherwise is evident from the context, the various functions of the present invention reside above the transport layer of the OSI model. The present invention may be used in conjunction with TCP/IP at the transport and network layers, as well as with any other protocol that may be selected.

As shown in FIG. 10, the OSI model provides for three layers above the transport layer, namely a "session layer," a "presentation layer," and an "application layer," but in the Internet these theoretical "layers" are undifferentiated and generally are all handled by application software. The present invention provides for session control and for communicating with applications programs. Thus the present invention may be described in accordance with the OSI theoretical model as operating at the session layer and application layers.

"Connectivity" and "convergence" have been used to describe two aspects of the communications and computing revolution taking place. In 1994, technology provides to communicate by telephone, pager, fax, email, cellular phone, and broadcast audio and video. However, to use these communication services, you have to employ a telephone number, beeper number, pager number, fax number, cellular number, and each of many email IDs, radio stations and television channels. The user is confronted with an overabundance of methods providing such physical connectivity, one which will only grow in the future.

The types of physical connections are provided by various systems including the Regional Bell Operating Companies, the Long Distance Carriers, the Cellular Networks, and others providing signal-based or wireless communications. The Cable Television Industry provides connectivity for video signals and increasingly other services.

SUMMARY OF THE INVENTION

The present invention provides a virtual network, sitting "above" the physical connectivity and thereby providing the administrative controls necessary to link various communication devices via an Access-Method-Independent Exchange. In this sense, the Access-Method-Independent Exchange can be viewed as providing the logical connectivity required. In accordance with the present invention, connectivity is provided by a series of communication primitives designed to work with each of the specific communication devices in use. As new communication devices are developed, primitives can be added to the Access-Method-Independent Exchange to support these new devices without changing the application source code. When viewed in accordance with the OSI model, the communication primitives operate at the level of the transport layer, and, to the extent appropriate, at the network layer, and in some instances down to the data link layer, and occasionally as needed, the physical layer.

Using the Access-Method-Independent Exchange of the present invention, anybody can provide a service. Similarly, anybody can be a client of a service. A service can even be a client of another service. This is because every user and every service is identified by a unique communication identifier. In accordance with the present invention, various communication points are connected together to form a communication link.

The aforesaid identifiers are assigned to the user, or service provider, during their subscription process. For service providers, additional information must be provided and added to the Thread Directory Service. This information includes the required physical connectivity to reach the service.

When users want to access the Access-Method-Independent Exchange, they simply supply Exchange with their unique identifiers. The Binding Service validates each user and permits access to the Exchange. The user may then connect to any registered service by simply calling the service's communication identifier. Of course, if they are unfamiliar with the service providers communication identifier, they can request assistance through the Thread Directory Service. The Thread Directory Service provides a listing of available services grouped by relationship. The user can search for keywords, titles, or other information such as service fees. Ultimately, the user can request to gain access to the service.

The Access-Method-Independent Exchange is not limited to servicing a particular geographic area and hence can easily work with foreign countries. The Access-Method-Independent Exchange includes the ability to provide voice or data message processing.

Access-Method-Independent Exchange Components: A Technical Overview the Thread Communication Service At the core of the technology is the Thread Communication Service (TCS), a software utility used to administer the dynamic communications between computer processes executing on a local computer, or, on a remote system. Two versions of the TCS have been implemented: one for intraprocess communications and a second for interprocess communications. The intraprocess version of the TCS is used for a single application process with multiple threads of control. The interprocess version of the TCS provides the administration of communications between processes executing in disjoint address spaces on a local, or remote computer system.

In the TCS everything is viewed as either being a communication primitive, or, a communication point. The communication primitives are the low-level mechanisms used to provide the physical communication between various processes. The processes participating in the communication are referred to as communication points. Two or more communication points are connected by a communication link using the communication primitives.

The Communication Primitives

The communication primitives are built using the underlying computer operating system intraprocess and interprocess communication facilities and thus are operating-system-specific. On one operating system there may be, for example, five communication primitives supported, while another operating system may support twenty. A communication primitive generally must provide for several operations to be applied such as:

Create: The ability to create an instance of the primitive
Destroy: The ability to destroy an instance of the primitive
Send: The ability to send data to the primitive
Receive: The ability to receive data from the primitive
Cycle: Send a default and receive default messages to/from the primitive
Connect: Primitive specific connection function
Disconnect: Primitive specific disconnection function
Suspend: Primitive specific suspension function
Resume: Primitive specific resumption function Communication primitives are registered with the Thread Communication Service for the specific operating system the TCS is executing on. The name, the location, and certain characteristics describing the communication primitive are retained by the TCS for subsequent use. In this context, the communication primitives become a reusable asset, needing to be developed and tested only one time.

Each communication primitive has a shared object, referred to as the communication primitive object, describing the location of the various operations to be applied when using this primitive type. All primitives have the same communication primitive object structure. The TCS will load the communication primitive object at runtime only when requested for use by a communication point.

In a sense, the communication primitive can be thought of as analogous to the physical connection of a telephone on a phone network. A twisted pair telephone would use one primitive while a cellular telephone would use a different primitive.

The Communication Points

A process can register zero or more communication points with the TCS. Each point is said to describe a service. Note, however, that a service can be a client of a different service, or a client of itself. The registration process notifies the TCS as to the name and location of the service, the default primitive to use for communicating to the service, and the default primitive to use when receiving messages from the service.

The registration process also identifies certain characteristics of the communication point. These characteristics include system-dependent information, implementation-dependent information, and usage-dependent information. The characteristics include:

Scope: Determines if service executes as a sibling thread, or in separate address space.

Stack: Required stack size

Idle: If service is to be idle on non-connects

Maxmsg: Maximum number of pending messages prior to suspension

Minmsg: Minimum number of pending messages at which service is resumed

Restart: Service is restartable

Termination: Method for terminating the service

Discarded: Method for discarding unwanted messages

The registered communication points are then retained by the TCS for subsequent use. When a communication point has been registered, a process can request to be connected to the service.

Using the telephone model example, a communication point is the equivalent of a destination telephone. That is, you can call an individual only by knowing the attributes describing that individual, such as a telephone number. The registered characteristics would be similar to your name and address being entered into the phone book. The TCS calls the TDS, if requested, to record the registered communication point in the TDS.

Connecting Communication Points

When a process is executing, it may request the TCS to connect it to a communication point. For the intraprocess communication version of the TCS, the service executes as a separate thread of control. In the interprocess communication version of the TCS, the service executes as a separate process.

There are several modifications permitted. First, when a communication point is registered, the registering process can identify the communication point as a public point. As such, only one instance of the service needs to be executing at any time. All processes requesting to use this point will share the same primitive. Alternatively, a service can be registered as a private service, in which case each process requesting communication to the service will be connected to their own instance of the service. Finally, when a service is initially registered, a maximum number of connection points can be preset. When this limit is reached, then all new processes requesting access to the service will be denied, until such time as the number of current instantiations of the service falls below the threshold.

A single process can be connected to multiple services simultaneously. This can be accomplished through a single connection, or, though multiple connections established by the process with the various services. In the former case, each time the process sends data, the data is actually sent to all services using the communication link. In the latter instance, only a single destination is connected to the communication link.

Again, using the telephone model as an example, this is equivalent to your calling a business associate on your telephone system. While connected, you can put the call on hold and dial another associate, or you can conference the associate in on the same call.

Mixing the Intraprocess and Interprocess Models

On systems supporting multiple threads of control within a single process address space, the TCS uses a special communication point called the intra.sub.--p communication point to execute commands on behalf of the TCS within that address space. That is to say, when the application process makes its initial request to the TCS, the intra.sub.--p communication point will bootstrap itself as a communication point within the application process address space. The TCS then issues specific commands to the intra.sub.--p communication point who executes these commands on behalf of the TCS. The use of the intra.sub.--p communication point is essential to permit intraprocess communication points while supporting interprocess communication points at the same time.

When an application makes a request to connect with a registered communication point, and that point must execute as a separate thread of control within the address space of the requesting process, then the TCS must have a method to satisfy the request. Since the TCS itself is executing in a different address space, it needs a worker thread executing within the requesting process's address space to spawn the requested communication point thread on its behalf.

The TCS also provides a method for a intraprocess communication point to be treated as an interprocess communication point. When an application process makes a request to use an intraprocess communication point as an interprocess communication point, the TCS will execute a generic front end loader to initialize the address space of the new process, and then invokes the specific thread requested in that address space.

Communicating with a Service

Once connected, a process can send messages to a service. The primitive to send this message must accept the message, the size of the message, and the destination. Similarly, a process can request to receive a message from a service. In receiving the message, the process must identify the service it is to receive the message from, the maximum length of a message it can consume, and the actual size of the message returned.

Note that from the point of view of the application process, there is no need to be aware of the underlying physical primitive in use. Instead, the application sees that a Thread Communication Link is provided and need not deal with how it is provided.

Disconnecting from a Service

A process can request the TCS to disconnect it from a particular service. When this happens, the service can be terminate by the TCS if this was the only process connected to it. Otherwise, the service remains executing.

Using TCS for Remote Communication

In the TCS model, a special communication point can be created to monitor a communication device available to the computer system. This communication point acts as the conduit to send messages to, and receive messages from the communication device. The primitive used for this communication point wraps the identifier of the sending process, along with the identifier of the receiving process, around the message prior to sending the data out on the communication device. Similarly, when this communication point receives a message from the communication device, it unwraps the message to determine the process that the message is to be sent to. In this sense, the communication point is the conduit for communications with external systems.

The Broker Service

When a communication point is registered, the communication point may have a specific communication primitive required to either send or receive message. This poses a challenge for another communication point to connect if the requesting communication point requires a different communication primitive. When this happens, the TCS will search for a broker communication point which can convert the messages from the first primitive type to the second primitive type. The broker service, if necessary, will be inserted between the requesting communication point and the requested service communication point.

The TCS Model

In the TCS model, processes are nothing more than communication points. Application programs residing on a disk are also viewed as communication points (albeit the application program must be started for execution by the TCS). This powerful model enables application software development which may effectively commoditize software.

The Thread Directory Service

The Thread Directory Service is an extension of the Thread Communication Service offering persistence to the registered communication primitives and registered communication points. When a communication point is registered with the TDS, it is assigned a unique communication identifier. Numerous additional characteristics of the service can be registered within the TDS such as:

1. Textual description of the type of service
2. Sending communication primitive and receiving communication primitive
3. Communication mechanism used in establishing this service
4. Location of the service
5. Input types understood by the service
6. Output types generated by the service
7. Keyword search list used to locate this service entry
8. Token describing if the execution of the service can be started
9. Token describing the data representation in communication with the service, i.e. binary, ASCII, etc.
10. Token describing if the execution of the service must have previously been started
11. Token describing if Thread Communication Identifier is listed or unlisted
12. Token describing if a public connection to the service can be used
13. Token describing if a private connection to the service can be used
14. Token describing if a public connection is mandatory
15. Token describing if a private connection is mandatory
16. Token describing if the service is a component of a larger service
17. Shell actions to execute in initializing this service
18. The maximum number of concurrent communications.
19. Licensing information
20. Other general user information
21. Link to additional Services required in using this service
22. Series of status information components including but not limited to security privileges and owner information.
23. Series of additional information components used for future enhancements
24. Thread Communication Identifier
25. Secondary Thread Service Directory
26. Usage Fee
27. Directory Service Fees Of the foregoing, items 2 and 4 are essential; the others are optional, though desirable.

A process can request information from the Thread Directory Service specifying the desired search criteria. This is similar to dialing 411 and requesting a telephone number for an individual based on their name and street address. Each TDS has its own unique identifier. The registered communication points are assigned unique communication identifiers based on the TDS's identifier. Thus, communication points are fixed in the universe in this sense.

When the Thread Communication Service works in conjunction with the Thread Directory Service, all communication points to be connected are located via their communication identifiers.

When a connection is requested to a particular communication point, the requesting process specifies the unique communication identifier of the desired service. The TCS causes the identifier to be looked up in the TDS to determine how to connect to the service and then provides the actual connections.

The Thread Communication Switching Service

To minimize the message flow, a Thread Communication Switching Service is provided as a special instance of a communication point. It accepts multiple communication links redirecting the communications from one communication point to the appropriate destination communication point. As shown in FIGS. 1 to 4, a TCSS can communicate with communication points, or, to another TCSS.

Dynamic Configuration Management

Dynamic Configuration Management is a rule-based system for specifying components of software to use in constructing a Dynamically Configured Application Program. The components of software are loaded according to the specified rules and are subsequently executed.

The Application Process constructs the Dynamically Configured Application Program in the Dynamic Configuration Management (DCM) by specifying zero or more RULES identifying the components of the Dynamically Configured Application Program, the interactions between these components, the policy for evaluating these components, the order of evaluation of these components, and a method for satisfying the RULE. The Application Process can specify zero or more data files referred to as Virtual Program Rules Files containing RULES for the Dynamically Configured Application Program. In this sense, the Application Process provides the blueprint for constructing the Dynamically Configured Application Program.

The specification of a RULE includes the following information, although additional information may be incorporated by the implementation:

1. A unique alphanumeric name to identify the RULE
2. A DCM operator denoting the policy for evaluating the RULE
3. Zero or more Prerequisite RULES
4. Zero or more Attributes describing characteristics of the RULE
5. A method (possibly given as NULL) for satisfying the RULE There are two classifications of RULES supported by the DCM given as Reserved Rules and Universal Rules. The Reserved Rules have special meaning to the DCM. The Universal Rules are specified by the Application Process. In either case, however, the Rules contain the minimum information described above.

A series of Reserved Rules, referred to as the Flow Rules, provide the framework for executing the Dynamically Configured Application Program. Whenever a Dynamically Configured Application Program is to be executed, the DCM begins by evaluating the Flow Rules. All other actions are derived as a result thereof. The Flow RULES include:

1. DCMINIT RULE
2. APINIT RULE
3. MAIN RULE
4. APDONE RULE
5. DCMDONE RULE

Note, however, that additional Flow Rules may be incorporated by the implementation.

A Dynamically Configured Application Program is therefore constructed by specifying Universal Rules as Prerequisites Rules of the Flow Rules. In evaluating a Flow Rule, the DCM will ensure that all Prerequisite Rules of the Flow Rule are evaluated first.

In evaluating a RULE, the DCM views the RULE name as the current rule. The evaluation process is such that the DCM will first evaluate all Prerequisite Rules of the current rule. Thus, a Prerequisite Rule becomes the current rule and the evaluation continues with its Prerequisite Rules.

When the current rule has no Prerequisite Rules listed, and the current rule has never been evaluated, then the DCM will execute the method for this rule. After executing the method for the current rule, the DCM attaches a time stamp value denoting when the current rule was evaluated.

When the current rule has one or more Prerequisite Rules, then the DCM compares the time stamp value of the current rule with that of its Prerequisite Rules. If the time stamp value of the current rule is older than the time stamp value of its Prerequisite Rules, then the current rule's method is executed to satisfy the rule and the time stamp value of the current rule is updated to denote when the current rule was evaluated. Otherwise, the current rule's time stamp value remains unchanged and the method is not executed.

After evaluating the last Flow Rule of the Dynamically Configured Application Program, the DCM considers the application as having completed and returns control back to the initial Application Process.

Initially when a RULE is specified, the DCM makes no assumptions as to what the RULE name represents. During the evaluation of the RULE, the DCM associates the RULE name with an entity understood by the DCM. This is called the binding process. The list of entities understood by the DCM and their corresponding interpretation by the DCM are provided during the initialization of the DCM. In this sense, the list of entities can be modified and updated over time based on market demand for new entities and their interpretations.

The binding of the RULE name to an entity understood by the DCM is determined by the RULE's attributes. In this sense, the Application Process can specify how the RULE is to be interpreted by the DCM.

Through the use of this method, Minor Services for an Application Service can be designed, implemented, tested, and distributed independently of the corresponding Application Program. The end user can therefore purchase and install only those Minor Services of interest. When the Application Program is to be executed, the resulting Application Process will dynamically configure itself to provide the available Minor Services.

The advantage to the computer industry is that the Minor Services, for example, can be designed after the Application Program and sold individually to the end user. The implications are that:

1) the base Application Program need not be altered to support these additional Minor Services
2) since the end-user is purchasing only those Minor Services of interest, the end user does not have to provide additional media storage capacity to support unwanted Minor Services
3) additional Minor Services can be designed, implemented, tested, and installed after the base Application Program thus providing:
   a) the designer of the Application Program the ability to design, implement, and test additional Minor Services based on new market demands without changing the existing base Application Program
   b) the ability to design, implement, and test additional Minor Services specific to an individual customer without effecting other customers. In this sense, all customers would have the exact same base Application Program, but potentially different installed Minor Services
4) the development of additional Minor Services can be thoroughly tested as smaller units when compared to the approach used today in which a new, monolithic representation of the Application Program must be tested. The advantage herein is that the computational resources required to develop the software are decreased, the cost of testing is decreased, and the Minor Services can be delivered to the market in a shorter time interval.

The Configurable Application Program Service

The Configurable Application Program Service provides a method to dynamically reconfigure an application process. Through the CAPS, a communication point can be dynamically replaced by another communication point. This is important for real-time systems in which you would not want to terminate the application process to replace a defective module.

The Application Process uses the Configuration Administrator Minor Service to administer zero or more components of software from shared libraries. Each component is said to offer a Minor Service. The specifications for the administration of the Minor Services can be provided directly by the Application Service, or, indirectly through a data store monitored by the Configuration Administrator. These specifications can instruct the Configuration Administrator Minor Service to perform the desired operation immediately, at a predefined time (which may be an interval), or, as a result of some event which is later communicated to the Configuration Administrator Minor Service.

The Configuration Administrator Minor Service provides the following operations:
  1. Locates specified Minor Services
  2. Loads specified Minor Services
  3. Executes specified Minor Services
  4. Establishes communication channel with the specified Minor Service.
  5. Suspends execution of specified Minor Services.
  6. Resumes execution of specified Minor Services
  7. Replaces specified Minor Service with a new Minor Service rerouting communication channels as appropriate
  8. Unloads specified Minor Service
  9. Provides for manual state retention between replaceable Minor Services
  10. Notification Note that the Configuration Administrator Minor Service operations can be specified to occur at set time intervals; at predefined time periods; as a result of external events; or, as a result of internal events. Events, in this context are registered with the Configuration Administrator Minor Service to denote their occurrence.

The advantage is that an Application Program can be constructed and executed and subsequently reconfigured to take advantage of newly installed minor software services while the Application Process is executing. The implications of such a system are that:
1. Mission-critical Application Programs which require 24 hour, 365 days a year execution can be reconfigured without terminating execution of the existing Application. Process.

2. An Application Process can be reconfigured without terminating that Application Process which would otherwise cause the Application Process to lose all data currently held in Random Access Memory
3. An Application Process which requires a significant initialization sequence does not need to be terminated to install new minor software services. Instead, the Application Process can be reconfigured on demand.
4. New software services can be designed, implemented, and tested using an existing Application Process such that the new services can be de-installed if found in fault without disrupting the existing Application Process.
5. Application Processes which monitor real-time events can be dynamically reconfigured to adjust to those real-time events without terminating the existing Application Process.
6. Diagnostic Minor Services can be configured into an existing Application Process for administrative, diagnostic, or statistical analysis and subsequently removed without affecting the existing Application Process.

BRIEF DESCRIPTION OF THE DRAWINGS

FIG. 11. Pseudo Procedural Code for Example of Threaded State Machine.

FIGS. 12, 13A and 13B State Machine Representation of Example of Threaded State Machine.

Figure 1:
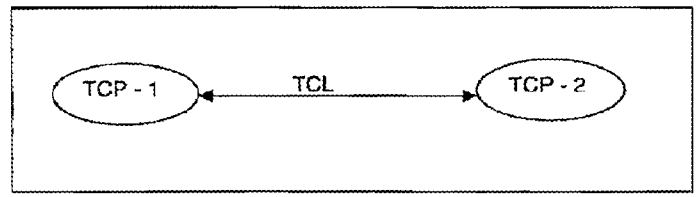
FIG. 1. Diagram showing Simple Thread Communication Link between TCP-1 and TCP-2.

The following figures show exemplary source code in the C programming language, as implemented for Unix 4.2 MP TLP/5:

FIG. 14 Commands Used to Compile Binder Example.
FIG. 15 Running Binding Service Example.
FIG. 16 Sample Output from Binding Service
FIG. 17 Simple Services.
FIG. 18 Registering Binding Method and Binding Arbitrary Named Representatives.
FIG. 19 Header File Declaring Binding Method.
The following figures represent examples of data:
FIGS. 20A through 20C Examples of Pattern, Transformation, Locate, Status and Query for a Shared Object in a Shared Library.
FIG. 21 Example of Shared Library Binding Method.
FIGS. 22A through 22D Example of Shared Library Binding Method including Pattern, Transformation, Locate, Status & Query.
FIGS. 23A through 23B Example of Data Structures Header File.
FIGS. 24A through 24B Example of Registering a Binding Service Method to Make Such Method Available to Binding Services (BSV).
FIGS. 25A through 25P Sample Communication Points Module.
FIGS. 26A through 26J Sample Output for Broker Data.
FIGS. 27A through 27B Sample Output for Weather Data.
The following figures show exemplary source code:
FIG. 28 Communication Data Header File.
FIGS. 29A through 29B Communication Data Module.
FIGS. 30A through 30B Compoints Header File.
FIGS. 31A through 31G Compoints Module.
FIGS. 32A through 32B Communications Registration Header File.
FIGS. 33A through 33G Communications Registration Module.
FIGS. 34A through 34B Communications Point Headers File.
FIGS. 35A through 35B Communications Point Module.
FIG. 36 Thread Condition Variable Header File.
FIGS. 37A through 37C Thread Condition Variable Module.
FIG. 38 Generic Compoint Header File.
FIGS. 39A through 31H Generic Compoint Module.
FIGS. 40A through 40C Thread Link List Header File.
FIGS. 41A through 41N Thread Link List Module.
FIGS. 42A through 42B Mutex Thread Log Header File.
FIGS. 43A through 43G Mutex Thread Log Module.
FIG. 44 Thread Mutex Header File.
FIGS. 45A through 45C Thread Mutex Module.
FIGS. 46A through 46B Communication Primitive Header File.
FIGS. 47A through 47D Communication Primitive Module.
FIG. 48 Communication Primitive Data Header File.
FIGS. 49A through 49B Communication Primitive Data Module.
FIG. 50 Thread Queue Condition Header File.
FIGS. 51A through 51E Thread Queue Condition Module.
FIG. 52 Registry Header File.
FIGS. 53A through 53B Registry Module.
FIGS. 54A through 54D Minor Services Communication Module.
FIG. 55 Thread Reader-Writer Lock Header File.
FIGS. 56A through 56C Thread Reader-Writer Lock Module.

DETAILED DESCRIPTION OF THE INVENTION

The various aspects of the present invention can be implemented on a digital computer running an operating system that supports runtime-loadable software modules, such as Unix SVR4.2 MP TLP/5 (Unix System Laboratories, a subsidiary of Novell Corporation). Such a computer may, for example, be a Gateway 2000 computer having an Intel 486 microprocessor, or any other hardware compatible with that operating system. Many other operating systems may alternatively be used, including SunSoft Solaris 2.X, Microsoft Windows 95, Microsoft Windows NT, IBM's AZ, and Hewlett-Packard HP-UX, on any hardware compatible therewith. See, e.g. Solaris 2.2, SunOS 5.2 Reference Manual, Section 3, Library Routines (A-M) and (N-Z) (SunSoft Part No. 801-3954-10, Revision A, May 1993).

Configurable Application Program Service

The term Application Program is used to describe a software application residing on a medium accessible to the computer system.

An Application Process is said to provide some well-known service, e.g. wordprocessing, spreadsheet, graphics, etc. The Application Program may be devised to provide a series of one or more Minor Services and a Primary Service, which collectively constitute the Application Service.

The term Application Process, as used in this document, refers to the overall computer representation of the Application Program's execution. In this definition, the term Application Process is defined to incorporate all processes of various "weight" including, but not limited to, heavy weight, medium weight, and light weight processes relating to the Application Service. A heavy-weight process executes in its own address space, whereas medium-weight and light-weight processes may execute within the same address space. The Application Process may constitute one or more of these processes. Each of these processes is said to have a Thread of execution.

A Thread, in this context, represents an execution stream of the Application Process. The notion of a Thread can be provided by the underlying operating system, referred to as kernel-supported threads, or can be provided at the application level, referred to as user-level threads, or can be a mixture of the two. For the purposes of this description, these will collectively be referred to as Threads. Note that in a distributed environment, one or more of these Threads may be executing on a remote computer system.

The Application Process may be confined locally to the computer system on which the Application Process was initially started, or may have its execution threads distributed among various computer systems accessible to the computer system on which the Application Process was initially started.

When a user of the computer system requests to execute an Application Program, the Application Program is loaded into the computer's memory having a single Thread of execution. This initial Thread may then create additional Threads on the local computer system, or possibly on a remote computer system.

The creation of a new Thread requires the Application Process to specify the starting point of the new Thread. In procedural computer languages, for example, this would require the requesting Thread to specify the address of the procedure to begin as a new Thread. On some implementations, the new Thread must be identified by its Application Program name. The implication herein is that the Application Program is created (i.e. compiled) with this information present.

The Application Program is therefore a static representation of a well-known functionality and is not easily able to dynamically load additional Threads unknown at the time the Application Program was developed. There are, however, certain Applications Programs which provide a listing of installed computer Application Programs either through a textual display or through a graphical representation referred to as an icon. Additionally, certain Application Processes search specific directories for available Application Programs to execute as Application Co-Processes, but again, the criteria for their representation is static and unalterable by the end user.

In the textual representation, the name of the Application Program is provided with zero or more additional information components such as the owner, the size, and/or execution privileges. This listing is shown to the user, who may then enter the name of the application to execute.

Alternatively, when using a graphical user interface with an Icon, the name of the Application Program, its specific location on the computer system, and other information is required to execute the Thread. A further limitation of the Icon is that one Application Process can be started by selecting the Icon, but that Application Process cannot select a new Icon to execute as an Application Co-Process. That is to say, the Icon is a graphical representation for the end user to select.

A limitation of both the textual and graphical representation of the available Application Programs is that the information displayed to the user is dependent on the underlying operating system implementation. Certain-operating systems will display the name, the size in bytes, the owner, the date created, and execution mode while others will display a subset of this information and possibly other system-dependent information. Regardless, however, the user cannot easily associate additional information with the installed application in a useful manner. Finally, many users have manually created what has become known as README files to describe this information.

There are many instances in which an Application Process will select different Minor Services depending on installed features, additional software available to the computer system, or due to other factors external to the Application Process itself. Currently, the only provisions to support such run-time changes to the Application Process are to design the Application Program with the appropriate logic.

This disadvantage to this approach, however, is that it limits the ability of the Application Process to dynamically configure itself based on available Minor Services, or due to other factors external to the Application Process itself. Additionally, the Application Process cannot appropriately handle cases in which an available Minor Service may conflict with another Minor Service. Once the incompatibility is detected, the Application Process will simply print an error message and terminate its processing.

Finally, an Application Process which locates available Minor Services has no simple provision for executing these Minor Services, communicating with these Minor Services, nor ensuring a proper ordering of the execution of these Minor Services.

The prior art therefore does not provide the necessary mechanisms for an Application Process to dynamically alter its execution based on Minor Services available either locally or remotely to the computer system. Additionally, the prior art does not provide the necessary mechanisms for the same Application Program to behave differently on two separate computer system offering two very different sets of Minor Services without this logic being introduced into the Application Program from the onset.

The prior art also does not provide the mechanisms for resolving feature conflicts in which there are two or more installed Minor Services available to the Application Process, but whose use are mutually exclusive. The Application Program will typically be designed to execute the first feature ("Feature A"), and then the second ("Feature B"). If Feature B conflicts with the use of Feature A, there are no simple remedies to support a resolution. Consider, for example, that the Application Process performs various initialization sequences required for Feature A. The Application Process may then also execute various initialization sequences for Feature B. During the initialization sequences for Feature A, certain values may be set in the Application Process which are inappropriate in the case of Feature B being present.

Within the prior art there are various approaches for configuration of Application Programs. Typically referred to as Software Construction Utilities, these approaches provide a rule-based system describing how an Application Program should be constructed from its corresponding application programming language source code. Examples of Software Construction Utilities include:

1. augmented make--"Augmented Version of Make," UNIX System V, Release 2.0 Support Tools Guide, pp: 3.1-19, April 1984.
2. build--Erickson, B., Pellegron, J. F., "Build--A Software Construction Tool," AT&T Bell Laboratories Technical Journal, vol. 63, No. 6, Part 2, pp: 1049-1059, July 1984.
3. make--Feldman, S., "Make--A Program for Maintaining Computer Programs," Software--Practice and Experience, vol. 9, No. 4, pp: 256-265, April 1979.
4. mk--Hume, A., "Mk: A Successor To Make," USENIX Phoenix 1987 Summer Conference Proceedings, pp: 445-457, 1987.
5. nmake--Fowler, G. S., "The Fourth Generation Make," USENIX Portland 1985 Summer Conference Proceedings, pp: 159-174, 1985.
6. Microsoft NMAKE--"Microsoft C: Advances Programming Techniques," Microsoft Corporation, pp: 103-132, 1990.

Here, the source code provides the necessary algorithm, logic, and instructions in a human-readable form. This source code must then be compiled into an Application Program which the computer can then load and execute. The process of determining the necessary actions to create the Application Program are typically controlled by a software construction Application Program (a "make" utility) which reads specifications from a data file known as a "makefile". This process is well known and well understood in the computer programming profession. The makefile contains specification of the form:

target.sub.--name:prerequisite.sub.--list
ACTION to denote that a target is dependent on prerequisites. If one or more of the prerequisites is newer than the target, then the ACTION is performed to construct the target. Each prerequisite can be listed as a target of another rule. As an example, consider:

rule 1 A:B C
concatenate B and C to construct A
rule 2 B:b
copy "b" to "B"
rule 3 C:c
copy "c" to "C"

In this example, the rule to construct the target "A" shows it has a dependency on prerequisites "B" and "C". Note, however, that "B" is dependent on "b" according to the second rule, and that "C" is dependent on "c" based on rule 3. If "c" has changed since the last time "C" was constructed, then the ACTION for rule 3 would be performed to reconstruct C. Similarly, if "b" has changed since the last time "B" was constructed, then the ACTION for rule 2 would be performed to reconstruct B. Note that the ACTION for rule 2 and the ACTION for rule 3 could in fact occur simultaneously since there are no other dependencies on these rules. After rule 2 and rule 3 has completed, then rule 1 can continue. Here, if "B" or "C" has changed since the last time "A" has been constructed, then the ACTION for rule 1 will be performed to reconstruct A.

The issue of software configuration has historically been addressed by one of the following mechanisms:

1. All of the Application Program's Minor Services are developed and compiled into the Application Program which is then sold to the customer. I shall refer to this "Non-featuring Software."
2. All of the Application Program's Minor Services are developed and compiled into the Application Program which is then sold to the customer. Certain Minor Services, however, will be inaccessible to the customer unless the customer pays additional fees. At that time, a key file is provided to the customer with the appropriate purchased Minor Services turned on. I shall refer to this as "Run-Time Featuring."
3. All of the Application Program's Minor Services are developed, but during the software construction process certain features will be selected to include in the Application Program. I shall refer to this as "Compile-Time Featuring."
4. All of the Application Program's Minor Services are developed, but sold as separate Application Programs. In this instance, all of the components representing the Application are well known. During the execution of the Application Program, the features are tested to see if they are present. If a feature is not present, then it is simply ignored. I shall refer to this as "Load-Time Featuring."

Application Programs are typically designed and distributed following the Non-featuring Software model. Consider, for example, that when purchasing a Word Processing Application you receive all of the latest features available. This has the disadvantage that you are paying for features which you may not need.

With "Run-Time Featuring", the Application Program consists of the monolithic representation of the application. Thus you receive a potentially large Application Program with certain portions of the Application Program inaccessible to you. Nonetheless, you receive the largest possible representation. The disadvantage to this approach is that you cannot ship the product until all features have been developed. Additionally, the customer must have enough memory and storage capacity for the entire Application Program even though only a one Minor Service may have been purchased.

With Compile-Time Featuring, the source code representing the application has numerous sections delineated with conditional inclusions based on specified criteria. As an example, in the C language it is customary to use:

```
#if defined(FEATURE.sub.--A)
   ...
#elif defined(FEATURE.sub.--B)
   ...
#endif
```

The disadvantage to Compile-Time Featuring is that it makes the source code difficult to understand. Additionally, as more Minor Services are added, the complexity of maintaining the source code increases thus introducing the prospects for inadvertent software errors, known as bugs.

Load-Time Featuring is not very common in the industry as there is little perceived benefit. Considering that the Application must know the features to test for, there is little advantage in this approach versus the previously mentioned approaches.

An alternative method for dynamically configuring an application process during execution is to use a shared library >>ARNO86!>>ATT90!>>SUNS92!.

>>ARNO86! Arnold, J, "Shared Libraries On UNIX System V," 1986 Summer USENIX Conference Atlanta, Ga. pp: 395-404, 1986.
>>ATT90! AT&T, UNIX System V Release 4 Programmer's Reference Manual", 1990.
>>SUNS92! Sun Microsystems, Inc., "SunOS 5.2 Linker and Libraries Manual", pp: 19-41, 1992.

With shared libraries, an application program references services available in the library without copying all of the text portion into the Application Program. When the Application Program is executed, the resulting Application Process opens the shared library, loads the service from the library, and then executes the service. The service is retained until the Application Process explicitly request that the service is to be removed from the Application Process. The advantage of using shared libraries is that the underlying library can be upgraded, altered, or otherwise changed independently of the Application Program.

The disadvantage in using shared libraries in this manner is that the shared library can only be altered when there are no Application Processes referencing the shared library. Another disadvantage in using shared libraries is that Application Programs are not normally designed to explicitly search and load services from the shared libraries on demand.

Thus the prior art provides a mechanism to administer the Application Program software construction process based on available Minor Services. It does not, however, address the needs or requirements for dynamic reconfiguration of the Application Process. The distinction here is that the former approach constructs a static representation of the Application Program while the later is a dynamic representation of the Application Process.

Thread Directory Service

The invention provides a Thread Directory Service to administer one or more Thread Service Directories. Through the Thread Directory Service a thread can:
1. register new services,
2. remove existing services, and/or
3. query the directory to search for services.

In registering a new service, a series of attributes are provided by the registering thread describing the type of service to be provided. These attributes are classified as Public or Private attributes. Public attributes are considered public information and are accessible through the Thread Directory Service by any thread executing locally, or remotely. Private attributes are only accessible by the Thread Directory Service. The administrator of the Thread Directory Service has access to all attributes. A complete description of the attributes is provided in the Embodiment section below.

In registering a new service, the Thread Directory Service assigns a unique Thread Communication Identifier to the new service and retains this Identifier in the Thread Service Directory.

Once registered, any thread can call the Thread Directory Service to query for a Thread Service by providing one or more Public Attributes. The Thread Directory Service will then search the Thread Service Directory reporting the Thread Communication Identifier(s) of those services matching the specified attributes. In querying the Thread Service Directory, a requesting thread can specify the search criteria attributes using Boolean expressions.

Only the Service Thread owner, or the administrator of the Thread Directory Service can delete entries from the Thread Service Directory.

Thread Communication Service

The Thread Communication Service (TCS) is a computer software method for dynamically administering the communications between two or more Minor Services of an Application Process.

The TCS provides the capability to:
1. register low level communication primitives for connectivity and synchronization
2. register Minor Services as communication points
3. begin the execution of a communication point as a Minor Service of the Application Process
4. remove communication points
5. connect communication points using a communication link
6. disconnect communication points
7. suspend communication links
8. resume communication links
9. terminate the execution of a communication point
10. allow a communication point to broadcast to multiple communication points
11. allow a communication point to receive messages from multiple communication points Thread Communication Switching Services The Thread Communication Switching Services system has several features. It routes communications between two or more threads interconnected through a Thread Communication Link. It minimizes the number of Thread Communication Links required to be maintained by the Thread Connect Service. It also packages multiple Thread Communication Packets into a single packet for long distance communications. It also provides redundancy of communications in the event that a Thread Communication Point in the Thread Communication Link terminates unexpectedly.

Binding Service

The Binding Service is a computer software method to dynamically administer the association of one or more arbitrary named representations with entities understood by the Application Process. Each arbitrary named representation is a sequence of one or more bytes applied at the Application Process level.

DEFINITIONS

An arbitrary named representation is initially considered as Unbound. When an association between the arbitrary named representation is made with an entity understood by the Binding Service, then the arbitrary named representation is considered Bound. The process of determining the association is called the Binding Process. The Binding Process applies an ordered series of Binding Methods to determine if an association between an arbitrary named representation and the entities understood by the Binding Service can be made.

To determine the significance of an arbitrary named representation within the scope of the Application Process, the Application Process can request the Binding Service to apply the Binding Methods to the arbitrary named representation to determine what entity the name represents.

Binding Methods

The Binding Service provides a series of Default Binding Methods including the ordering of Binding Methods as should be applied by the Binding Service. These Binding Methods and their ordering are specified in a Binding Configuration File which is read by the Binding Service during its initialization. Additional Binding Methods can be added to the Binding Configuration File by the end user. Other Binding Methods can be registered with the Binding Service during the Application Process' run time execution. The registration of a Binding Method must include the information shown in Table 1.

TABLE 1

Binding Method Registration Information.

Order of Evaluation
Location of Binding Method
Name of Binding Method

Example descriptive Binding Methods and their definitions are shown in Table 2. An Example of implementing a Shared Library Binding Method and a Shared Object Binding Method are shown in shown in FIG. 18 through FIG. 24B and are compiled using the second command line of FIG. 14. FIG. 17 provides a listing of a simple minor service that is compiled using the first command line shown in FIGS. 22A through 22D. An example execution of the said compiled program is shown in FIG. 15. The sampled output from the execution of said compiled program is shown in FIG. 16.

TABLE 2

Default Binding Methods.

File Binding Method a method to bind the arbitrary named representation to a file accessible by the computer system
Shell Binding Method a method to bind the arbitrary named representation to a user level shell
Data Binding Method a method to bind the arbitrary named representation to a datum available to the Application Process
Function Binding Method a method to bind the arbitrary named representation to a function (procedure) accessible to the Application Process
Thread Binding Method a method to bind the arbitrary named representation to a thread of the Application Process
Process Binding Method a method to bind the arbitrary named representation to an existing Application Process Each Binding Method must have associated with it the operations shown in Table 3.

TABLE 3

Binding Method Operations

Pattern Matching Method
Name Transformation Method
Locate Method
Status Method
Query Method The Binding Method Operations Pattern Matching: if the arbitrary named representation matches the specified regular expression pattern, then apply the Locate Operation to determine if the named representation can be found. If the Pattern Matching Method is specified as NULL, then proceed as if the name was matched. If the arbitrary named representation does not match the specified regular expression pattern, then go to the next Binding Method.

Transformation: if the arbitrary named representation successfully completes the Pattern Matching operation, then apply the Transformation operation to the arbitrary named representation and use this transformed name for subsequent operations. If the Transformation operation is not specified for this Binding Method, then use the specified arbitrary named representation for subsequent operations.

Locate Operation: use the registered Locate operation to see if the arbitrary named representation can be found. If the Locate Method returns success, then the arbitrary named representation is considered BOUND using this Binding Method. If the Locate operation fails, then the arbitrary named representation remains unbound.

Status Operation: given a BOUND arbitrary named representation, use this operation to retrieve the status information describing this entity. This includes the following information:
  arbitrary name: the specified arbitrary named representation
  expanded name: the expanded description to be associated with this arbitrary named representation
  owner information: description of the owner of this bound entity
  status timers: includes the creation time, the last modification time, the last access time
  size: the size of the entity in bytes
  value: the last recorded value associated with the entity
  entity specific data: entity specific data values including the size of this data Query Operation: given a BOUND arbitrary named representation, report the status information as described by in the Status Operation.

Binding Service Interface

The Binding Service itself provides the following methods for the Application Process:
  Register register a new Binding Method
  Set Order set the ordering of the Binding Methods
  Unregister remove a Binding Method
  Bind apply the Binding Methods on a specified arbitrary named representation
  Unbind unbind the arbitrary named representation
  Establish request the Binding Service to read a specified Binding Service Configuration File
  Report report the requested information to the Application Process. This may include the list of Binding Methods, the order of evaluation of Binding Methods, and/or the characteristics of the Binding Methods
  Query report the requested information on the arbitrary named representation to the Application Process
  Purge delete all references to arbitrary named references that are currently UNBOUND.

Dynamic Configuration Management

The Dynamic Configuration Management, hereinafter sometimes referred to as the DCM, provides a method for an Application Process to dynamically construct and subsequently execute a Dynamically Configured Application Program offering an Application Service with zero or more Minor Services.

The Application Process constructs a Dynamically Configured Application Program in the DCM by specifying a series of RULES identifying the components of the Dynamically Configured Application Program, the interactions between these components, the policy for evaluating these components, the order of evaluation of these components, and a method for satisfying the RULE. Additionally, the Application Process can specify zero or more data files referred to as Program Rules Files containing RULES for the Dynamically Configured Application Program. In this sense, the Application Process provides the blueprint for constructing the Dynamically Configured Application Program either through an Application Programming Interface and through zero or mode Application Program Rules Files. Once constructed, the Application Process can then request the DCM to execute the Dynamically Configured Application Program.

The specification of a RULE includes the information shown in Table 4, although additional information may be provided by the actual implementation:

TABLE 4

Rule Specification Components

A unique alphanumeric name to identify the RULE
A DCM operator denoting the policy for evaluating the RULE
Zero or more Prerequisite Universal RULES
Zero or more Attributes describing characteristics of the RULE
A method (possibly given as NULL) for satisfying the RULE There are two classifications of RULES supported by the DCM given as Reserved Rules and Universal Rules. The Reserved Rules have special meaning to the DCM and cannot be redefined. The Universal Rules are specified by the Application Process. In either case, however, the Rules contain the minimum information described in Table 4.

A series of one or more Reserved Rules, referred to as the Flow Rules, provide the framework for executing the Dynamically Configured Application Program. Whenever a Dynamically Configured Application Program is to be executed, the DCM begins by evaluating the Flow Rules. All other actions are derived as a result thereof. The Flow Rules are shown in Table 5.

TABLE 5

The Flow Rules.

DCMINIT RULE
APINIT RULE
MAIN RULE
DONE RULE
APDONE RULE
DCMDONE RULE

The MAIN RULE must be specified for the Dynamically Configured Application Program to execute. The other Flow Rules (DCMINIT, APINIT, DONE, APDONE, and DCMDONE are optional).

The DCM groups all Rules with the same name together as if they were specified as a single entity. This permits, for example, the Application Process to specify potions of a Rule during initialization sequences and the remainder of the Rule when initialization has completed.

When the Dynamically Configured Application Program is to be executed, the DCM will evaluate each of the specified Flow Rules. In evaluating a RULE, the DCM views the RULE name as the current rule. The evaluation process is such that the DCM will first evaluate all Prerequisite Rules of the current rule. Thus, a Prerequisite Rule becomes the current rule and the evaluation continues with its Prerequisite Rules. This is implemented using well known directed graph techniques.

When the current rule has no Prerequisite Rules listed, and the DCM determines the current rule must be evaluated, then the DCM will execute the method for this rule. After executing the method for the current rule, the DCM attaches a time stamp value denoting when the current rule was evaluated.

When the current rule has one or more Prerequisite Rules, then the DCM compares the time stamp value of the current rule with that of its Prerequisite Rules. If the time stamp value of the current rule is older than the time stamp value of its Prerequisite Rules, then the current rule's method is executed to satisfy the rule and the time stamp value of the current rule is updated to denote when the current rule was evaluated. Otherwise, the current rule's time stamp value remains unchanged and the method is not executed.

After evaluating the last Flow Rule of the Dynamically Configured Application Program, the DCM considers the application as having completed and returns control back to the initial Application Process.

The policy for evaluating a RULE is determined by the DCM operator component of the RULE. By default, a TIME.sub.--VALUE operator (:) will be applied which provides the behavior as described above. Additional DCM operators can be derived and implemented into the DCM to describe the relationship between the RULE and its Prerequisite Rules.

Initially when a RULE is specified, the DCM makes no assumptions as to what the RULE name represents. During the evaluation of the RULE, the DCM uses the Binding Service to associate the RULE name with an entity understood by the DCM. The list of entities understood by the DCM and their corresponding interpretation by the DCM are provided during the initialization of the DCM. In this sense, the list of entities can be modified and updated over time based on market demand for new entities and their interpretations. The DCM provides the following default Binding Methods:

SHARED LIBRARY BINDING METHOD: The rule represents a shared library available to the Application Process.

SHARED OBJECT BINDING METHOD: The RULE name represents a shared object from a shared library. If the RULE has a prerequisite RULE BOUND to a SHARED LIBRARY, then the shared object is presumed to exist in that library. If the method for the rule is to be executed, then the DCM opens the shared library, extracts the shared object, and executes the shared object. To specify a SHARED OBJECT BINDING METHOD, the rule must have the Reserved Rule SHARED OBJECT as a prerequisite rule.

THREAD BINDING METHOD: The RULE name represents a procedure to invoke as a separate thread of execution within the Application Process. To specify a THREAD BINDING METHOD, the rule must have the Reserved Rule THREAD as a prerequisite rule.

SHELL BINDING METHOD: The RULE name does not represent a physical entity, but rather, its method is specified as statements to be executed by the underlying SHELL provided by the operating system. To specify a SHELL BINDING METHOD, the rule must have the Reserved Rule SHELL as a prerequisite rule.

FUNCTION BINDING METHOD: The FUNCTION BINDING METHOD associates the rule name with a function (procedure) available in the application program. The DCM will search the symbol name list for the Application Process to locate the address of the function. If the DCM must trigger the method for the rule, then the function is invoked.

FILE BINDING METHOD: The rule name represents the name of a file accessible by the computer system.

DEFAULT BINDING METHOD: If no binding method has not been specified for the rule, then. the DCM will bind the rule name using the DEFAULT BINDING METHOD. The DEFAULT BINDING METHOD is to associate the rule name with a function (procedure) available in the application program. The DCM will search the symbol name list for the Application Process to locate the address of the function. If the DCM must trigger the method for the rule, then the function is invoked. If the DCM cannot locate the function in the Application Process's symbol table, then the RULE is considered to have failed.

The DCM can exist as a co-process of the Application Process, or as a sibling process of the Application Process. In the former sense, the DCM can be accessed by multiple Application Programs thus providing a sharing of information. In the later case, the DCM resides within the Application Process. There are no constraints inherent in the model to preclude the use of the DCM across multiple computer systems.

Through the use of the Dynamic Configuration Management method, Minor Services for an Application Service can be designed, implemented, tested, and distributed independently of the corresponding Application Program. The end-user can therefore purchase and install only those Minor Services of interest. When the Application Program is to be executed, the resulting Application Process will dynamically configure itself to provide the available Minor Services. The advantage to the computer industry is that the Minor Services, for example, can be designed after the Application Program and sold individually to the end user. The implications are that:

1) the base Application Program need not be altered to support these additional Minor Services;
2) since the end-user is purchasing only those Minor Services of interest, the end user does not have to provide additional media storage capacity to support unwanted Minor Services;
3) additional Minor Services can be designed, implemented, tested, and installed after the base Application Program thus providing:
   a) the designer of the Application Program the ability to design, implement, and test additional Minor Services based on new market demands without changing the existing base Application Program
   b) the ability to design, implement, and test additional Minor Services specific to an individual customer without effecting other customers. In this sense, all customers would have the exact same base Application Program, but potentially different installed Minor Services
4) the development of additional Minor Services can be thoroughly tested as smaller units when compared to the approach used today in which a new, monolithic representation of the Application Program must be tested. The advantage herein is that the computational resources required to develop the software are decreased, the cost of testing is decreased, and the Minor Services can be delivered to the market in a shorter time interval.

Configurable Application Program Service

The Configurable Application Process Service is a computer software method for dynamically administering the component Minor Services of an Application Process. The Configurable Application Process Service consists of a Configuration Administrator Minor Service thread using the Communication Manager Program Service described elsewhere in this patent application. Various other Minor Service threads may be created by the Configuration Administrator as described herein.

The Application Process uses the Configuration Administrator Minor Service, hereinafter referred to as the CAMS, to administer zero or more components of software. Each component is said to offer a well defined application Minor Service hereinafter singularly and collectively referred to as the AMS.

The specifications for the administration of the AMS can be provided directly by an Application Process, or, indirectly through a data store monitored by the CAMS. These specifications can instruct the CAMS to perform the desired operation immediately, at a predefined time (which may be an interval), or, as a result of some event which is later communicated to the CAMS.

There are fifteen general operations available through the Configurable Application Process Service given as:
1. LOCATE: locate and report the location of a specified AMS
2. LOAD: configure the specified AMS into the Configurable Application Program Service
3. EXECUTE: execute the specified AMS
4. REPLACE: replace the specified AMS with a new AMS
5. UNLOAD: unload the specified AMS from main memory
6. DUMP.sub.--MAP: dump a map of the current values of a specified AMS
7. LOAD.sub.--MAP: load a map of current values for a specified AMS
8. NOTIFICATION: notify the CAMS that the specified event has occurred
9. INSERT: insert the specified AMS in between two existing AMS
10. EXTRACT: removes specified AMS previously inserted with INSERT operation
11. SUSPEND: suspend the communications to a specified AMS
12. RESUME: resume the communications to a specified AMS
13. COMPRIMS: set the default communication primitives for an AMS
14. TERMINATE: terminate the execution of the specified AMS.
15. QUERY: report useful information on the current AMS being administered through the configurable Application Process Service.

Other technology which may be configured with the Configurable Application Program Service includes the Binding Service as described in this application.

The advantage to the computer industry is that an Application Program can be constructed and executed and subsequently re configured to take advantage of newly installed minor software services while the Application Process is executing. The implications of such a system are that:

1. Mission critical Application Programs which require 24 hour, 365 days a year execution can be re configured without terminating the existing Dynarrucally Configured Application Process's execution.
2. An Application Process can be re configured without terminating that Application Process which would otherwise cause the Application Process to lose all data currently held in Random Access Memory.
3. An Application Process which requires a significant initialization sequence does not need to be terminated to install new minor software services. Instead, the Application Process can be re configured on demand.
4. New software services can be designed, implemented, and tested using an existing Application Process such that the new services can be deinstalled if found in fault without disrupting the existing Application Process.
5. Application Processes which monitor re time events can be dynamically reconfigured to adjust to those real time events without terminating the existing Application Process.
6. Diagnostic Minor Services can be configured into an existing Application Process for administrative, diagnostic, or statistical analysis and subsequently removed without affecting the existing Application Process.

Named Execution Environment

This portion of the invention is a computer application service called the Named Execution Environment Manager. A series of one or more machines interconnected through some form of a networking scheme can register one or more arbitrary attributes describing the characteristics of the machine. These attributes are known as the Registered Environment Attributes within the Named Execution Environment. This registration process can be completed by the system administrator (the owner of the machine), or can be completed by an automated Application Process which probes the machine to determine the default attributes of the machine.

When an Application Process-requires the use of an execution environment, the Application Process calls the Named Execution Environment Manager and specifies one or more attributes describing the requirements of the desired execution environment. These attributes are referred to as the Required Environment Attributes. Further, the Application Process provides the Named Execution Environment Manager specific information to be associated with the new environment if it can be created. This information is called the Named Execution Environment Attributes.

The Named Execution Environment Manager then selects an appropriate machine based on a boolean evaluation of the Required Environment Attributes provided by the Application Process, and the Registered.Environment Attributes describing the physical machines.

When the Named Execution Environment Manager finds a machine whose Registered Environment Attributes satisfy the specified Required Environment Attributes, the Named Execution Environment Manager then establishes an execution environment on the associated physical machine for use by the Application Process. The Named Execution Environment Manager then applies the various Named Execution Environment Attributes to this newly created execution environment, and retains this information either in memory, or on a storage device accessible to the Named Execution Environment Manager.

One of the Named Execution Environment Attributes specified by the Application Process is a logical name to be associated with the execution environment. The Application Process then provides the Named Execution Environment Manager the logical name of an environment and a request to execute in that environment. The Named Execution Environment Manager locates the associated environment and sends the Application Process's request to that environment. The request can be any command understood by the environment.

The returned values from executing the Application Process's request in the named environment is then sent to the Application Process. This is accomplished using the Thread Communication Service as described in this patent application.

Threaded State Machine

This part of the invention is a state machine manager thread providing the administration of a state machine, and the administration and execution of various components of a state machine.

Exemplary Embodiments of the Invention

Without limiting the generality of the invention as summarized above, the following descriptions, taken with the accompanying Figures, further provide specific examples of how the various aspects of the invention may be embodied in particular software. Those skilled in the art will recognize that changes in form and details may be made therein without departing from the scope and spirit of the invention.

Thread Directory Service

A Thread Service Directory contains zero or more entries describing Service Threads. A Service Thread is defined as an entity providing some form of a service which may or may not require direct interaction with an application program. Each Thread Service Directory entry contains items 2 and 4 below, and desirably one or more of the other entries described below:

1. textual description of the type of service;
2. sending communication primitive and receiving communication primitive;
3. communication mechanism used in establishing this service;
4. Location of the service;
5. input types understood by the service;
6. output types generated by the service;
7. keyword search list used to locate this service entry;
8. token describing if the execution of the service can be started;
9. token describing the data representation in communication with the service, i.e., binary, ASCII, etc.;
10. token describing if the execution of the service must have previously been started;
11. token describing if Thread Communication Identifier is listed or is unlisted;
12. token describing if a public connection to the service can be used;
13. token describing if a private connection to the service can be used;
14. token describing if a public connection is mandatory;
15. token describing if a private connection is mandatory;
16. token describing if the service is a component of a larger service;
17. shell actions to execute in initializing this service;
18. the maximum number of concurrent communications;
19. licensing information;
20. other general user information;
21. link to additional Services required in using this service;
22. series of status information components including but not limited to security privileges and owner information;
23. series of additional information components used for future enhancements;
24. Thread Communication Identifier;
25. Secondary Thread Service Directory;
26. Usage Fee;
27. Directory Service Fees.

Access to the Thread Service Directory is provided by the Thread Directory Service which executes as a separate thread but which may be called from an application program. The Thread Directory Service offers a series of operations such as REGISTER, DELETE, QUERY, and others.

When a new Service Thread is made available to the computer system, it can register its service by calling the Thread Directory Service specifying a REGISTER operation and providing the required information along with any optional information or attributes. Alternatively, a separate application can register other Service Threads available to the computer system by calling the Thread Directory Service and specifying a REGISTER operation along with the appropriate information. This permits a separate application program to provide this information without requiring the Service Thread to register itself. Duplicate entries in a given Thread Service Directory are not permitted. In this instance, the Thread Directory Service will return an error indication to the registering thread. In registering the Service Thread, the Thread Directory Service will assign a unique Thread Communication Identifier to be associated with the Service Thread. The Thread Directory Service will then return this identifier to the thread registering the service.

A Service Thread can subsequently request that its entry is to be deleted from the Thread Service Directory by calling the Thread Directory Service and requesting a DELETE operation. Alternatively, a separate application thread, with appropriate permissions can perform the same operation.

A thread can query the information in the Thread Service Directory by calling the Thread Directory Service specifying a QUERY operation and providing zero or more components of an entry on which the Thread Service Directory is to search for. This information is then made available to the requesting thread.

A special Thread Directory Administrator Service is also provided to the owner of the Thread Directory Service to perform various administrative functions such as report generation, directory reordering, billing, and trouble reporting. The Thread Directory Service and its components provides for software what the telephone companies provide for their end users. The entire Thread Directory Service and its components are implemented through software and require no physical wire connection as does the telephone to use its service with the exception of any internal computer hardware.

Note that the Thread Directory Service and its representation of the Thread Service Directory can be maintained on separate computer facilities connected through some form of a communication channel such as, but not limited to, a network, a telephone modem, a direct link, fiber connection, or wireless connection. The only caveat is that there must be some form of communication available between these computer systems. Additionally, it is possible for the Thread Directory Service to establish communications through several computer systems to ultimately reach one or more additional Thread Service Directories.

Thread Communication Service

The Architecture

The Thread Communication Service (TCS) is a computer software method to dynamically administer the communications of two or more Minor Services of an Application Process. In this context, the Minor Services are referred to as communication points.

A communication point can request the TCS to connect it to another communication point and in doing so, the TCS is said to have established a Thread Communication Link (TCL) between the communication points. Through the TCL, a communication point can send data to the connected communication point, and, can receive data from the connected communication point. When a communication point no longer needs the TCL, it notifies the TCS to disconnect the TCL.

Communication Primitives

Communication primitives are the low level mechanism used to transmit and receive data between two or more communication points. The communication primitives are constructed using low level operating system interfaces which provide the underlying connectivity and synchronization requirements. To use a communication primitive with the Communication Manager, the communication primitive must provide the following operations:

CREATE: allocates and initializes a new copy of the communication primitive
DESTROY: de-allocates a copy of the communication primitive
SEND: sends data out to the communication primitive and notifies receiver of pending message
RECEIVE: receives data from the communication primitive
RECONNECT: provides a method to cycle a communication primitive with a NULL message
CONNECT: a special method for perform a connection
DISCONNECT: a special method to perform a disconnect
SUSPEND: a special method to suspend the execution of this type of communication primitive
RESUME: a special method to resume the execution of this communication primitive Two examples of communication primitives are the queueConditionThread and queueConditionProcess. The queueConditionThread provides a communication primitive between Application Services executing in the same address space, whereas a queueConditionProcess provides a communication primitive for use between Application Processes executing in disjoint address spaces.

queueCondition Thread Operations

The following are queueConditionThread operations:
CREATE: allocate the storage space for a queueCondition primitive and initialize the message queue, the condition variable and the mutex
DESTROY: de-allocates the storage space of a queueConditionThread
SEND: locks the message queue, posts the message to the queue, broadcasts the condition of the queue has changed and unlocks the queue
RECEIVE: locks the message queue, reads the message from the queue, and unlocks the queue
RECONNECT: locks the message queue, posts a NULL message to the queue, broadcasts the condition of the queue has changed and unlocks the queue queueConditionProcess Operations The following are queueConditionProcess operations:
CREATE: allocates the storage space for a queueConditionProcess primitive in a shared memory segment, or a mapped memory region and initialize the message queue, the condition variable and the mutex
DESTROY: de-allocates the storage space of the queueConditionProcess primitive from the shared memory segment, or the mapped memory region
SEND: locks the message queue, posts the message to the queue, broadcasts the condition of the queue has changed and unlocks the queue
RECEIVE: locks the message queue, reads the message from the queue, and unlocks the queue
RECONNECT: locks the message queue, reads a NULL message from the queue, and unlocks the queue The TCS maintains a list of available communication primitives for use by the communication points. This list is referred to as the Communication Primitives List. The queueConditionThread and queueConditionProcess primitives are added to this list. Each member of this list is a communication primitive and contains references to the available operations for this primitive.

The Application Process can add a member, delete a member, or query member information from the Communication Primitive List.

Communication Primitives can be added for all low level physical networks, and for higher level OSI protocols. These include NetWare, TCP/IP, X.25 communications and the likes. The only requirement is that the communication primitive provide the operations described above.

The Application Process can request the TCS to REGISTER a communication primitive for use in subsequent communications. The communication primitive is identified by:
1) its address within the operating system, or
2) by its reference name supported by the underlying operating system, such as a shared object from a shared library, or, 3) the Application Process can request the communication primitive to be registered in the Thread Directory Service (see the description of TDS), or
4) the Application Process can request the BINDER SERVICE to bind the identifiable name to an entity understood by the BINDER SERVICE.

The Communication Primitive should, however, be a loadable module that the underlying operating system can load as part of the Application Process requesting a connection to a communication point, as described below.

The list of Communication Primitives available to the Application Process can be retained in memory, or, retained in a file on a storage medium (disk), or, retained in the TDS, or, retained in an Application Process accessible to the requesting Application Process.

Registering Communication Points

The Application Process can requests the TCS to REGISTER a Minor Service as a communication point. The Minor Service is identified by:
1) its address within the operating system, or,
2) by its reference name supported by the underlying operating system, such as a shared object from a shared library, or,
3) the Application Process can request a Minor Service to be registered in the Thread Directory Service (see the description of TDS), or
4) the Application Process can request the BINDER SERVICE to bind the identifiable name of the service to an entity understood by the BINDER SERVICE, or,
5) by other means supported by the underlying operating system to ensure that the operating system can resolve the reference (i.e., the binding of the name is done by the operating system when the name is referenced in a connection).

In the registration process, the communication point can be identified as either a Sender communication point, a Receiver communication point, or as both a Sender and a Receiver communication point. The registration process can also permit the Application Process to specify the desired low level communication primitive to use when the communication points is to Receive communications, and the communication primitive to use when the communication point is to Send communications. The specifications for the low level communication primitive can include:
1) its address within the operating system, or,
2) by its reference name supported by the underlying operating system, such as a shared object from a shared library, or,
3) the Application Process can query the list of available communication primitives from the TDS, or from the Application Process itself, or,
4) the Application Process can request the BINDER SERVICE to bind the identifiable name of the communication primitive to an entity understood by the TCS, or,
5) by other means supported by the underlying operating system to ensure that the operating system can resolve the reference (i.e., the binding of the name is done by the operating system when the name is referenced).

The list of registered communication points can be retained in memory, or, retained in a file on a storage medium accessible to the computer system, or, retained in the TDS, or, retained in an Application Process accessible to the requesting Application Process.

Connecting Communication Points

The Application Process can request the TCS to CONNECT two communication points with a TCL. In specifying the communication points, the TCS ensures that one communication point is a Sender communication point and the other communication point is a Receiver communication point. Further, the Communication Manager ensures that the Sender communication point and the Receiver communication point both use the same underlying synchronization primitive for connectivity and synchronization. If either condition is not satisfied, the Communication Manager will abort the request and notifies the Application Process of the error condition.

Communication Point Selection

The selection of the communication points is determined by the implementation which could include:
1) the Application Process provides the name (and possibly the location) of the Minor Service, or,
2) the Application Process calls the TDS to search for a communication point based on specific criteria, or,
3) the Application Process uses the BINDER SERVICE to bind an arbitrary named representation to an entity understood by the TCS, or,
4) the Application Process uses the underlying operating system implementation to resolve the name of the entity.

Regardless of the method used, the TCS must be able to resolve the name and location of the communication point. If the TCS cannot determine the name and location of the first communication point, it will call the TDS to determine if the name represents a Thread Communication Identifier as described in the Thread Directory Service (TDS) section of this application.

Creating Communication Points

If necessary (based on registration data; see the section on TIDS), the TCS will start an invocation of a communication point as a separate thread of control. The invocation of a communication point can be as a separate process, or, as a separate thread. In either case, the TCS will begin the invocation of the Minor Service if the Minor Service must be executed, and if there are no administrative constraints, such as the number of instances of runnable Minor Services of the specified type has been exhausted (See the section on TDS).

Alternatively, the Application Process can request that the TCS CREATE an instance of a particular Minor Service without specifying a communication point that should be attached to it. This permits the TCS to begin the execution of the communication point, subject to the constraints in the preceding paragraph), and permit the communication point to perform some processing prior to having a connected communication point. This is particularly useful for daemon Minor Services performing housekeeping (memory management, etc). At a later time, the Application Process can request the TCS to connect a communication point to this CREATED communication point.

In creating the Minor Service, the requesting Application Process can specify if the Minor Service is to be executed as a Sender, Receiver, or both. This information can be compared against the registered information to ensure the Minor Service has desired communication capability. The TCS performs the following actions:
1) locate the requested service and complain if it cannot be found; otherwise establish a thread communication link for this communication point (allocates memory and initializes) and record the location of the Minor Service communication point.
2) if the Minor Service communication point has the capability to send:
  a) locate the communication primitive used by the Minor Service to send.

b) create an instance of the communication primitive (allocate memory and initialize) This is accomplished by executing the communication primitive's CREATE operation.
c) set the minimum threshold value (when there are this many messages waiting to be retrieved from the connected communication point, then resume the execution of this communication point). Note that a default value of zero discontinues this feature.
d) set the maximum threshold value (when there are this many messages having been sent, but still not received by the connected communication point, then suspend the execution of this communication point). Note that a default value of zero discontinues this feature.
e) load the communication primitive into memory if not already available.
f) this information (related to step 2) is stored in the Minor Service communication point's thread communication link area for the sender.

3) if the Minor Service communication point has the capability to receive:
  a) locate the communication primitive used by the Minor Service to receive.
  b) create an instance of the communication primitive (allocate memory and initialize). This is accomplished by executing the communication primitive's CREATE operation.
  c) set the minimum threshold value (when there are this many message waiting to be received, then resume the execution of the sender). Note that a default value of zero discontinues this feature.
  d) set the maximum threshold value (when there are this many messages waiting to be received, then suspend the sender). Note that a default value of zero discontinues this feature.
  e) load the communication primitive into memory if not already available.
  f) this information (related to step 3) is stored in the Minor Service communication point's thread communication link area for the receiver.

4) using the located communication point information, start an instance of the communication point and notify it of the communication control structure as defined above.

Connecting Communication Points

The Application Process can request the TCS to connect two communication points such that the communication points can communicate with each other. If either communication point is not currently active, the TCS will CREATE the missing communication point (see Creating Communication Points).

When both communication points are created, the TCS will link the two communication points based on the specified communication direction which is given as one of:

Direction 1) the request is to connect two communication points with each communication point being able to send and receive, or Direction 2) the request is to connect one communication point to send and the other communication point to receive, or Direction 3) the request is to connect one communication point to receive and the other communication point to send, or Direction 4) the request is to connect one communication point to neither receive nor send, and the other communication point to neither receive nor send; thus ensuring the specified communication points are simply CREATED.

Figures 9, 10:
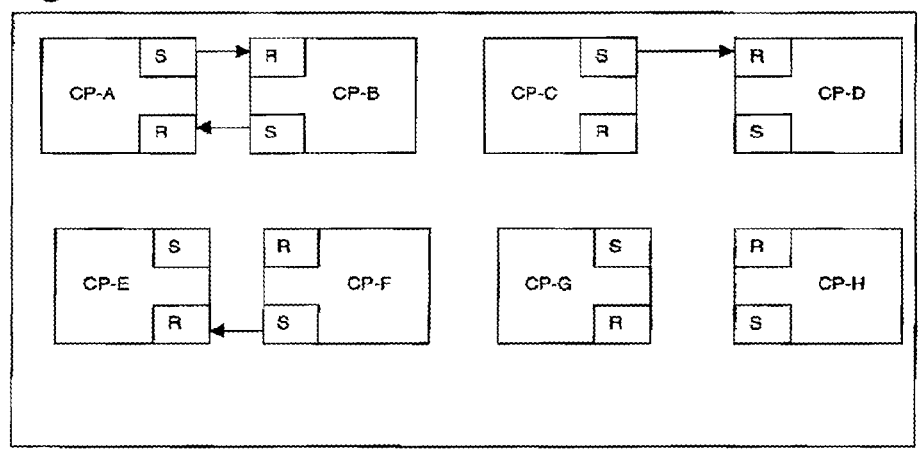
FIG. 9. Diagram showing Directed Communication Types between Communication Points FIG. 10. Diagram showing Theoretical Open Systems Interconnection (OSI) Model.

For the purposes of describing the connection process, with reference for example to FIG. 9, we describe the case of CP-A being connected to CP-B using communication direction 1 as described above:
  step 1) add CP-B's receiver to CP-A's senderlist.
  step 2) add CP-A's sender to CP-B's receiverList.
  step 3) add CP-A's receiver to CP-B's senderlist.
  step 4) add CP-B's sender to CP-A's receiverList.
  step 5) if the CP-A service is idle, then reactivate it.
  step 6) if the CP-B service is idle, then reactivate it.

For the case of CP-C being connected to CP-D using communication direction 2, as described above, then step 1) and step 2) are not completed. For the case of CP-E being connected to CP-F using communication direction 3, as described above, then step 3 and step 4 are not completed. For the case of CP-G being connected to CP-H using communication direction 4, as described above, then step 1), step 2), step 3) and step 4) are not completed.

In this manner, the TCS establishes a communication link between the two communication points. In specifying a CONNECT request, the Application Process may specify only one of the two communication points.

If a Sender communication point is not specified, then the requesting Application is Process is assumed to be the Sender communication point. If the specified Receiver communication point is not currently executing, then the TCS will issue a CREATE operation for the Receiver communication point.

Alternatively, if the Application Process does not specify a Receiver communication point, then the Application Process is assumed to be the Receiver communication point. If the specified Sender communication point is not currently executing, then the TCS will issue a CREATE operation for the Sender communication point.

Once connected, the Receiver communication point uses the RECEIVE operation of its Receiver to Receive message. The Sender communication point uses the SEND operation of its Sender to send message.

Note that certain communication primitives require specialized initializations for establishing connections and hence, if the communication primitive contains a CONNECT function pointer, then the communication primitive's CONNECT function will be executed before any other steps in this section.

Suspending Communication Points

The Application Process can request the TCS to SUSPEND a TCL currently in use by two communication points. In suspending the TCL, the TCS will temporarily suspend the execution of the Sender communication points. Alternatively, if the Sender communication primitive has a special SUSPEND operation defined, then the TCS will invoke that SUSPEND operation.

Resuming Communication Points

The Application Process can request the TCS to RESUME a TCL currently in the suspended state. In resuming the TCL, the TCS will resume the execution of the Sender communication points. Alternatively, if the communication primitive of the SENDER has a special RESUME operation defined, then the TCS will invoke that RESUME operation.

Disconnecting Communication Points

The Application Process can request the TCL to DISCONNECT one or more communication points using a TCL. In performing the disconnect, the TCS temporarily suspends the communication points, removes the current TCL, and restores the prior TCL associated with the communication points. The execution of the communication points are then resumed. The requesting Application Process can specify if the TCS is to terminate either or both of the communication points participating in the thread communication link being disconnected.

For each point being disconnected, the TCS will perform the following actions:
1) if the receiver component of the communication point is defined and the receiver communication primitive has a DISCONNECT operation defined, then the TCS will invoke that operation.
2) if the sender component of the communication point is defined and the sender communication primitive has a DISCONNECT operation defined, then the TCS will invoke that operation.

Destroying a Communication Point

The Application Process can request the TCS to DESTROY a communication point. In doing so, the TCS will eliminate the registered information regarding this communication points from its storage. If the communication point is currently executing, then the TCS sends a signal to the communication point to terminate. On-some implementations, a special message may be sent by the TCS to the communication point notifying it that it is to terminate.

Reconnecting a Communication Point

An Application Process can request the TCS to RECONNECT a specified communication point. In doing so, the TCS will send a NULL message to the communication point. This is useful to determine the state of the communication point and to cycle the communication primitive.

Executing a Communication Point

The Application Process can request the TCS to EXECUTE a specified communication point. In doing so, the TCS will examine its TCL for a communication point having the specified name. If the communication point is not currently executing, then TCL will issue a CREATE request for the specified communication point. The communication point's thread is then specified to resume execution. In this manner, a daemon Minor Service can be created.

Note that if the communication point is a Receiver communication point, then the communication point will presumably block on its first call to its communication primitive's RECEIVE operation. Alternatively, if the communication point is a Sender Minor Service, then the communication point will presumably continue to send messages using its communication primitive's SEND operation, and these message will remain until a Receiver communication point is connected.

Example TCS Application Program

FIGS. 25A through 25P provide an example of registering communication points (Minor Services) and connecting the Application Process to these communication points to take advantage of the Minor Service.

FIGS. 26A through 26J contain sample input for a Minor Service called the broker service.

FIG. 28 contains the communication data header file used by the communication data module with the example TCS Application Program.

FIGS. 29A through 29B contain an example communication data module to be used with the example TCS Application Program.

FIGS. 30A through 30B contain the communication point header file used by the communication point module with the example TCS Application Progra, FIGS. 31A through 31G contain the communication point module providing the ability to create a communication point in the example TCS Application Program. A communication point can also be destroyed using the Destroy function of this module.

FIGS. 32A through 32B contain an example communication registration header file used by the communication registration module with the example TCS Application Program.

FIGS. 33A through 33G contain an example communication registration module to register a Minor Service available to the example Application Process.

FIGS. 34A through 34B contain the example compoint header file used by the example compoint module with the example TCS Application Program.

FIGS. 35A through 35B contain the example compoint module describing memory management functions representing the communication point with the example TCS Application Example.

FIG. 36 contains an example thread condition variable header file used by the example thread condition variable module with the example TCS Application Program.

FIGS. 37A through 37C contain an example thread condition variable module for use with the example TCS Application Program.

FIG. 38 contains an example generic communication point header file for use with the example TCS Application Program.

FIGS. 39A through 39H contain an example generic communication module for use with the example TCS Application Program.

FIGS. 40A through 40C contain an example thread link list header file for use with the example TCS Application Program.

FIGS. 41A through 41N contain an example thread linklist module for use with the example TCS Application Program.

FIGS. 42A through 42B contain an example of a mutex thread log header file for use with the example TCS Application Program.

FIGS. 43A through 43G contain an example of a mutex module for use with the example TCS Application Program.

FIG. 44 contains an example of a thread mutex module header file for use with the thread mutex module with the example TCS Application Program.

FIGS. 45A through 45C contain an example of a thread mutex module for use with the example TCS Application Program.

FIGS. 46A through 46B contain an example of a communication primitive header file for use with the communication primitive module listed in FIGS. 47A through 47D.

FIGS. 47A through 47D contain an example of a communication primitive module providing a Create, Destroy, Load, and Unload function for use with the example TCS Application Program.

FIG. 48 contains an example of a communication primitive's data header file for use with the communication primitive's data module described in FIGS. 49A through 49B for use with the example TCS Application Program.

FIGS. 49A through 49B contain an example of a communication primitive's data module for use with said example TCS Application Program.

FIG. 50 contains an example of a thread queue condition header file for use with the thread queue condition module described in FIGS. 51A through 51E for use with said example TCS Application Program.

FIGS. 51A through 51E contain an example of a thread queue condition module for use with said example TCS Application Program.

FIG. 52 contains an example of a registry header file for use with the registry module described in FIGS. 53A through 53B for use with the said example TCS Application Program.

FIGS. 53A through 53B contain an example of a registry module for use with the said example TCS Application Program.

FIGS. 54A through 54D provide an example of a minor service communication module providing a weather service as an available Minor Service for the Application Process to register, create, and subsequently connect to, and a broker service as an available Minor Service for the Application Process to register, create, and subsequently connect to. These are to be used with the said example TCS Application Program.

FIG. 55 provides an example of a thread reader-writer lock header file for use with the thread reader-writer module described in FIGS. 56A through 56C for use with the said example TCS Application Program.

FIGS. 56A through 56C provide an example of a thread reader-writer module for use with the said example TCS Application Program;

Thread Communication Switching Services

The Thread Service Directory Communication Link provides the ability for a Thread Communication Link between Application Threads and Service Threads. A Service Thread may establish additional Thread Communication Links with other Service Threads, or Application Threads. In this context, each thread is said to be a Thread Communication Point (TCP). Note: As used in this section, the term TCP does NOT refer to "Transmission Control Protocol." In its simplest example, this is shown in FIG. 1 in which the Thread Communication Point labeled TCP-1 is connected to the Thread Communication Point labeled TCP-2 through a Thread Communication Link (TCL). See FIG. 1.

Figure 2:
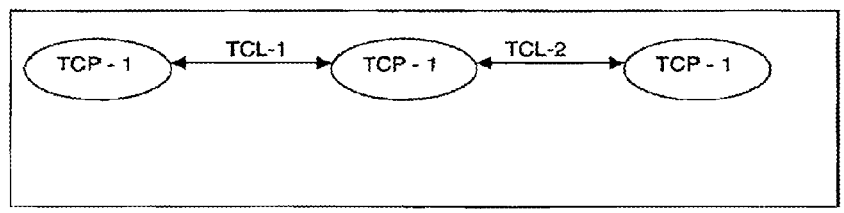
FIG. 2. Diagram showing Two Thread Communication Links.

With additional Thread Communication Points becoming linked through Thread Communication Links it is possible for a particular thread to request a Thread Communication Link to another thread already linked at some further point. As an example, consider FIG. 2 which shows a Thread Communication Point labeled TCP-1 connected to a Thread Communication Point labeled TCP-2 through a Thread Communication Link labeled TCL-1. Additionally, TCP-2 is connected to a Thread Communication Point labeled TCP-3 through a Thread Communication Link labeled TCL-2. In this example, if TCP-1 requested a link to TCP-3, an additional Thread Communication Link must be established. (See FIG. 2.)

Figure 3:
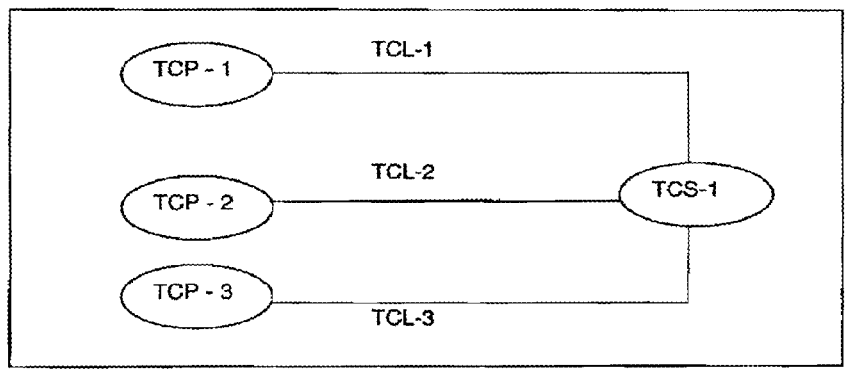
FIG. 3. Diagram showing Thread Communication Switch and Three Thread Communication Links.

Through the use of this invention, it is possible to have multiple Thread Communication Points sharing a Thread Communication Link by establishing a Thread Communication Switch to route the communications between the appropriate Thread Communication Points. As an example of using a Thread Communication Switch, see FIG. 3, which shows three Thread Communication Points labeled TCP-1 though TCP-3 connected to a Thread Communication Switch labeled TCS-1 through Thread Communication Links labeled TCL-1 through TCL-3. (See FIG. 3.)

Figure 4:
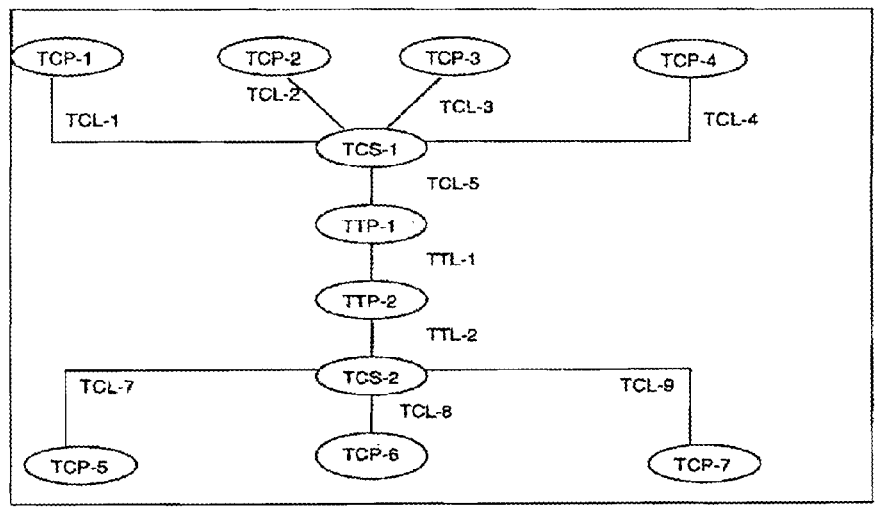
FIG. 4. Diagram showing Thread Trunk Line.

A Thread Communication Switch can be connected to a Thread Trunk Point (TTP) which provides for communications to another Thread Trunk Point which may in turn have a Thread Communications Link to a Thread Communication Switch or to a Thread Communication Point. This provides a communications link over longer distances than the simple point-to-point as described in FIG. 1. As an example of using a Thread Trunk Point, see FIG. 4 which shows four Thread Communication Points labeled TCP-1 through TCP-4 connected to a Thread Communication Switch labeled TCS-1. The TCS-1 has a Thread Communication Link to the Thread Trunk Point labeled TTP-1. This Thread Trunk Point in turn has a Thread Trunk Link labeled TTL-1 to a destination Thread Trunk Point labeled TTP-2. The TTP-2 has a Thread Communication Link to a second Thread Communication Switch labeled TCS-2. The TCS-2 has Thread Communication Links to Thread Communication Points labeled TCP-5 through TCP-7. (See FIG. 4.)

The use of the Thread Communication Points, the Thread Communication Link, the Thread Communication Switch, the Thread Trunk Link, and Thread Trunk Points can span multiple computer systems interconnected through some form of communications such as, but not limited to a network, a direct connection, a fiber connection, a telephone modem, and a wireless connection.

As will be appreciated by those skilled in the art, the specific representation of the Thread Communication Link is dependent on the underlying operating system's communications capability and its synchronization primitives.

Binding Service

1. Overview

The Binding Service is a method, implemented in computer software, to dynamically administer the association of one or more arbitrary named representations with entities understood by the Application Process. Each arbitrary named representation is a sequence of one or more bytes applied at the Application Process level.

1.1. Definitions

An arbitrary named representation is initially considered as Unbound. When an association between the arbitrary named representation is made with an entity understood by the Binding Service, then the arbitrary named representation is considered Bound. The process of determining the association is called the Binding Process. The Binding Process applies an ordered series of Binding Methods to determine if an association between an arbitrary named representation and the entities understood by the Binding Service can be made.

To determine the significance of an arbitrary named representation within the scope of the Application Process, the Application Process can request the Binding Service to apply the Binding Methods to the arbitrary named representation to determine what entity the name represents.

1.2. Binding Methods

The Binding Service provides a series of Default Binding Methods including the ordering of Binding Methods as should be applied by the Binding Service. These Binding Methods and their ordering are specified in a Binding Configuration File which is read by the Binding Service during its initialization. Additional Binding Methods can be added to the Binding Configuration File by the end user. Other Binding Methods can be registered with the Binding Service during the Application Process's run time execution. The registration of a Binding Method must include the information shown in Table 6.

TABLE 6

Binding Method Registration Information.

Order of Evaluation
Location of Binding Method
Name of Binding Method 1.3. The Default Binding Methods The Default Binding Methods and their definitions include those shown in Table 7.

TABLE 7

Default Binding Methods.

File Binding Method a method to bind the arbitrary named representation to a file accessible by the computer system Shell Binding Method a method to bind the arbitrary named representation to a user level shell Data Binding Method a method to bind the arbitrary named representation to a datum available to the Application Process Function Binding Method a method to bind the arbitrary named representation to a function (procedure) accessible to the Application Process Thread Binding Method a method to bind the arbitrary named representation to a thread of the Application Process Process Binding Method a method to bind the arbitrary named representation to an existing Application Process

1.4. The Binding Method Operations

Each Binding Method must have associated with it the series of binding method operations shown in Table 8. The Binding Method is described to the Binding Service through five function pointers describing the location of each operation. The function pointers are specified in the order shown in Table 8.

TABLE 8

Binding Method Operations.

Pattern Matching Method
Name Transformation Method
Locate Method
Status Method
Query Method

1.4.1. Description Of Binding Method Operations

Pattern Matching: if the arbitrary named representation matches the specified regular expression pattern, then apply the Locate Operation to determine if the named representation can be found. If the Pattern Matching Method is specified as NULL, then proceed as if the name was matched. If the arbitrary named representation does not match the specified regular expression pattern, then go to the next Binding Method.

Transformation: if the arbitrary named representation successfully completes the Pattern Matching operation, then apply the Transformation operation to the arbitrary named representation and use this transformed name for subsequent operations. If the Transformation operation is not specified for this Binding Method, then use the specified arbitrary named representation for subsequent operations.

Locate Operation: use the registered Locate operation to see if the arbitrary named representation can be found. If the Locate Method returns success, then the arbitrary named representation is considered BOUND using this Binding Method. If the Locate operation fails, then the arbitrary named representation remains unbound.

Status Operation: given a BOUND arbitrary named representation, use this operation to retrieve the status information describing this entity. This includes the following information:

arbitrary name: the specified arbitrary named representation expanded name: the expanded description to be associated with this arbitrary named representation owner information: description of the owner of this bound entity status timers: includes the creation time, the last modification time, the last access time size: the size of the entity in bytes value: the last recorded value associated with the entity entity-specific data: entity-specific data values including the size of this data Query Operation: given a BOUND arbitrary named representation, report the status information as described by in the Status Operation.

1.5. Binding Service Interface

The Binding Service itself provides the following interfaces for the Application Process:

Register: register a new Binding Method

Set Order: set the ordering of the Binding Methods

Unregistered: remove a Binding Method

Bind: apply the Binding Methods on a specified arbitrary named representation

Unbind: unbind the arbitrary named representation

Establish: request the Binding Service to read a specified Binding Service Configuration File Report: report the requested information to the Application Process. This may include the list of Binding Methods, the order of evaluation of Binding Methods, and/or the characteristics of the Binding Methods Query: report the requested information on the arbitrary named representation to the Application Process Purge: delete all references to arbitrary named references that are currently UNBOUND.

2. The Architecture

2.1. Binding Service Initialization

The Binding Service, upon initialization will read a Binding Service Configuration File containing zero or more entries of the form:

1. Order of Evaluation: is a numeric value describing the order in which this entry should be used in binding an arbitrary named representation
2. Location of Binding Method: is the name of a dynamically loadable module (which could include a shared library name) containing the Binding Method
3. Name of Binding Method: is the name of a shared object within the dynamically loadable module that contains the references to the operations provided by the binding service.

2.2. The Binding Service Interface

2.2.1. The Register Interface

The Application Process uses the Binding Service's Register interface to register additional Binding Methods not specified in a Configuration File. The specification for the new Binding Method requires the same data as that provided through the Configuration Files. The Register interface provides a mechanism to specify additional Binding Methods even after the Binding Service has started execution.

2.2.2. The Set Order Interface

The Application Process uses the Binding Service's Set Order interface to establish a new order of evaluation to use when applying the registered Binding Methods to an arbitrary named representation.

2.2.3. The Unregistered Interface

The Application Process uses the Binding Service's Unregistered interface to remove a Binding Method from the list of available Binding Methods. The Binding Method can be removed only after all references to the Binding Method have completed their use of the method.

2.2.4. The Bind Interface

The Application Process applies the Binding Service's Bind interface to an arbitrary named representation. The Binding Service maintains a table in memory of the arbitrary named representations requested to be bound by the Application Process. This table contains the collection of arbitrary named representations previously specified to the Bind interface on behalf of the Application Process.

The first step in applying the Bind interface is to search the table to see if the specified arbitrary named representation has already been BOUND. If not, then the Binding Service will create a new entry in the table for the specified arbitrary named representation. This entry includes the arbitrary named representation and initially is marked as unbound. If the specified arbitrary named representation is already listed in the table and is marked as BOUND, then the Bind interface completes successfully without further action being required. If the specified arbitrary named representation is already listed in the table, but is marked as UNBOUND, then the Bind interface continues.

The Binding Service will then apply the Binding Methods based on the specified order of evaluation for the Binding Methods. The arbitrary named representation is then BOUND using the first Binding Method to complete successful.

In applying the Binding Methods, the Binding Service will determine if the Binding Method has been loaded into memory. If not, then the Binding Service uses the Location Operation for the Binding Method and the Name of Binding Method to dynamically load the Binding Method into memory. The Binding Method is then applied given the constraints mentioned above.

During the evaluation of the Binding Methods, the Binding Service will first examine the Binding Method to see if it has an associated Pattern Matching operation. If so, then the arbitrary named representation is compared against the specified expression pattern using the specified Pattern Matching operation. If the arbitrary name does not compare with the specified regular expression pattern then the next Binding Method is applied. If the Pattern Matching operation is specified as NULL, or if the expression pattern is specified as NULL, or if the arbitrary named representation compares with the specified pattern, then the arbitrary named representation is considered for binding to this Binding Method.

Upon successfully completing the Pattern Matching operation, the Binding Service applies the Name Transformation operation, if specified for the Binding Method. The Name Transformation operation is used to generate an alternative named representation which will then be used for the Locate and the Status operations described below.

When the arbitrary named representation is considered for binding to a Binding Method, then the Binding Service will invoke the Binding Method's Locate operation to locate the entity associated with the alternative named representation, or the arbitrary named representation if the alternative is not defined. If the Locate operation fails and a pattern was specified, then the arbitrary named representation is considered BOUND, but not found. Otherwise, the arbitrary named representation remains UNBOUND.

Finally, when the arbitrary named representation has been BOUND, and has been located, then the Binding Service applies the Binding Method's Status Operation to ascertain the current status of the bound entity. This information is then retained in the Binding Service's table.

The Binding Service maintains the representation of the BOUND entity within its scope. This information is not directly available to the Application Process. Instead, the Application Process must use the Binding Service's Query operation to access this information.

2.2.5. The Unbind Interface

The Application Process uses the Binding Service's Unbind Interface to mark a previously bound arbitrary named representation as now being unbound.

2.2.6. The Report Interface

The Application Process uses the Binding Service's Report interface to report useful information on the current representation of the contents of the Binding Service's data. This includes information relating to the Binding Methods.

2.2.7. The Query Interface

The Query interface reports the information available through the Query operation of the Binding Method used to bind the arbitrary named representation. If the arbitrary named representation is currently UNBOUND, then the Query interface returns only the name of the entity.

2.2.8. The Purge Interface

When the application calls the Binding Service's Purge interface, the Binding Service deletes all arbitrary named references in its table that are UNBOUND at the time of the call.

Dynamic Configuration Management

The Application Process constructs a Dynamically Configured Application Program in the DCM by specifying a series of RULES identifying the components of the Dynamically Configured Application Program, the interactions between these components, the policy for evaluating these components, the order of evaluation of these components, and a method for satisfying the RULE. Additionally, the Application Process can specify zero or more data files referred to as Application Program Rules Files containing RULES for the Dynamically Configured Application Program. In this sense, the Application Process provides the blueprint for constructing the Dynamically Configured Application Program either through an Application Programming Interface and through zero or mode Application Program Rules Files. Once constructed, the Application Process can then request the DCM to execute the Dynamically Configured Application Program.

Rule Specifications

The specification of a RULE includes the information shown in Table 9, although additional information may be provided by the actual implementation:

TABLE 9

Rule Specification Components.

A unique alphanumeric name to identify the RULE
A DCM operator denoting the policy for evaluating the RULE
Zero or more Prerequisite Universal RULES
Zero or more Attributes describing characteristics of the RULE
A method (possibly given as NULL) for satisfying the RULE Rule Classifications There are two classifications of RULES supported by the DCM given as Reserved Rules and Universal Rules. The Reserved Rules have special meaning to the DCM and cannot be redefined. The Universal Rules are specified by the Application Process. In either case, however, the Rules contain the minimum information described in Table 9.

A series of one or more Reserved Rules, referred to as the Flow Rules, provide the framework for executing the Dynamically Configured Application Program. Whenever a Dynamically Configured Application Program is to be executed, the DCM begins by evaluating the Flow Rules. All other actions are derived as a result thereof. The Flow Rules are shown in Table 10.

TABLE 10

The Flow Rules.

DCMINIT RULE
APINIT RULE
MAIN RULE
DONE RULE
APDONE RULE
DCMDONE RULE

The MAIN RULE must be specified for the Dynamically Configured Application Program to execute. The other Flow Rules (DCMINIT, APINIT, DONE, APDONE, and DCM-DONE are optional).

Executing The Dynamically Configured Application Program

The DCM groups all Rules with the same name together as if they were specified as a single entity. This permits, for example, the Application Process to specify potions of a Rule during initialization sequences and the remainder of the Rule when initialization has completed.

The DCM will evaluate each of the specified Flow Rules in the order shown in Table 10. In evaluating a RULE, the DCM views the RULE name as the current rule. The evaluation process is such that the DCM will first evaluate all Prerequisite Rules of the current rule. Thus, a Prerequisite Rule becomes the current rule and the evaluation continues with its Prerequisite Rules. This is implemented using well known directed graph techniques.

When the current rule has no Prerequisite Rules listed, and the DCM determines the current rule's method must be executed, then the DCM will execute the method for this rule. After executing the method for the current rule, the DCM attaches a time stamp value denoting when the current rule was evaluated.

When the current rule has one or more Prerequisite Rules, then the DCM compares the time stamp value of the current rule with that of its Prerequisite Rules. If the time stamp value of the current rule is older than the time stamp value of its Prerequisite Rules, then the current rule's method is executed to satisfy the rule and the time stamp value of the current rule is updated to denote when the current rule's method was executed Otherwise, the current rule's time stamp value remains unchanged and the method is not executed.

After evaluating the last Flow Rule of the Dynamically Configured Application Program, the DCM considers the application as having completed and returns control back to the requesting Application Process.

Evaluation Policies

The policy for evaluating a RULE is determined by the DCM operator component of the RULE. By default, a TIME.sub.--VALUE operator (:) will be applied which provides the behavior as described above. Additional DCM operators can be derived and implemented into the DCM to describe the relationship between the RULE and its Prerequisite Rules.

Figures 5, 6:
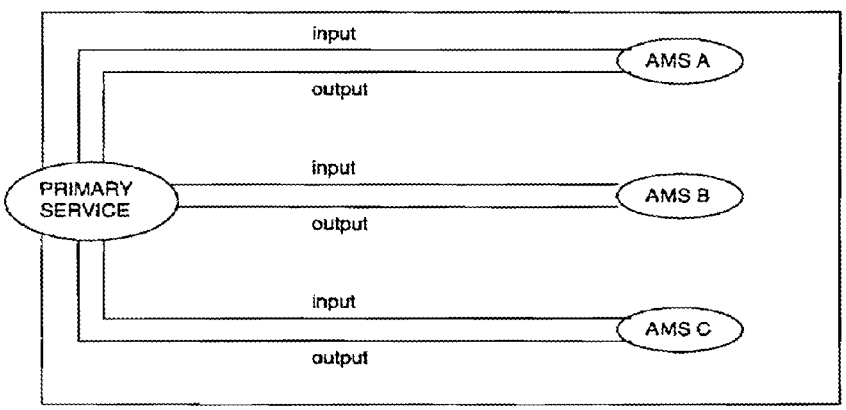
FIG. 5. Diagram showing Example Dynamically Configured Application Program Rules.
FIG. 6. Diagram showing Example Application Process.

The Application Program Rules, shown in FIG. 5, provides an example of a Dynamically Configured Application Program. (See FIG. 5.)

The DCMINIT and the APINIT Rules are shown without Prerequisite Rules. When the MAIN Rule is evaluated, the DCM finds that it is dependent on Rule-A and thus must evaluate Rule-A. In doing so, it finds Rule-A is dependent on Rule-B and must therefore evaluate Rule-B. The evaluation of Rule-B shows that Rule-B does not have any prerequisite Rules. After Rule-B has been evaluated, the DCM resumes the evaluation of Rule-A. Upon completion of Rule-A, the DCM resumes the evaluation of the MAIN Rule. When the MAIN Rule has been completed, the DCM next evaluates the DONE Rule and finds that it has Rule-C as a prerequisite rule. It therefore evaluates Rule-C and then continues with the DONE Rule. Finally, the APDONE and DCMDONE Rules are evaluated.

Binding Methods

Initially when a RULE is specified, the DCM makes no assumptions as to what the RULE name represents. During the evaluation of the RULE, the DCM uses the Binding Service to associate the RULE name with an entity understood by the DCM. The list of entities understood by the DCM and their corresponding interpretation by the DCM are provided during the initialization of the DCM. The list of entities appear in the Binding Service's Configuration File. In this sense, the list of entities can be modified and updated over time based on market demand for new entities and their interpretations. Initially, the DCM provides the Binding Methods for:

SHARED LIBRARY BINDING METHOD: The rule represents a shared library available to the Application Process.

SHARED OBJECT BINDING METHOD: The RULE name represents a shared object from a shared library. If the RULE has a prerequisite RULE BOUND to a SHARED LIBRARY, then the shared object is presumed to exist in that library. If the method for the rule is to be executed, then the DCM opens the shared library, extracts the shared object, and executes the shared object. To specify a SHARED OBJECT BINDING METHOD, the rule must have the Reserved Rule SHARED.OBJECT as a prerequisite rule.

THREAD BINDING METHOD: The RULE name represents a procedure to invoke as a separate thread of execution within the Application Process. To specify a THREAD BINDING METHOD, the rule must have the Reserved Rule THREAD as a prerequisite rule.

SHELL BINDING METHOD: The RULE name does not represent a physical entity, but rather, its method is specified as statements to be executed by the underlying SHELL provided by the operating system. To specify a SHELL BINDING METHOD, the rule must have the Reserved Rule SHELL as a prerequisite rule.

FUNCTION BINDING METHOD: The FUNCTION BINDING METHOD associates the rule name with a function (procedure) available in the application program. The DCM will search the symbol name list for the Application Process to locate the address of the function. If the DCM must trigger the method for the rule, then the function is invoked.

FILE BINDING METHOD: The rule name represents the name of a file accessible by the computer system.

DEFAULT BINDING METHOD: If no binding method has not been specified for the rule, then the DCM will bind the rule name using the DEFAULT BINDING METHOD. The DEFAULT BINDING METHOD is to associate the rule name with a function (procedure) available in the application program. The DCM will search the symbol name list for the Application Process to locate the address of the function. If the DCM must trigger the method for the rule, then the function is invoked. If the DCM cannot locate the function in the Application Process's symbol table, then the RULE is considered to have failed.

Example: The following RULES are registered in the DCM:

spellCheck: libspell.so SHARED.OBJECT
report: spellCheck

In executing the report rule, the DCM will first evaluate the prerequisite "spellCheck" rule. In evaluating the spellCheck rule, the DCM will first evaluate the libspell.so rule. In evaluating the libspell.so rule, the DCM will not find any prerequisites of the rule and will therefore attempt to bind the libspell.so rule name. The binding method will match using the SHARED LIBRARY BINDING METHOD and the name libspell.so will be BOUND to a shared library. In evaluating the SHARED.OBJECT rule, the DCM will recognize that the spellCheck rule name is to be interpreted as a function available in the shared library libspell.so. If the method for the rule is to be executed, then the spellCheck shared object is extracted from the shared library and is invoked as a function of the Dynamically Configured Application Program.

Application Process Scope

The DCM can exist as a co-process of the Application Process, or as a sibling process of the Application Process. In the former sense, the DCM can be accessed by multiple Application Programs thus providing a sharing of information. In the later case, the DCM resides within the Application Process. There are no constraints inherent in the model to preclude the use of the DCM across multiple computer systems.

Example of Use of Invention

A Word Processing Application Program is designed. Using a standard software construction utility, converting the source code to the Application Program which in turn is sold to end-users. After the initial market acceptance of the Word Processing Application Program, additional features are developed including a Thesaurus, a Spell Checking Feature and a Grammar Checking Feature. Each of these features is designed, developed, implemented and sold as separate Minor Services for the Word Processing Application Service.

When a user purchases the Word Processing Application Program, the installation process creates a Application Program Rules file for the Word Processing Application Service. The Rules file contains:

APINIT: SetEnvironment
MAIN: WordProcessor
DONE: CleanEnvironment
SetEnvironment: setEnv
setEnv: THREAD
WordProcessor: wp
wp: THREAD
CleanEnvironment: clearEnv
clearEnv: THREAD The Application Program Rules file is then given to the DCM to establish the rules for the Dynamically Configured Application Program. When executed, the APINIT rule is evaluated, which causes the SetEnvironment rule to be evaluated which in turn causes the setEnv rule to be evaluated. The setEnv rule has a THREAD prerequisite causing the DCM to begin the procedure named setEnv as a thread of execution within the Application Process. Similarly, the wp and clearEnv rules, when evaluated, will cause the DCM to create a thread of execution within the Application Process for their named procedures.

The user subsequently purchases the Spell Checker feature and the Thesaurus, but not the Grammar Checking Feature. The installation of the Spell Checking Feature and the Thesaurus Feature cause the Application Program Rules file for the Word Processing Application Service to be modified as follows:

APINIT: SetEnvironment
MAIN: WordProcessor
DONE: CleanEnvironment
SetEnvironment: setEnv setSpellEnv setThesEnv
setEnv: THREAD
setSpellEnv: SHARED.OBJECT spell.so
setThesEnv: SHARED.OBJECT thes.so
WordProcessor: wp
wp: THREAD
CleanEnvironment: clearEnv
clearEnv: THREAD When the Dynamically Configured Application Program is executed, the following: actions are--taken by the DCM:

The APINIT rule is evaluated. In evaluating the rule, the setEnv, setSpellEnv procedure from the spell.so shared library, and the setThesEnv procedure from the thes.so shared library will both be executed during the evaluation of the APINIT rule. It is presumed that these procedures will modify the Application Process's data structures to identify their existence to the wp thread.

In this manner, individual components of an Application Service are designed, implemented, and subsequently sold as individual units to the end user.

Configurable Application Process Service

The Configurable Application Process Service is a computer software method for dynamically administering the component Minor Services of an Application Process. The Configurable Application Process Service consists of a Configuration Administrator Minor Service thread using the Communication Manager Program Service, hereinafter referred to as the CMPS, described in this patent application. Various other Minor Service threads may be created by the Configuration Administrator as described herein.

The Application Process uses the Configuration Administrator Minor Service, hereinafter referred to as the CAMS, to administer zero or more components of software. Each component is said to offer a well defined application Minor Service hereinafter singularly and collectively referred to as the AMS.

The specifications for the administration of the AMS can be provided directly by an Application Process, or, indirectly through a data store monitored by the CAMS. These specifications can instruct the CAMS to perform the desired operation immediately, at a predefined time (which may be an interval), or, as a result of sbme event which is later communicated to the CAMS.

Other technology which may be configured with the Configurable Application Process Service includes the Binding Service, as described in this patent application, hereinafter referred to as the BSV.

There are fifteen general operations available through the Configurable Application Process Service given as:

1. LOCATE: locate and report the location of a specified AMS
2. LOAD: configure the specified AMS into the Configurable Application Process Service
3. EXECUTE: execute the specified AMS
4. REPLACE: replace the specified AMS with a new AMS
5. UNLOAD: unload the specified AMS from main memory
6. DUMP.sub.--MAP: dump a map of the current values of a specified AMS
7. LOAD.sub.--MAP: load a map of the current values for a specified AMS
8. NOTIFICATION: notify the CAMS that the specified event has occurred
9. INSERT: insert the specified AMS in between two existing AMS
10. EXTRACT: removes specified AMS previously inserted with INSERT operation 11. SUSPEND: suspend the communications to a specified AMS
12. RESUME: resume the communications to a specified AMS
13. COMPRIMS: set the default communication primitives for an AMS
14. TERMINATE: terminate the execution of the specified AMS.
15. QUERY: report useful information on the current AMS being administered through the configurable Application Process Service.

Each of these operations is described below.

The LOCATE Operation

The LOCATE operation instructs the Configurable Application Process Service to locate a specified AMS. The default action performed by the CAMS is to search through the current Application Process for the specified AMS, and if not found, to search through zero or more specified shared libraries. Once located, the CAMS returns the location of the specified AMS.

When used in conjunction with the CMPS, the CAMS will also attempt to locate the specified AMS as a registered communication point.

When used in conjunction with the Binding Service, the CAMS will also attempt to locate the specified AMS according to the specified rules for binding as defined in the BSV.

The LOAD Operation

The LOAD operation instructs the Configurable Application Process Service to dynamically configure a specified AMS. The default action of the CAMS is to dynamically load the specified AMS if the AMS had not previously been loaded. Alternatively, the Application Process can request that the Configurable Application Process Service to force the LOAD to be completed, even if there is a previously loaded version of the specified AMS.

When used in conjunction with the CMPS, the CAMS will register the specified AMS as a communication point if it has not already been registered. Note that when used with the CMPS, the AMS may not be loaded into memory, but simply marked as a communication point within the CMPS. In this sense, the AMS is considered to have been configured by the LOAD operation.

Note that the LOCATE operation can be combined with the LOAD operation to provide a single operation performing the desired functionality.

Once loaded, the specified AMS is added to the LOADED AMS-List maintained by the Configurable Application Process Service.

During the LOAD operation, the Application Process can specify certain attributes describing characteristics of the specified AMS. These attributes may include, but are not limited to the following:

1. Communication Manager Program Service registration process attributes
2. Attribute describing if specified AMS can be suspended through SUSPEND operation
3. Attribute describing if specified AMS can be replaced by another AMS through the REPLACE operation
4. Attribute describing if Minor Service can have its current state dumped through the DUMP.sub.--MAP operation.
5. Attribute describing if Minor Service can have its current state changed by the LOAD.sub.--MAP operation
6. Attribute describing if the Minor Service can be Terminated through TERMINATE operation
7. Attribute describing if the Minor Service can be removed from between two Minor Services through the EXTRACT operation.
8. Attributes describing the MAP AREA generated by this AMS through the DUMP.sub.--MAP operation.
9. Attributes describing a de-allocation process for communications pending to the specified AMS at the point that the AMS is terminated through a TERMINATE operation.

Note that the actions associated with the LOAD operation can be deferred until the receipt of a specified event by the Configurable Application Process Service. If the action is to be deferred, the request is added to the EVENT AMS List maintained by the CAMS, and no further action is taken by this operation.

The EXECUTE Operation

The EXECUTE operation instructs the Configurable Application Process Service to begin the execution of a specified AMS. The specified AMS must have previously been configured with the LOAD operation.

This operation adds the specified AMS to an ACTIVE AMS List maintained by the CAMS.

The CAMS uses the CMPS to establish the necessary connectivity to the specified Minor Service. The communication primitives used by the CMPS are determined in part by the COMPRIMS operation described below.

Note that the actions associated with the EXECUTE operation can be deferred until the receipt of a specified event by the Configurable Application Process Service. If the action is to be deferred, the request is added to the EVENT AMS List maintained by the CAMS, and no further action is taken by this operation.

Note that the Application Process can specify the desired scope of the AMS to be executed. The scope must be specified as:

PRIVATE: a private version of the AMS must be executed.
PUBLIC: establish connectivity to an existing executing AMS, or start a new version of the AMS.

In either event, the Configurable Application Process Service maintains a reference for the number of executions of the AMS currently in use.

The REPLACE Operation

The REPLACE operation specifies that the Configurable Application Process Service is to replace a specified ACTIVE AMS with a different specified AMS. The existing AMS must have been started using the EXECUTE operation (thus must appear on the ACTIVE AMS List). The REPLACE operation searches the ACTIVE AMS List for the specified AMS to replace. If not found, then the operation is aborted. The new AMS replacing the existing AMS must have previously been configured with the LOAD operation and must therefore appear in the LOADED AMS List.

The CAMS will replace the existing AMS with the new AMS and reroute the communications previously destined for the existing AMS to the new AMS.

The Application Process must specify the disposition of the existing AMS which describes to the Configurable Application Process Service what is to happen to the existing AMS upon replacement by the new AMS. The disposition can be one of:

TERMINATE: the existing AMS is to be terminated according to the TERMINATE operation described below upon successful replacement by the new AMS.
SUSPEND: the existing AMS is to be suspended according to the SUSPEND operation described below.
STACK: the existing AMS is to be suspended, and a link is to be maintained from the new AMS to the existing AMS such that upon termination of the new AMS, the existing AMS will be resumed and all communications to be reestablished.

DAEMON: the existing AMS is to be left untouched, although no new communications will be permitted to that AMS.

Details on the REPLACE operation are provided in the section titled "Replace Operation Detailed Architecture."

Note that the actions associated with the REPLACE operation can be deferred until the receipt of a specified event by the Configurable Application Process Service. If the action is to be deferred, the request is added to the EVENT AMS List maintained by the CAMS, and no further action is taken by this operation.

The SUSPEND Operation

The SUSPEND Operation specifies that the Configurable Application Process Service is to temporarily suspend the execution of the specified AMS which was previously invoked through the EXECUTE operation and can be found on the ACTIVE AMS List. Note that the actual suspension may be implemented differently on various computer systems depending on the lower level operating system instructions available for the implementation. Regardless, however, the SUSPEND Operation is guaranteed to suspend the execution of the specified AMS. Once suspended the specified AMS is moved from the ACTIVE AMS List to the SUSPENDED AMS List.

Note that the actions associated with the SUSPEND operation can be deferred until the receipt of a specified event by the Configurable Application Process Service. If the action is to be deferred, the request is added to the EVENT AMS List maintained by the CAMS, and no further action is taken by this operation.

The RESUME Operation

The RESUME Operation specifies that the Configurable Application Process Service is to resume the execution of an AMS previously suspended with the SUSPEND operation. Once resumed, the AMS is moved from the SUSPENDED AMS List to the ACTIVE AMS List.

Note that the actions associated with the RESUME operation can be deferred until the receipt of a specified event by the Configurable Application Process Service. If the action is to be deferred, the request is added to the EVENT AMS List maintained by the CAMS, and no further action is taken by this operation.

The DUMP MAP Operation

The DUMP.sub.--MAP operation specifies that the Configurable Application Process Service is to send a DUMP.sub.--MAP request to the specified AMS. The specified AMS must currently be on the ACTIVE AMS List.

The CAMS will allocate a storage area, referred to as the MAP AREA for the specified AMS and associate an identifier with this MAP AREA. The CAMS will mark the MAP AREA with administrative information including, but not limited to the specific machine architecture on which the specified AMS is currently executing, timing information, security information to prevent unauthorized access to the MAP AREA, ownership information indicating the specified AMS as the owner of this MAP AREA and other information.

It is expected that upon receipt of the DUMP.sub.--MAP request, the AMS will write to the MAP AREA that information described by its MAP AREA attributes. This data is written in a machine independent format.

The Application Process can specify to the CAMS the persistence criteria for this MAP AREA. This information is used to determine when the CAMS is de-allocate the MAP AREA. The options are to keep the MAP AREA until the specified AMS terminates with the TERMINATE Operation, or, to keep the MAP AREA until a LOAD.sub.--MAP Operation specifying this MAP AREA is issued by the Application Process The DUMP.sub.--MAP Operation, upon completion, informs the Application Process of the identifier associated with MAP AREA.

The LOAD MAP Operation

The LOAD.sub.--MAP operation specifies that the Configurable Application Process Service is to send a LOAD.sub.--MAP request to the specified AMS. The operation requires the specification of a particular MAP AREA to be loaded. The specification of the MAP AREA may be through the identifier assigned during a DUMP MAP operation, or specified values supplied by the Application Process.

Once the LOAD.sub.--MAP operation has completed, the CAMS determines if the specified MAP AREA is to be de-allocated based on the persistence value set by the DUMP.sub.--MAP operation, and if necessary, will de-allocate this MAP AREA.

The TERMINATE Operation

The TERMINATE operation specifies to the Configurable Application Process Service that the execution of the specified AMS is to be terminated. In performing the termination, the Configurable Application Process Service will decrement the reference count associated with that AMS. If the reference count is non-zero, then other instances of the AMS are still in use. If the AMS was executed with a PUBLIC scope and the AMS reference count is non-zero, then no additional action is required by the Configurable Application Process Service. Upon termination, the AMS is removed from the ACTIVE AMS List.

All pending communications to the specified AMS are de-allocated according to the De-allocation Attribute specified during the LOAD Operation for the specified AMS. Note that in certain cases, this may result in the pending communications remaining untouched, and not being de-allocated When used in conjunction with the CMPS, the communications to the specified AMS will be terminated through a disconnect operation supplied by the CMPS.

Note that the actions associated with the TERMINATE operation can be deferred until the receipt of a specified event by the Configurable Application Process Service. If the action is to be deferred, the request is added to the EVENT AMS List maintained by the CAMS, and no further action is taken by this operation.

The NOTIFICATION Operation

The NOTIFICATION operation specifies to the Configurable Application Process Service that a particular internal or external event has occurred. The Configurable Application Process Service searches the EVENT AMS List to determine the any actions it is to perform based on the receipt of this event, and then performs these actions.

The INSERT Operation

The INSERT operation specifies that the Configurable Application Process Service is to insert the specified AMS between two specified AMS's previously started with the EXECUTE operation. Note that the specified AMS being inserted must appear in the ACTIVE AMS List.

Note that the actions associated with the INSERT operation can be deferred until the receipt of a specified event by the Configurable Application Process Service. If the action is to be deferred, the request is added to the EVENT AMS List maintained by the CAMS, and no further action is taken by this operation.

The EXTRACT Operation

The EXTRACT operation is the inverse of the INSERT operation. It specifies that the Configurable Application Process Service is to extract a specified AMS from between two other specified AMS's. Note that the Application Process can specify the disposition of the extracted AMS which must be one of:

TERMINATE: the extracted AMS is to be terminated according to the TERMINATE operation described above.

SUSPENDED: the extracted AMS is to be suspended according to the SUSPEND operation described above.

Note that the actions associated with the EXTRACT operation can be deferred until the receipt of a specified event by the Configurable Application Process Service. If the action is to be deferred, the request is added to the EVENT AMS List maintained by the CAMS, and no further action is taken by this operation.

The COMPRIMS Operation

The COMPRIMS operation specifies the default communication primitives to be used by the Application Process when communicating with an AMS. Note that the Communication Manager can adjust these primitive specifications as necessary to ensure the proper communication link between the Application Process and the AMS. Note further that any existing communication links created prior to the execution of this operation remain untouched. In this manner the Application Process can reset its default communication primitive as needed.

The UNLOAD Operation

The UNLOAD operation specifies that the Configurable Application Process Service is to unload the specified Minor Service from memory. The specified Minor Service cannot currently be on the ACTIVE AMS List, or the operation is aborted. The specified Minor Service is then removed from the LOADED AMS List.

The QUERY Operation

The QUERY operation specifies that the Configurable Application Process Service is to report specified information based on the current lists that it maintains. This information may include, for example, the list of all outstanding requests pending on the receipt of an event. This information is then made available to the Application Process.

The REPLACE Operation Detailed Architecture

An AMS may be executing as a separate thread of execution, either locally on the same machine as the CAMS, or remotely on a machine accessible to that machine on which the CAMS is executing. To replace this AMS with another AMS, the default actions taken by the Configurable Application Process Service is given as:

1. SUSPEND input communications to the specified AMS.
2. Permits existing AMS output to be directed towards Application Process, but monitors the output channel for special Configuration Messages.
3. Begins execution of new AMS potentially as a separate thread of execution.
4. Issues a DUMP.sub.--MAP operation for the specified existing AMS
5. Issues a LOAD.sub.--MAP operation to new AMS using the DUMP AREA created in 4.
6. Redirects all input destined for existing AMS to the new AMS.
7. Multiplexes output from existing AMS and new AMS to the Application Process--or--multiplexes output from existing AMS as input to the AMS.
8. Handles disposition of the existing AMS as specified by the Application Process.

Note that Step 2 is performed using the Thread Communication Switching Service described in this patent application.

Example Discussion

An example of an Application Process using a Primary Service and three Minor Services is shown in FIG. 6. Here, the Primary Service communicates with each of the Minor Services using a communication link provided by the CMPS. (See FIG. 6.)

Figure 7:
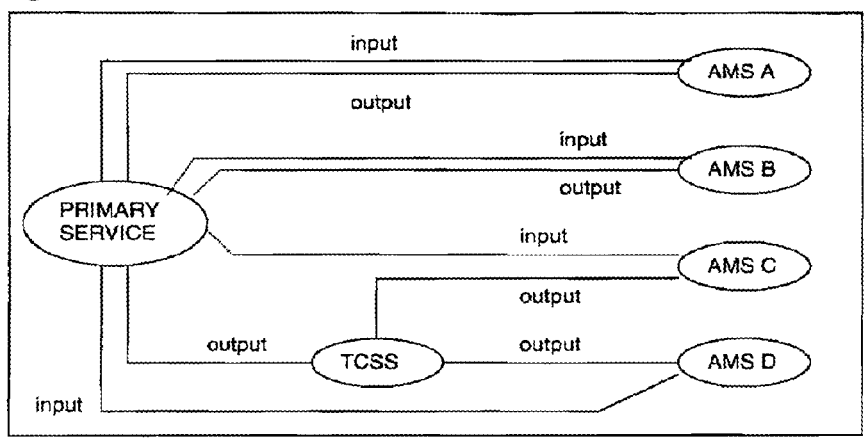
FIG. 7. Diagram showing Reconfiguring an Application Process.

To reconfigure the Application Program to use AMS D in place of AMS C, a REPLACE operation is applied. Upon receipt of this request, the CAMS will temporarily suspend the input channel to AMS C (from the Primary Service). It then loads AMS D. The input channel to AMS D is then established from the Primary Service as a replacement for input channel to AMS C. The CAMS then applies the specified disposition to AMS C. (See FIG. 7.)

Named Execution Environment

Overview

A Named Execution Environment, hereinafter referred to as NEE, is an execution environment created by the Named Execution Environment Manager on behalf of a requesting Application Process. The Application Process requesting the creation of the NEE is referred to as the Owner of the NEE. The Application Process does not know, nor cares where the NEE is physically located, only that the binding of the NEE to the physical execution environment by the Named Execution Environment Manager satisfies the REQUESTED ATTRIBUTE expression as specified by the Owner of the NEE. Through the creation process, the Owner of the NEE specifies a logical name to be associated with the NEE, and provides additional attributes describing the usage of the NEE. All subsequent references to the NEE by the Owner of the NEE, or by other Application Processes specify the logical name of the NEE, the operation to be performed, and other parameters to be used. The underlying physical connectivity and physical information passing is then handled by the Named Execution Environment Manager.

The Named Execution Environment Configuration File

A user or Application Process of a computer system registers with the Named Execution Environment Manager, hereinafter referred to as the NEEM, a set of one or more attributes describing an environment available on the computer system. These attributes, known as the REGISTERED ATTRIBUTES may include, but are not limited to those shown in Table 11.

Multiple REGISTERED ATTRIBUTES SETS can be registered for a single computer system. The REGISTERED ATTRIBUTES, along with the name of the computer system are stored in memory, or on a storage media accessible to the computer system on which the NEEM is executing. A permanent copy of the REGISTERED ATTRIBUTES along with their computer system name can be stored in the Named Execution Environment Configuration File, hereinafter referred to as the NEECF. stored in memory, or on a storage media accessible to the computer system on which the NEEM is executing. A permanent copy of the REGISTERED ATTRIBUTES along with their computer system name can be stored in the Named Execution Environment Configuration File, hereinafter referred to as the NEECF.

TABLE 11

The Registered Environment Attributes.

1. Attributes describing the operating system
2. Attributes describing the underlying hardware
3. Attributes describing installed software
4. Attributes describing access methods
5. Attributes describing physical execution environment TABLE 11-continued The Registered Environment Attributes.

6. Attributes describing security requirements
7. Attributes describing default shell
8. Attributes with special meaning to an application process, or user
9. Attributes describing maximum number of connections to the environment
10. Attributes describing the environment's physical computer system
11. Attributes describing access method to physical computer system
12. Attributes describing functionality to be associated with the environment
13. Attributes describing the communication identifier describing the physical machine as a communication point of the Communication Manager Service as described in this patent application.

Executing the Named Execution Environment Manager

The NEEM executes as a co-process of the Application Process. As such, the Named Execution Manager (the NEEM) is either linked with the Application Program directly (either through static or dynamic linkage), is executed as a separate process on a computer system accessible to the computer system executing the Application Process, or, is invoked through the Dynamic Configuration Management described in this patent application.

In any case, when the NEEM is executed, it reads the NEECF, detailing the REGISTERED ATTRIBUTES describing the computer system. Note that additional REGISTERED ATTRIBUTES can be subsequently added (registered), deleted, or otherwise modified even after the NEEM is executing.

The entries in the NEECF may include specifications identifying remote computer system accessible to the current computer system through some form of communications mechanism. Such an entry includes information detailing if the remote computer system is expected to have a NEEM executing on it, and/or, if there is a NEECF located on that computer system.

The NEEM creates a Minor Service thread, known as the NEEM STATUS THREAD to periodically poll the remote computer systems identified in the NEECF and performs a statistical analysis to determine their state. If a remote computer system fails, or if the communications between the local computer system and the remote computer system fails, then the NEE Status Thread will mark the remote computer system as UNACCESSIBLE by the NEEM. At such time as the NEE Status Thread can re-establish contact with the failed remote computer system, the NEEM will mark the computer system as ACCESSIBLE by the NEEM.

Initially, each entry of the NEECF is read by the NEEM and its corresponding NEE is placed on an INACTIVE NEE List maintained by the NEEM. As new Named Execution Environments are created, the NEEM adds them to the ACTIVE NEE List.

Creating a Named Execution Environment

The Application Process makes a request to create a new NEE, by specifying, in a Boolean Expression, one or more REQUESTED ATTRIBUTES. The Application Process also specifies one or more NEE ATTRIBUTES including, but not Limited to:

a logical name to be associated with the newly created environment.

an attribute describing if the NEE is PUBLIC or PRIVATE an attribute describing if the NEE is to only execute foreground commands.

an attribute describing if the NEE is to only execute background commands.

an attribute describing if other processes can execute in the foreground.

an attribute describing if other processes can execute in the background an attribute describing where the output is to be sent an attribute describing CPU threshold values an attribute describing if NEE is to be suspended when not in use an attribute describing the shell Application Process to execute in this NEE an attribute describing if the NEE can be terminated by any process an attribute describing seconds of IDLE time prior to termination of the NEE an attribute describing if NEE is to be terminated upon the termination of owner The NEEM searches the REGISTERED ATTRIBUTE entries for an environment satisfying the REQUESTED ATTRIBUTES set forth by the Application Process. When a match has been found, then the NEEM will establish a shell on the associated computer system to execute the requests of the Application Process. The newly created environment then becomes an ACTIVE NEE, and is added to the ACTIVE NEE List maintained by the NEEM.

Note that if the REQUESTED ATTRIBUTES can be satisfied by an ACTIVE NEE with a PUBLIC NEE ATTRIBUTE, then the NEEM will simply alias the specified logical name with the previous specified logical name of the current ACTIVE NEE satisfying the request. The reference count associated with this ACTIVE NEE is then incremented.

Figure 8:
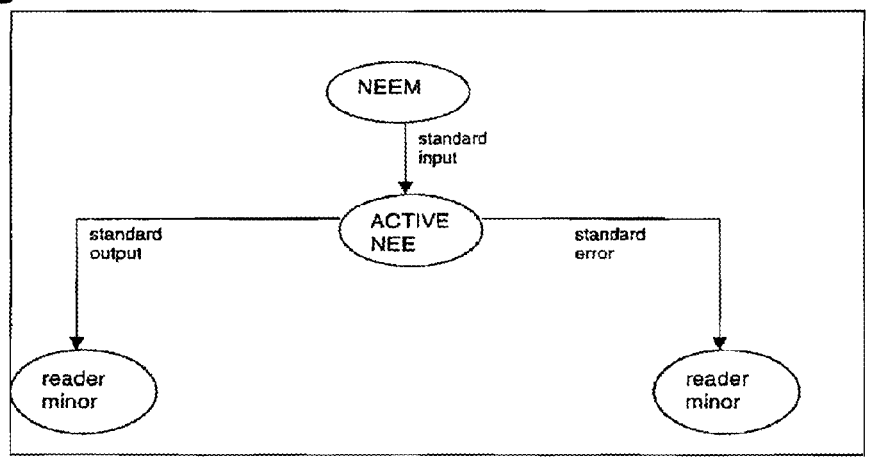
FIG. 8. Diagram showing Active NEE Takes Input from NEEM, Output Read by Minor Service Reader Threads.

Just prior to executing the shell Application Process associated with a new ACTIVE NEE, the NEEM will arrange for the standard input, the standard output, and the standard error file descriptors to be redirected to/from the NEEM itself. In this manner, the NEEM will be able to appropriately redirect all I/O requests on this file descriptors appropriately. The NEEM will also establish Minor Service Reader/Writer threads to read the standard output and standard error file descriptors and to redirect this output to the appropriate Application Process making a request to execute in the ACTIVE NEE. This is shown in FIG. 8.

Using a Named Execution Environment

An Application Process can request the NEEM to execute a request in a specific NEE by specifying the logical name of the NEE. The NEEM will look up the logical name in its ACTIVE NEE List and will send the request to that named environment. At this point, the Application Process is considered ATTACHED to the logically named NEE and can read its standard output and its standard error through the NEEM. When the NEEM determines that the request has completed, the NEEM will automatically DETACH the Application Process from the logically named NEE.

Using a standard Application Programming Interface, the Application Process can read the standard-output of the logically named NEE to which it is ATTACHED. This is accomplished by the Minor Service Reader/Writer Thread of the NEEM that is reading the actual standard output of the NEE. It will send the standard output to the Application Process. Likewise, the Minor Service Reader/Writer Thread of the NEEM which reads the actual standard error will send the standard error output to the Application Process.

There are a series of commands understood by the NEEM through which the Application Process can control the use of a logically named NEE. These include:

1. EXECUTE: the Application Process specifies a request to be executed in a logically named NEE. The logically-named NEE must have previously been created. Additional attributes can be specified to describe the characteristics of the execution itself. These include, but are not limited to:
   A. FOREGROUND: the request is to be executed in the foreground
   B. BACKGROUND: the request is to be executed in the background
   C. PERIOD: the request must complete within a specified time period
2. QUERY: the Application Process can query the NEEM for specified information related to ACTIVE, or INACTIVE logical environments.
3. REDIRECT: the Application Process owner of the logically named NEE can request that the standard input, standard output, and/or the standard error output be redirected from the logically named NEE to another NEE.
4. DUPLICATE: the Application Process can request that the NEEM make a duplicate copy of a specified logically named NEE. The Application Process specifies a new logical name for the duplicate environment.
5. SUSPEND: the Application Process owner of the specified logically named NEE can request the NEEM to suspend subsequent requests for this NEE. All requests remain pending until the NEE is either RESUMED, the pending requests are CANCELED, or, the NEE is terminated.
6. RESUME: the Application Process owner of the specified logically named NEE can request the NEEM to resume the previously suspended NEE. All pending requests of this NEE are then acted upon given the constraints of the EXECUTE command as described above.
7. CANCEL: the Application Process owner of the specified logically named NEE can request the NEEM to cancel all pending requests for the specified NEE.

Terminating a Named Execution Environment

The owner of the Named Execution Environment can terminate the Named Execution Environment by sending a TERMINATE request to the Named Execution Environment Manager.

Threaded State Machine

The application program defines a set of states describing a state machine with exactly one start state, and potentially many different end states. The application then attaches a datum to the State Machine. The State Machine Thread Manager then administers the transition of this datum through the state machine.

For each defined state, there is a corresponding state thread. When a datum enters a particular state, the State Machine Thread Manager invokes the State Thread as a separate thread of execution. The exiting value of this State Thread is then used to determine the next transition from the current state. In this manner, various datums may simultaneously be attached to the same Multithreaded State Machine and the State Machine Thread Manager will administer and synchronize their transitions simultaneously.

Finally, the State Machine Thread Manager provides a special "Error" state to which a datum will transition when the exiting value of the State Thread is undefined in the current state machine.

Example of Use of the Invention

Software construction is the process of compiling source code components to produce a binary representation. In this instance, a rule specification of the form:

target.sub.--name: prerequisite.sub.--list action is specified to show that a target is dependent on prerequisites. If one or more of the prerequisites are newer than the target, then the action is triggered to construct the target. Each prerequisite can be listed as a target of another rule. As an example, consider:

rule 1 A:B C
concatenate B and C to construct A
rule 2 B:b
copy "b" to "B"
rule 3 C:c
copy "c" to "C"

In this example, the rule to construct the target "A" shows it has a dependency on prerequisites "B" and "C". Note, however, that "B" is dependent on "b" according to the second rule, and that "C" is dependent on "c" based on rule 3. If "c" has changed since the last time "C" was constructed, then the action for rule 3 would be triggered to reconstruct C. Similarly, if "b" has changed since the last time "B" was constructed, then the action for rule 2 would be triggered to reconstruct B. Note that the action for rule 2 and the action for rule 3 could in fact occur simultaneously since there are no other dependencies on these rules. After rule 2 and rule 3 has completed, then rule 1 can continue. Here, if "B" or "C" has changed since the last time "A" has been constructed, then the action for rule 1 will be triggered to reconstruct A.

Using a procedural language, the algorithm to provide this service can be specified as shown in FIG. 11 Using a state machine representation, the same algorithm would be given according to FIGS. 12 through 13B.

The invention claimed is:

1. A method comprising:
receiving, at a service provider computer, a request communication comprising a request to perform at least one operation, the at least one operation including one or more of (i) registering an application service, wherein the request communication comprises required registration information, (ii) registering an application service, wherein the request communication comprises required registration information and one or more optional registration information, (iii) querying for an application service, wherein the request communication comprises one or more criteria for selecting the application service, and (iv) selecting and connecting to an accessible application service, wherein the request communication comprises one or more criteria for selecting the application service;
interacting, by the service provider computer, with a directory service of registered application services to satisfy the request; and
in response thereto, sending a response communication from the service provider computer to the end-user application process.

2. The method of claim 1, wherein the criteria is at least one of a textual description of a type of the application service, a sending communication primitive and a receiving communication primitive, a communication mechanism used in establishing the application service, a location of the application service, an input type understood by the application service, an output type generated by the application service, a keyword search list, a token indicating whether execution of the application service can be started, a token describing a data representation in communication with the application service, a token describing if execution of the application service must have previously been started, a token indicating whether a thread communication identifier is listed, a token indicating whether a public connection to the application service can be used, a token indicating whether a private connection to the application service can be used, a token indicating whether a public connection is mandatory, a token indicating whether a private connection is mandatory, a token indicating whether the application service is a component of a larger application service, a shell action to execute in initializing the application service, a maximum number of concurrent communications, licensing information, general user information, a link to additional services required for using the application service, status information components, information components used for future enhancements, a thread communication identifier, a secondary thread service directory, a usage fee, and a directory service fee.

3. A non-transitory computer-readable medium having instructions stored thereon, the instructions comprising:
- instructions to receive a request comprising at least one unique identifier assigned to an end-user application process, and in response thereto validate the at least one unique identifier;
- instructions to select one or more accessible application services from a set of registered application services; and
- instructions to communicate the results thereof to the end-user application process.

4. The system of claim 3, wherein the criteria is at least one of a textual description of a type of the application service, a sending communication primitive and a receiving communication primitive, a communication mechanism used in establishing the application service, a location of the application service, an input type understood by the application service, an output type generated by the application service, a keyword search list, a token indicating whether execution of the application service can be started, a token describing a data representation in communication with the application service, a token describing if execution of the application service must have previously been started, a token indicating whether a thread communication identifier is listed, a token indicating whether a public connection to the application service can be used, a token indicating whether a private connection to the application service can be used, a token indicating whether a public connection is mandatory, a token indicating whether a private connection is mandatory, a token indicating whether the application service is a component of a larger application service, a shell action to execute in initializing the application service, a maximum number of concurrent communications, licensing information, general user information, a link to additional services required for using the application service, status information components, information components used for future enhancements, a thread communication identifier, a secondary thread service directory, a usage fee, and a directory service fee.

5. A method comprising:
- a service provider initializing a communication link over the Internet in response to receiving a connection request to establish a connection with an end-user application process,
- wherein the service provider executes on a service provider computer;
- the service provider receiving a query request via the communication link, the query request including one or more criteria for selecting at least one application service satisfying the criteria;
- the service provider locating a registered application service satisfying the criteria;
- the service provider sending a response communication to the end-user application process, the response including information representative of the registered information describing the application service satisfying the request; and
- the service provider disconnecting the communication link.

6. The method of claim 5, wherein the criteria is at least one of a textual description of a type of the application service, a sending communication primitive and a receiving communication primitive, a communication mechanism used in establishing the application service, a location of the application service, an input type understood by the application service, an output type generated by the application service, a keyword search list, a token indicating whether execution of the application service can be started, a token describing a data representation in communication with the application service, a token describing if execution of the application service must have previously been started, a token indicating whether a thread communication identifier is listed, a token indicating whether a public connection to the application service can be used, a token indicating whether a private connection to the application service can be used, a token indicating whether a public connection is mandatory, a token indicating whether a private connection is mandatory, a token indicating whether the application service is a component of a larger application service, a shell action to execute in initializing the application service, a maximum number of concurrent communications, licensing information, general user information, a link to additional services required for using the application service, status information components, information components used for future enhancements, a thread communication identifier, a secondary thread service directory, a usage fee, and a directory service fee.

7. A method comprising:
- a service provider initializing a communication link in response to receiving a connection request to establish a connection with an end-user application process, wherein the service provider executes on a service provider computer;
- the service provider receiving a query request via the communication link, the query request including one or more criteria for selecting a desired application service;
- the service provider interacting with a directory service process comprising one or more registered application services to select an application service satisfying the criteria; and
- the service provider connecting the end user application process to the selected application service.

8. The method of claim 7, wherein the criteria is at least one of a textual description of a type of the application service, a sending communication primitive and a receiving communication primitive, a communication mechanism used in establishing the application service, a location of the application service, an input type understood by the application service, an output type generated by the application service, a keyword search list, a token indicating whether execution of the application service can be started, a token describing a data representation in communication with the application service, a token describing if execution of the application service must have previously been started, a token indicating whether a thread communication identifier is listed, a token indicating whether a public connection to the application service can be used, a token indicating whether a private connection to the application service can be used, a token indicating whether a public connection is mandatory, a token indicating whether a private connection is mandatory, a token indicating whether the application service is a component of a larger application service, a shell action to execute in initializing the application service, a maximum number of concurrent communications, licensing information, general user information, a link to additional services required for using the application service, status information components, information components used for future enhancements, a thread communication identifier, a secondary thread service directory, a usage fee, and a directory service fee.

9. A method comprising:
a service provider application process receiving a communication comprising a request to provide an application service, wherein the service provider application process executes on a service provider computer;
the service provider application process interacting with the received communication to dynamically configure an application service to satisfy the request; and
the service provider application process executing the dynamically configured application service to satisfy the request.

10. A method comprising:
a service provider application process receiving a communication comprising a unique identifier assigned to an end-user application process during a subscription process and criteria for selecting a registered communication point, wherein the service provider application process executes on a service provider computer;
in response thereto, the service provider application process validating the end-user application process;
the service provider application process selecting a registered communication point satisfying the criteria; and
the service provider application process redirecting communication from the selected communication point to the end-user application process.

11. The method of claim 10, wherein the criteria is at least one of a textual description of a type of the registered communication point, a sending communication primitive and a receiving communication primitive, a communication mechanism used in establishing the registered communication point, a location of the registered communication point, an input type understood by the registered communication point, an output type generated by the registered communication point, a keyword search list, a token indicating whether execution of the registered communication point can be started, a token describing a data representation in communication with the registered communication point, a token describing if execution of the registered communication point must have previously been started, a token indicating whether a thread communication identifier is listed, a token indicating whether a public connection to the registered communication point can be used, a token indicating whether a private connection to the registered communication point can be used, a token indicating whether a public connection is mandatory, a token indicating whether a private connection is mandatory, a shell action to execute in initializing the registered communication point, a maximum number of concurrent communications, licensing information, general user information, a link to additional communication points required for using the registered communication point, status information components, information components used for future enhancements, a thread communication identifier, a secondary thread service directory, a usage fee, and a directory service fee.

12. A computer including a data storage having instructions stored thereon that, if executed by the computer, cause the computer to execute an application process, the application process comprising at least a first minor service, wherein the application process is configured to perform operations comprising:
selecting a second minor service based at least in part on one or more criteria;
replacing the first minor service with the second minor service by at least:
suspending the first minor service, and
loading the second minor service; and
connecting the application process to the second minor service,
wherein the first minor service comprises a process or a thread, and wherein the second minor service comprises a process or a thread.

13. The computer of claim 12, wherein the second minor service is configured to execute within an address space of the application process.

14. The computer of claim 12, wherein the second minor service is configured to execute within a different address space than the application process.

15. The computer of claim 12, wherein selecting the second minor service based on the one or more criteria comprises sending the one or more criteria to a directory service of registered minor services.

16. The computer of claim 15, wherein selecting the second minor service based on the one or more criteria further comprises receiving a listing of minor services matching the one or more criteria.

17. The computer of claim 16, wherein the listing of minor services comprises respective locations for individual minor services.

18. The computer of claim 12, wherein connecting the application process to the second minor service comprises connecting the application process to the second minor service when the application process requires interaction with the second minor service.

19. The computer of claim 12, wherein loading the second minor service comprises loading the second minor service into an address space of the application process.

20. The computer of claim 12, wherein the criteria is at least one of a textual description of a type of a minor service, a sending communication primitive and a receiving communication primitive, a communication mechanism used in establishing the minor service, a location of the minor service, an input type understood by the minor service, an output type generated by the minor service, a keyword search list, a token indicating whether execution of the minor service can be started, a token describing a data representation in communication with the minor service, a token describing if execution of the minor service must have previously been started, a token indicating whether a thread communication identifier is listed, a token indicating whether a public connection to the minor service can be used, a token indicating whether a private connection to the minor service can be used, a token indicating whether a public connection is mandatory, a token indicating whether a private connection is mandatory, a token indicating whether the minor service is a component of a larger application service, a shell action to execute in initializing the minor service, a maximum number of concurrent communications, licensing information, general user information, a link to additional services required for using the minor service, status information components, information components used for future enhancements, a thread communication identifier, a secondary thread service directory, a usage fee, and a directory service fee.

21. A method comprising:
a computer selecting a second minor service based at least in part on one or more criteria;
the computer replacing a first minor service with the second minor service by at least:
suspending the first minor service, and
loading the second minor service; and
the computer connecting an application process to the second minor service;
wherein the first minor service comprises a process or a thread, and wherein the second minor service comprises a process or a thread.

22. The method of claim 21, wherein the second minor service is configured to execute within an address space of the application process.

23. The method of claim 21, wherein the second minor service is configured to execute within a different address space than the application process.

24. The method of claim 21, wherein selecting the second minor service based on the one or more criteria comprises sending the one or more criteria to a directory service of registered minor services.

25. The method of claim 24, wherein selecting the second minor service based on the one or more criteria further comprises receiving a listing of minor services matching the one or more criteria.

26. The method of claim 25, wherein the listing of minor services comprises respective locations for individual minor services.

27. The method of claim 21, wherein connecting the application process to the second minor service comprises connecting the application process to the second minor service when the application process requires interaction with the second minor service.

28. The method of claim 21, wherein loading the second minor service comprises loading the second minor service into an address space of the application process.

29. The method of claim 21, wherein the criteria is at least one of a textual description of a type of a minor service, a sending communication primitive and a receiving communication primitive, a communication mechanism used in establishing the minor service, a location of the minor service, an input type understood by the minor service, an output type generated by the minor service, a keyword search list, a token indicating whether execution of the minor service can be started, a token describing a data representation in communication with the minor service, a token describing if execution of the minor service must have previously been started, a token indicating whether a thread communication identifier is listed, a token indicating whether a public connection to the minor service can be used, a token indicating whether a private connection to the minor service can be used, a token indicating whether a public connection is mandatory, a token indicating whether a private connection is mandatory, a token indicating whether the minor service is a component of a larger application service, a shell action to execute in initializing the minor service, a maximum number of concurrent communications, licensing information, general user information, a link to additional services required for using the minor service, status information components, information components used for future enhancements, a thread communication identifier, a secondary thread service directory, a usage fee, and a directory service fee.

30. A method comprising:
a computer performing a first minor service of an application process;
the computer replacing the first minor service of the application process with a second minor service by at least:
suspending the first minor service, and
loading the second minor service;
wherein the first minor service comprises a process or a thread, and wherein the second minor service comprises a process or a thread.

31. The method of claim 30, wherein the second minor service is configured to execute within an address space of the application process.

32. The method of claim 30, wherein the second minor service is configured to execute within a different address space than the application process.

33. The method of claim 30, further comprising:
sending one or more criteria to a directory service of registered minor services.

34. The method of claim 33, further comprising:
receiving a listing of minor services matching the one or more criteria.

35. The method of claim 34, wherein the listing of minor services comprises respective locations for individual minor services.

36. The method of claim 30, further comprising:
connecting the application process to the second minor service when the application process requires interaction with the second minor service.

37. The method of claim 30, wherein loading the second minor service comprises loading the second minor service into an address space of the application process.

38. The method of claim 30, wherein the criteria is at least one of a textual description of a type of a minor service, a sending communication primitive and a receiving communication primitive, a communication mechanism used in establishing the minor service, a location of the minor service, an input type understood by the minor service, an output type generated by the minor service, a keyword search list, a token indicating whether execution of the minor service can be started, a token describing a data representation in communication with the minor service, a token describing if execution of the minor service must have previously been started, a token indicating whether a thread communication identifier is listed, a token indicating whether a public connection to the minor service can be used, a token indicating whether a private connection to the minor service can be used, a token indicating whether a public connection is mandatory, a token indicating whether a private connection is mandatory, a token indicating whether the minor service is a component of a larger application service, a shell action to execute in initializing the minor service, a maximum number of concurrent communications, licensing information, general user information, a link to additional services required for using the minor service, status information components, information components used for future enhancements, a thread communication identifier, a secondary thread service directory, a usage fee, and a directory service fee.

* * * * *

UNITED STATES PATENT AND TRADEMARK OFFICE
CERTIFICATE OF CORRECTION

PATENT NO. : 8,285,669 B2  
APPLICATION NO. : 12/433528  
DATED : October 9, 2012  
INVENTOR(S) : Northrup It is certified that error appears in the above-identified patent and that said Letters Patent is hereby corrected as shown below:

On the Title Page

Page 2, in Item (56), under "OTHER PUBLICATIONS", in Column 1, Line 10, delete "iCICS.," and insert -- ICICS., --, therefor.

Page 2, in Item (56), under "OTHER PUBLICATIONS", in Column 1, Line 11, delete "Sp. 9-12, 199," and insert -- Sep. 9-12, 1997, --, therefor.

Page 2, in Item (56), under "OTHER PUBLICATIONS", in Column 1, Line 13, delete "Symposiumn" and insert -- Symposium --, therefor.

Page 2, in Item (56), under "OTHER PUBLICATIONS", in Column 2, Line 1, delete "jarva.rmi" and insert -- java.rmi, --, therefor.

Page 2, in Item (56), under "OTHER PUBLICATIONS", in Column 2, Line 26, delete "vice.htm- l." and insert -- vice.html. --, therefor.

In the Drawings

In Fig. 11, Sheet 6 of 114, Line 20, delete "then the" and insert -- than the --, therefor.

In Fig. 13B, Sheet 8 of 114, Line 8, delete "then the" and insert -- than the --, therefor.

In Fig. 25E, Sheet 22 of 114, for Tag "145", delete "communicaiton" and insert -- communication --, therefor.

In Fig. 25E, Sheet 22 of 114, for Tag "146", delete "communicaiton" and insert -- communication --, therefor.

Signed and Sealed this  
Eleventh Day of March, 2014

Michelle K. Lee  
*Deputy Director of the United States Patent and Trademark Office*

CERTIFICATE OF CORRECTION (continued)
U.S. Pat. No. 8,285,669 B2

In Fig. 25E, Sheet 22 of 114, for Tag "147", delete "communicaiton" and insert -- communication --, therefor.

In Fig. 25E, Sheet 22 of 114, for Tag "148", delete "communicaiton" and insert -- communication --, therefor.

In Fig. 25E, Sheet 22 of 114, for Tag "149", delete "communicaiton" and insert -- communication --, therefor.

In Fig. 25H, Sheet 25 of 114, for Tag "249", delete "seriveRegistraiton" and insert -- serviceRegistration --, therefor.

In Fig. 25I, Sheet 26 of 114, for Tag "285", delete "communicaiton" and insert -- communication --, therefor.

In Fig. 25I, Sheet 26 of 114, for Tag "297", delete "communicaiton" and insert -- communication --, therefor.

In Fig. 31B, Sheet 46 of 114, for Tag "21", delete "Communicaiton" and insert -- Communication --, therefor.

In Fig. 31B, Sheet 46 of 114, for Tag "25", delete "communicaiton" and insert -- communication --, therefor.

In Fig. 31B, Sheet 46 of 114, for Tag "34", delete "communicaiton" and insert -- communication --, therefor.

In Fig. 31B, Sheet 46 of 114, for Tag "45", delete "awhile" and insert -- a while --, therefor.

In Fig. 31C, Sheet 47 of 114, for Tag "58", delete "communicaiton" and insert -- communication --, therefor.

In Fig. 31C, Sheet 47 of 114, for Tag "70", delete "the the" and insert -- the --, therefor.

In Fig. 31C, Sheet 47 of 114, for Tag "85", delete "communicaiton" and insert -- communication --, therefor.

In Fig. 33A, Sheet 53 of 114, delete " Fig. 33A " and insert -- Fig. 33A --, therefor.

In Fig. 34A, Sheet 59 of 114, Line 1, delete "communicaiton" and insert -- communication --, therefor.

In Fig. 54B, Sheet 109 of 114, for Tag "32", delete "this the" and insert -- the --, therefor.

In Fig. 54C, Sheet 110 of 114, for Tag "83", delete "this the" and insert -- the --, therefor.

In the Specification

In Column 3, Line 60, delete "providers" and insert -- provider's --, therefor.

In Column 4, Line 5, delete "the" and insert -- of the --, therefor.

In Column 6, Line 20, delete "a intraprocess" and insert -- an intraprocess --, therefor.

In Column 10, Lines 66-67, delete "Application. Process." and insert -- Application Process. --, therefor.

In Column 11, Line 4, delete "Memory" and insert -- Memory. --, therefor.

In Column 11, Line 40, delete "Points" and insert -- Points. --, therefor.

In Column 11, Line 46, delete "13B" and insert -- 13B. --, therefor.

In Column 11, Line 51, delete "14" and insert -- 14. --, therefor.

In Column 11, Line 52, delete "15" and insert -- 15. --, therefor.

In Column 11, Line 53, delete "16" and insert -- 16. --, therefor.

In Column 11, Line 53, delete "Service" and insert -- Service. --, therefor.

In Column 11, Line 54, delete "17" and insert -- 17. --, therefor.

In Column 11, Line 55, delete "18" and insert -- 18. --, therefor.

In Column 11, Line 57, delete "19" and insert -- 19. --, therefor.

In Column 11, Line 59, delete "20C" and insert -- 20C. --, therefor.

In Column 11, Line 62, delete "21" and insert -- 21. --, therefor.

In Column 11, Line 63, delete "22D" and insert -- 22D. --, therefor.

In Column 11, Line 66, delete "23B" and insert -- 23B. --, therefor.

In Column 12, Line 1, delete "24B" and insert -- 24B. --, therefor.
In Column 12, Line 4, delete "25P" and insert -- 25P. --, therefor.

In Column 12, Line 6, delete "26J" and insert -- 26J. --, therefor.

In Column 12, Line 7, delete "27B" and insert -- 27B. --, therefor.

In Column 12, Line 9, delete "28" and insert -- 28. --, therefor.

In Column 12, Line 10, delete "29B" and insert -- 29B. --, therefor.

In Column 12, Line 11, delete "30B" and insert -- 30B. --, therefor.

In Column 12, Line 12, delete "31G" and insert -- 31G. --, therefor.

In Column 12, Line 13, delete "32B" and insert -- 32B. --, therefor.

In Column 12, Line 15, delete "33G" and insert -- 33G. --, therefor.

In Column 12, Line 17, delete "34B" and insert -- 34B. --, therefor.

In Column 12, Line 19, delete "35B" and insert -- 35B. --, therefor.

In Column 12, Line 20, delete "36" and insert -- 36. --, therefor.

In Column 12, Line 21, delete "37C" and insert -- 37C. --, therefor.

In Column 12, Line 23, delete "38" and insert -- 38. --, therefor.

In Column 12, Line 24, delete "31H" and insert -- 39H. --, therefor.

In Column 12, Line 25, delete "40C" and insert -- 40C. --, therefor.

In Column 12, Line 26, delete "41N" and insert -- 41N. --, therefor.

In Column 12, Line 27, delete "42B" and insert -- 42B. --, therefor.

In Column 12, Line 28, delete "43G" and insert -- 43G. --, therefor.

In Column 12, Line 29, delete "44" and insert -- 44. --, therefor.

In Column 12, Line 30, delete "45C" and insert -- 45C. --, therefor.

In Column 12, Line 31, delete "46B" and insert -- 46B. --, therefor.

In Column 12, Line 33, delete "47D" and insert -- 47D. --, therefor.
In Column 12, Line 35, delete "48" and insert -- 48. --, therefor.

CERTIFICATE OF CORRECTION (continued)
U.S. Pat. No. 8,285,669 B2

In Column 12, Line 36, delete "49B" and insert -- 49B. --, therefor.

In Column 12, Line 38, delete "50" and insert -- 50. --, therefor.

In Column 12, Line 39, delete "51E" and insert -- 51E. --, therefor.

In Column 12, Line 40, delete "52" and insert -- 52. --, therefor.

In Column 12, Line 41, delete "53B" and insert -- 53B. --, therefor.

In Column 12, Line 42, delete "54D" and insert -- 54D. --, therefor.

In Column 12, Line 44, delete "55" and insert -- 55. --, therefor.

In Column 12, Line 45, delete "56C" and insert -- 56C. --, therefor.

In Column 20, Line 26, delete "Register register" and insert -- Register: register --, therefor.

In Column 20, Line 31, delete "Unbind unbind" and insert -- Unbind: unbind --, therefor.

In Column 20, Line 34, delete "Report report" and insert -- Report: report --, therefor.

In Column 20, Line 61, delete "Interface and" and insert -- Interface or --, therefor.

In Column 22, Line 53, delete "then." and insert -- then --, therefor.

In Column 24, Line 42, delete "Dynarrucally" and insert -- Dynamically --, therefor.

In Column 25, Line 23, delete "Registered.Environment" and insert -- Registered Environment --, therefor.

In Column 33, Line 65, delete "Progra," and insert -- Program. --, therefor.

In Column 35, Line 21, delete "Program;" and insert -- Program. --, therefor.

In Column 40, Line 39, delete "Interface and" and insert -- Interface or --, therefor.

In Column 43, Line 35, delete "a Application" and insert -- an Application --, therefor.

In Column 47, Line 65, delete "CAMS is" and insert -- CAMS --, therefor.

In Column 48, Line 3, delete "Process" and insert -- Process. --, therefor.

In Column 48, Line 36, delete "de-allocated" and insert -- de-allocated. --, therefor.